(12) United States Patent
Era

(10) Patent No.: US 7,558,420 B2
(45) Date of Patent: Jul. 7, 2009

(54) METHOD AND APPARATUS FOR GENERATING A STEREOGRAPHIC IMAGE

(76) Inventor: Kazunari Era, 4-1-11-201, Matsuba-cho, Kashiwa-shi, Chiba, 277-0827 (JP)

( * ) Notice: Subject to any disclaimer, the term of this patent is extended or adjusted under 35 U.S.C. 154(b) by 394 days.

(21) Appl. No.: 10/525,033

(22) PCT Filed: Aug. 20, 2003

(86) PCT No.: PCT/JP03/10499

§ 371 (c)(1),
(2), (4) Date: Feb. 17, 2005

(87) PCT Pub. No.: WO2004/019621

PCT Pub. Date: Mar. 4, 2004

(65) Prior Publication Data

US 2005/0254702 A1    Nov. 17, 2005

(30) Foreign Application Priority Data

Aug. 20, 2002   (JP)   ............... 2002-238709
Aug. 20, 2002   (JP)   ............... 2002-238710

(51) Int. Cl.
   *G06K 9/00*   (2006.01)
   *G06K 9/36*   (2006.01)
(52) U.S. Cl. .................... 382/154; 382/285
(58) Field of Classification Search ................ 382/154, 382/285

See application file for complete search history.

(56) References Cited

U.S. PATENT DOCUMENTS 6,445,833 B1 * 9/2002 Murata et al. ............... 382/285

FOREIGN PATENT DOCUMENTS

| EP | 0 918 439 A1 | 5/1999 |
|---|---|---|
| EP | 1 235 438 A1 | 8/2002 |
| JP | A 05-091545 | 4/1993 |
| JP | A 8-29734 | 2/1996 |
| JP | A 10-051812 | 2/1998 |
| JP | A 2001-298753 | 10/2001 |
| JP | A-2002-123842 | 4/2002 |
| WO | WO 02/13141 A1 | 2/2002 |
| WO | WO-A-02/13141 | 2/2002 |

OTHER PUBLICATIONS

Japanese Office Action, mailed on Sep. 4, 2007; with English Translation.
Canadian Office Action, mailed on Oct. 30, 2007.
Office Action of Canadian Corresponding Application No. 2,496,353 issued Jul. 30, 2008.

* cited by examiner

*Primary Examiner*—Wesley Tucker
(74) *Attorney, Agent, or Firm*—Oliff & Berridge, PLC

(57) ABSTRACT

In a 3D image generating apparatus 1 depth values (Z-value) of pixels are calculated on the basis of grayscale values of 2D image data. Next, a reverse determination, smoothing, distribution adjustment, local adjustment, and the like are performed on the Z-values. Next, parallaxes of pixels are determined on the basis of the Z-values of the pixels finally obtained, and the pixels are displaced acceding to the parallaxes, so as to generate data of a stereographic image.

10 Claims, 43 Drawing Sheets

FIG. 2
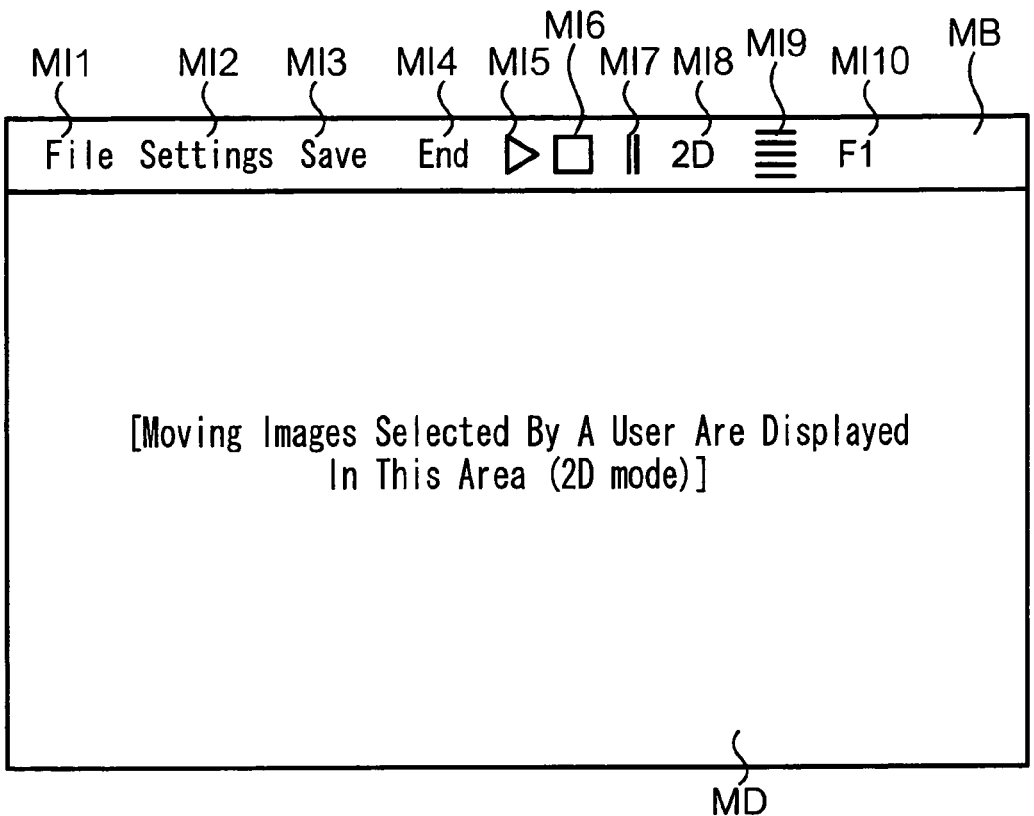
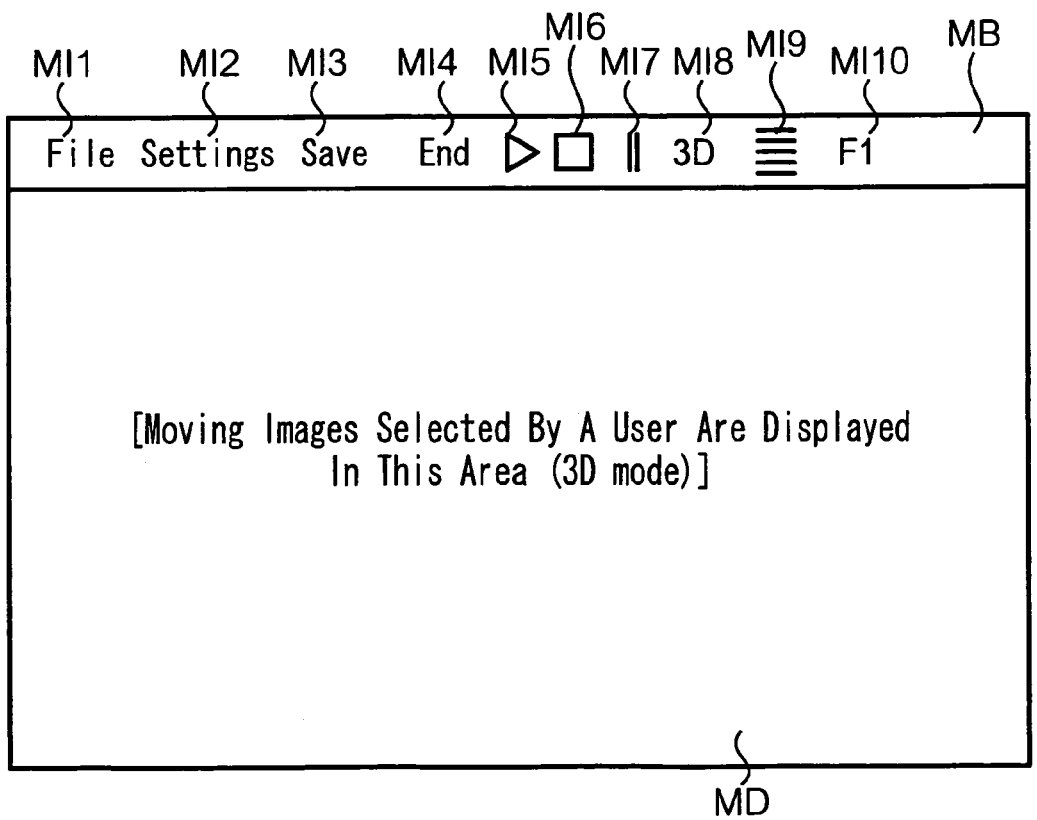

FIG. 8
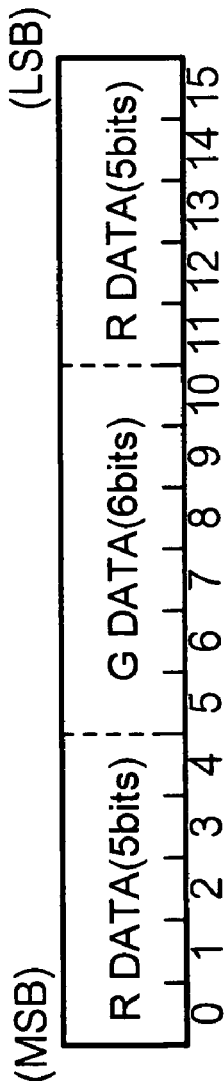
(FOR COLOR DEPTH OF 16 bits)
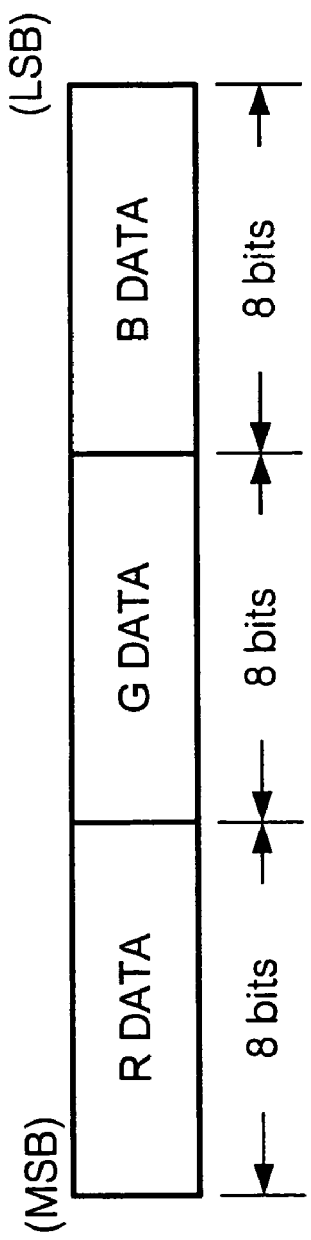
(FOR COLOR DEPTH OF 24 bits)
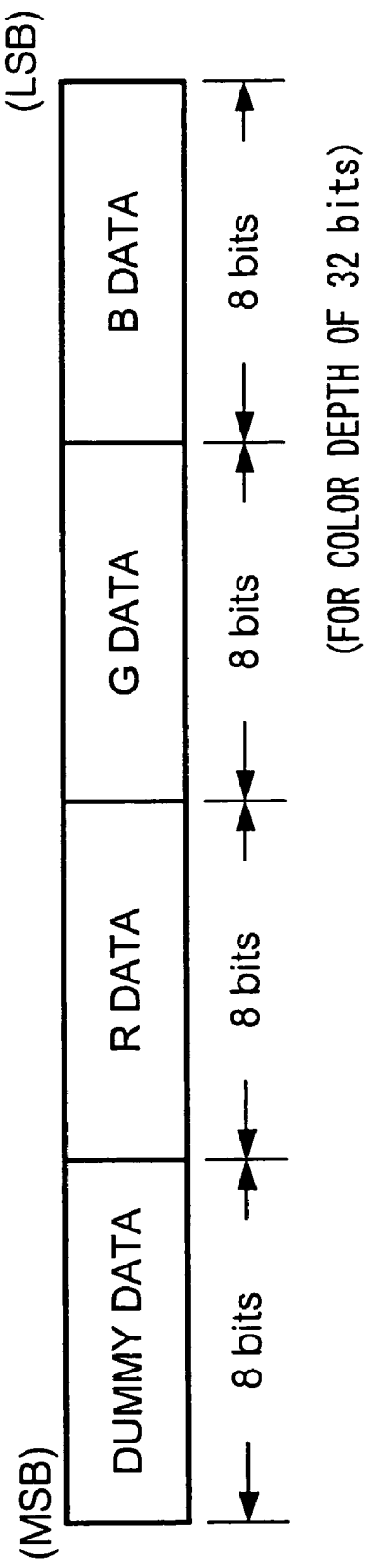
(FOR COLOR DEPTH OF 32 bits)

FIG. 17
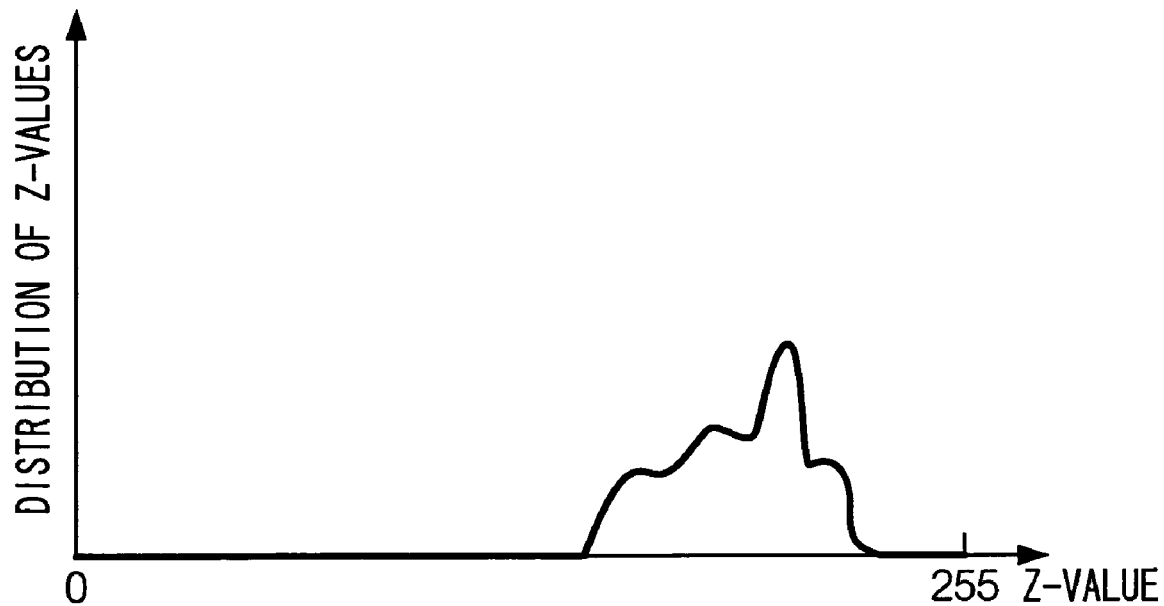
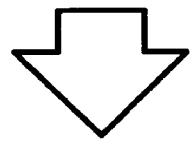
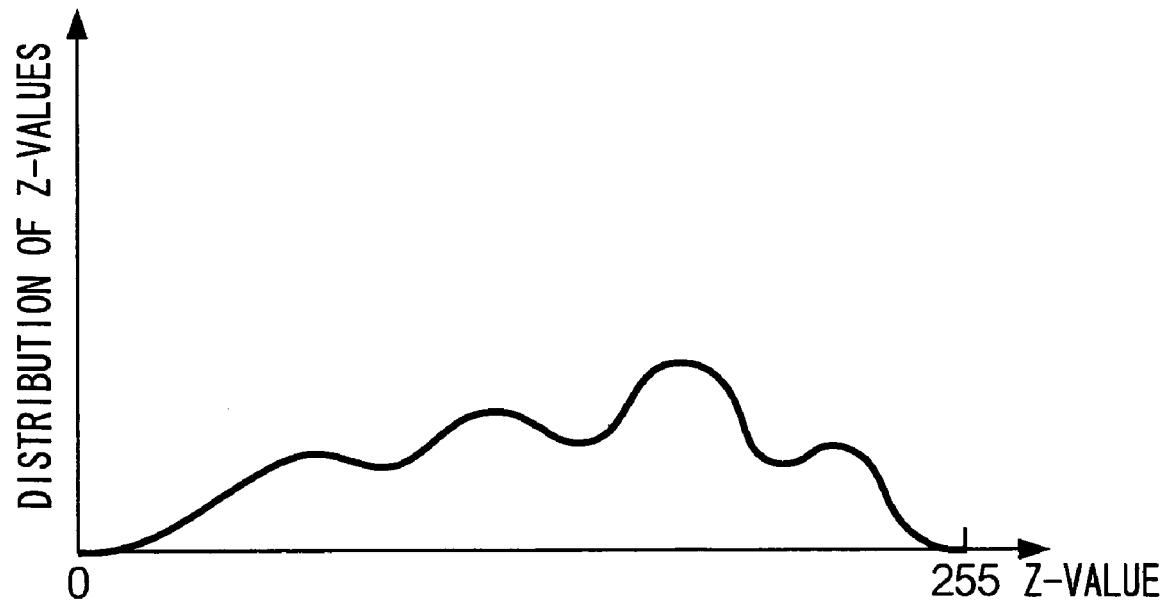

FIG. 23
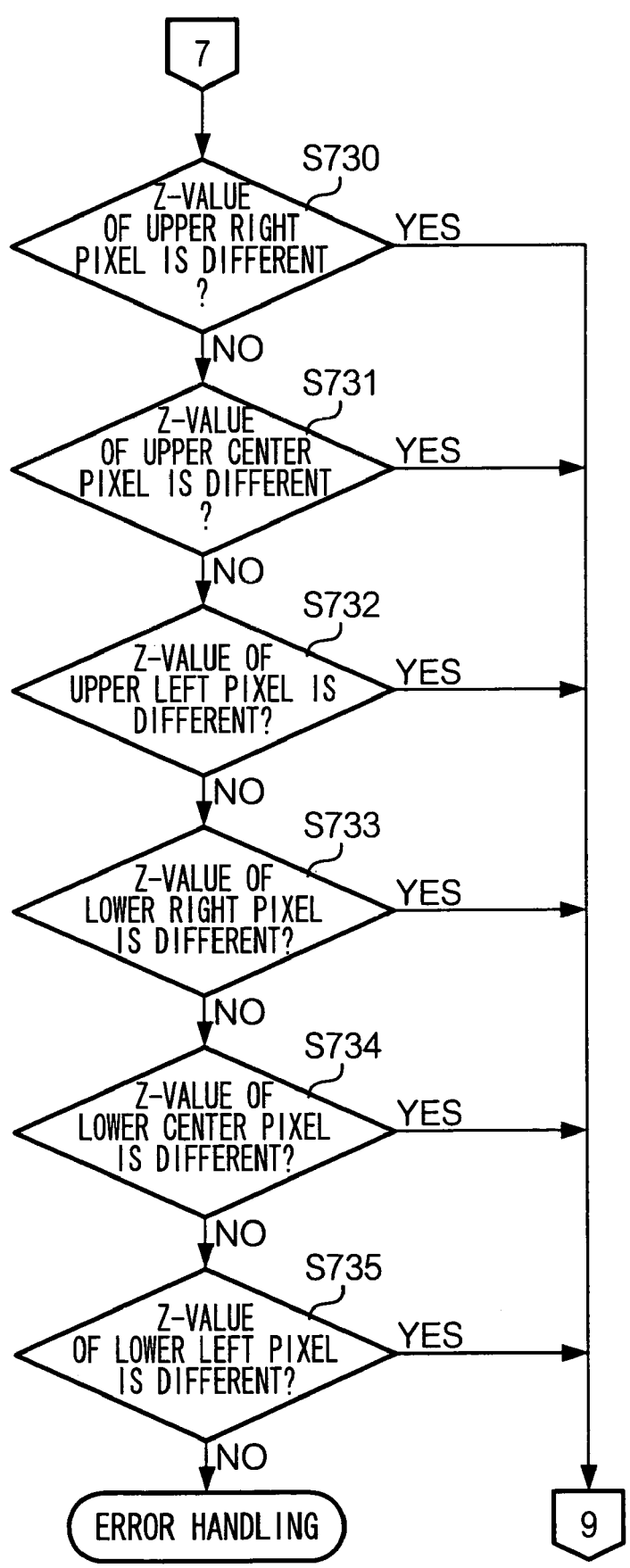
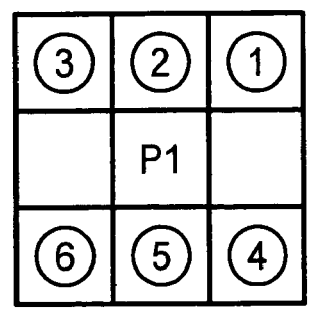

OBa

METHOD AND APPARATUS FOR GENERATING A STEREOGRAPHIC IMAGE

TECHNICAL FIELD

The present invention relates to a method and apparatus for generating three-dimensional image data by means of two-dimensional image data.

BACKGROUND ART

Humans are able to visually perceive three-dimensional objects in three-dimensional space. This ability is known as stereopsis. Stereopsis occurs when a human brain recognizes an object in three-dimensions on the basis of two images, received by the right and the left eyes, respectively. In other words, it is necessary for each of the right and the left eyes to receive an image for stereopsis to occur.

A technique called stereography has been developed, in which image processing is performed on a two-dimensional image so that a viewer can perceive the processed two-dimensional planar image as a three-dimensional image. Stereography involves an image processing technique of revising image data of a single two-dimensional planar image to generate image data for each of the right and left eyes. Specifically, the image data for each of the right and left eyes is generated by calculating a binocular parallax with regard to an object (subject) depicted in an image and displacing, according to the parallax, positions of pixels (dots) of the image in right and left directions, respectively.

For example, the parallax is determined by a value representative of the degree of a farness (or nearness) of an object (hereinafter referred to as a Z-value), which is calculated on the basis of at least one of saturation, brightness, and hue of the object. For example, Japanese patent JP2002-123842A discloses a method for determining a Z-value on the basis of saturation and brightness of the original 2D image. Specifically, the method includes: (a) a step of determining Z-values for each pixel on the basis of saturation of the image data; (b) a step of determining a contour line(s) of the object(s) included in the image; (c) a step of calculating an average of the Z-values of all pixels within the object, and (d) a step of determining that the average is a Z-value of the object. A parallax with respect to the object is determined on the basis of the Z-value of the object.

In addition, to improve perception of the generated 3D image, saturation of pixels near the object is changed so as to "blur" an edge of the object. It is to be noted that such a blurring process depends on an empirical rule, that is, the fact the farther away an object is located in an image, the fainter its image is (namely, the lower its saturation is), and the nearer the object is located, the sharper its image is (namely, the higher its saturation is). This is because edges of distant objects tend to be fine due to dust in the air and the like, blurring the object. Nearby objects increase in number and in saturation, and edges of the objects are thicker and thus look sharper.

However, there are images that do not follow the above rule, such as an image in which a bright sky is depicted at a far distance and a dark-colored forest at a near distance. In such a case, the rule on which a Z-value is calculated does not represent a true depth of objects. As a result, it is not possible to reproduce a correct parallax with the generated stereographic image, and a viewer is thus given an unnatural impression.

Further, in a case where a shadow or a highlight hangs over a certain portion of an object, in other words in a case where a variation of saturation within the object is considerable, it is not possible to calculate a true Z-value of the object. As a result, a generated stereographic image gives a viewer an impression that only the overhanging portion is projected (or recessed) locally. In this case, since it is not possible to determine an edge of objects precisely, the blurring process cannot contribute to improvement of plasticity of the 3D image.

Still further, in a highlighted portion of an object in which a Z-value becomes larger, a parallax of that portion is overestimated accordingly. As a result, a phenomenon will occur in which adjacent pixels in an original 2D image are displaced in opposite horizontal directions when generating a stereographic image. This phenomenon is called a pixel crossing, generating a distorted portion in the generated stereographic image. As a result, a quality of a generated stereographic image is reduced to such an extent that it cannot be appreciated by a viewer. Occurrence of this phenomenon is especially serious at a position where a number of objects overlap. At such a position, distortion of the image can occur easily; thus it becomes significantly difficult to achieve natural perception of a stereographic image for a viewer.

As is described above, since it is not possible in the prior art to calculate a correct Z-value from an original image data to generate a stereographic image, generation of a realistic stereographic image is difficult.

SUMMARY OF THE INVENTION

The present invention has been made, taking into account the above background art, to provide a method for generating stereographic image data that gives a viewer an impression of natural plasticity, and an apparatus for generating stereographic image data adapted to the method. The present invention is a result of the applicant's continuing studies on necessary conditions for giving a human a strong impression of plasticity.

A method for generating a stereographic image according to the present invention is characterized by comprising: a calculating step of calculating Z-values of pixels on the basis of image data of pixels, the pixels forming an image, each Z-value being assigned to a pixel, and each Z-value representing a depth of an object corresponding to the pixel; an adjusting step of adjusting a Z-value of a target pixel obtained in the calculating step using a Z-value of a pixel other than the target pixel; and a generating step of determining an amount of displacement of a target pixel on the basis of an adjusted Z-value of the target pixel, and displacing the target pixel horizontally by the determined amount, to generate images for the right and the left eyes. By adjusting Z-values, a stereographic image which provides a viewer with natural plasticity is generated.

In a preferred embodiment, in the calculating step the weights are determined based on the ratio of cone cells sensitive of R, G, and B, respectively, which cones exist in a retina of a human eye.

It is possible that in the adjustment step Z-values of pixels are adjusted so that a single step available for a Z-value of a pixel corresponding to an object located backward in an original image express deeper depth than a single step available for a Z-value of a pixel corresponding to an object located forward in the original image.

It is possible that in the adjusting step an average of Z-values of pixels within an area which includes a target pixel is obtained and a Z-value of the target pixel is replaced by the obtained average.

Further, it is possible that in the adjusting step a distribution of the Z-values of all pixels in the image and an average of all pixels in the image are obtained and deviation of the distribution is corrected using the obtained average.

Still further, it is possible that in the adjusting step at least one object in the image represented by the image data is identified referring to Z-values of pixels calculated in the calculating step and a Z-value of the target pixel is adjusted on the basis of a Z-value of a pixel located within an area corresponding to the identified object.

Still further, it is possible that in the adjusting step any one of a step size of quantization of the Z-value, and an upper limit and a lower limit of the calculated Z-value is determined based on a value of a parameter specified by a user.

Still further, it is possible that in said adjustment step tendency of Z-values of pixels in the image is analyzed by comparing a Z-value of a pixel within an area with a Z-value of a pixel within another area, and when a result of the analysis agrees with a predetermined condition, a quantitative relation between the amount of displacement of the target pixel and the Z-value of the target pixel is reversed in the generating step.

In a preferred embodiment, it is possible that the stereographic image generating apparatus further comprises a step of obtaining moving images comprised of a plurality of images, and wherein a stereographic image is generated from each image, to generate stereographic images corresponding to the moving images in real time.

A stereographic image generating apparatus for generating a stereographic image according to the present invention is characterized in comprising: a calculating means for calculating Z-values of pixels on the basis of image data of pixels, the pixels forming an image, each Z-value being assigned to a pixel, and each Z-value representing a depth of an object corresponding to the pixel; an adjusting means for adjusting a Z-value of a target pixel obtained in the calculating means using a Z-value of a pixel other than the target pixel; and a generating means for determining an amount of displacement of a target pixel on the basis of an adjusted Z-value of the target pixel, and displacing the target pixel horizontally by the determined amount, to generate images for the right and the left eyes. It is possible that the apparatus further comprises an obtaining means for obtaining from a user a parameter used in said adjusting means.

The present invention also provides a computer program for functioning a computer as the stereographic image generating apparatus. It is possible that the program is stored in a various types of storage media and is download via a network, so as to be installed in the computer.

BRIEF DESCRIPTION OF THE DRAWINGS

FIG. 2 is a schematic diagram illustrating an example of a screen displayed by a 3D image drawing application.

FIG. 8 is a schematic diagram illustrating a format of data of an image.

FIG. 17 is a conceptual diagram illustrating a distribution adjustment.

FIG. 23 is a flowchart showing the contour determination (cont'd).

BEST MODE FOR CARRYING OUT THE INVENTION

Detailed description of the preferred embodiments of the present invention will now be described with reference to the accompanying drawings.

FIRST EMBODIMENT

<A. Configuration of the Apparatus>

Figure 1:
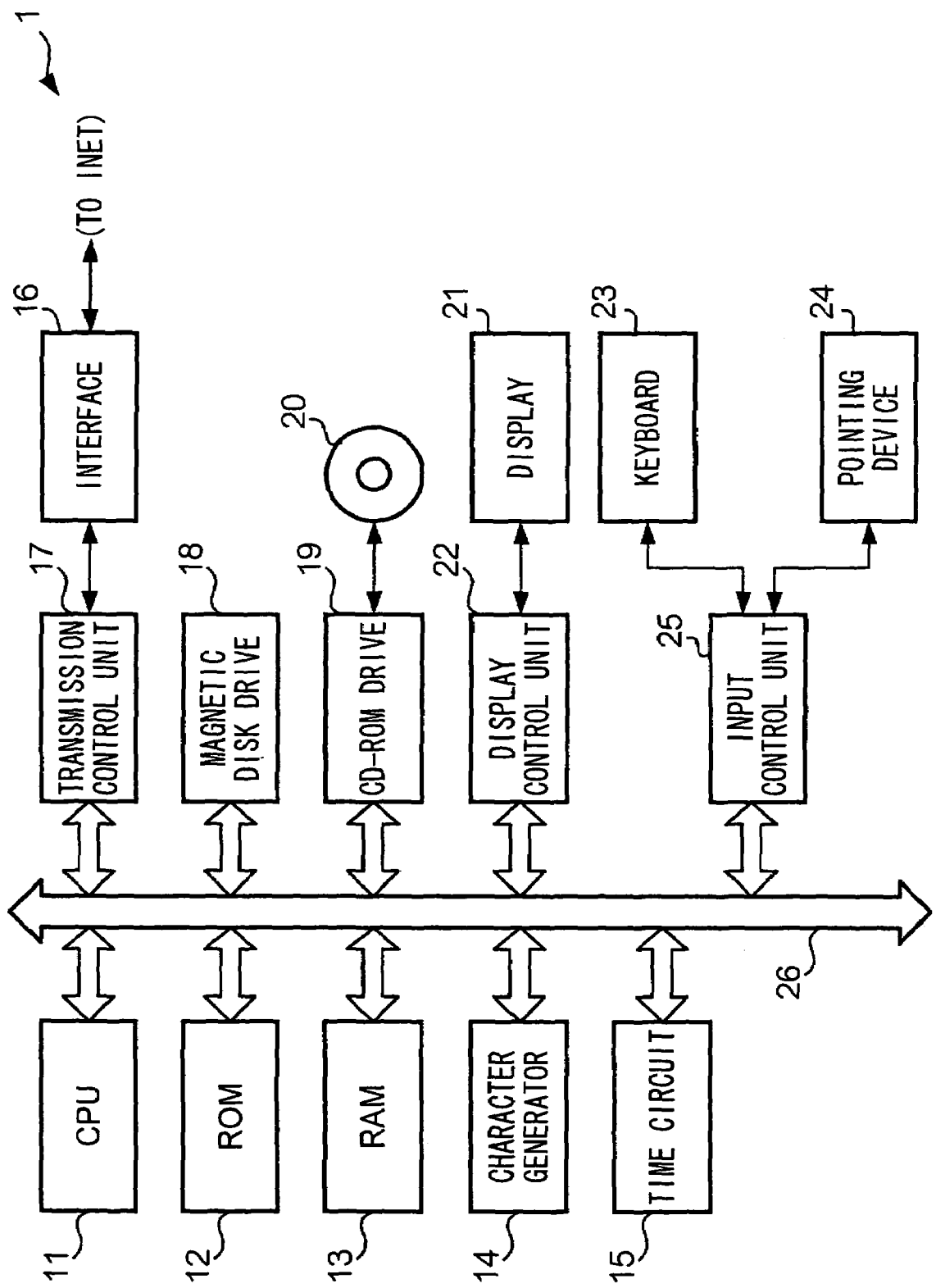
FIG. 1 is a block diagram illustrating an example of a 3D image generation apparatus according to the first embodiment of the present invention.

FIG. 1 shows a 3D image generating apparatus 1 of the first embodiment of the present invention. In FIG. 1, a CPU (central processing unit) 11 controls all units of 3D image generation apparatus 1 to perform processing including generation of stereographic image data. A ROM (read only memory) 12 is employed to store programs, one of which is executed when the apparatus is turned on, and related data. A RAM (random access memory) 13 is employed as a work area of CPU 11.

A Character generator 14 generates font data to be displayed on a display. A Time circuit 15 outputs a current time. An Interface 16 connects 3D image generation apparatus 1 to the Internet (not shown). A Transmission control unit 17 transmits and receives data to and from terminals connected to the Internet.

A Magnetic disk drive 18 stores programs for performing image processing executed by 3D image generation apparatus 1, including an OS program and data generated in the image processing steps. A CD-ROM drive 19 is employed to read out image data stored in a CD-ROM 20. A Display 21 includes a CRT, LCD or the like, which displays an image under control of a Display control unit 22.

A Keyboard 23 is a standard full-sized keyboard which enables a user to input instructions. A Pointing device 24 is an input device such as a touch panel for a user to input instructions. An Input control unit 25 obtains instructions input via Keyboard 23 and Pointing device 24 to be output to CPU 11.

CPU 11, ROM 12, RAM 13, Character generator 14, Time circuit 15, Transmission control unit 17, Magnetic disk drive 18, CD-ROM drive 19, Display control unit 22, and Input control unit 25 are connected to an Internal bus 26. Thus, data is transferred between those units via Internal bus 26.

In generating 3D image data CPU 11 executes an application for displaying a 3D image, the application being stored in ROM 12. An example of a screen displayed in Display 21 when the application is running is depicted in FIG. 2.

As shown in FIG. 2, the screen displayed when the application is running is comprised of a main screen MD and a menu bar MB which includes menu items. Moving images selected by a user are displayed in Main screen MD.

Items MI through MI10 are displayed in Menu bar MB. Item MI1 is selected for identifying an image on which a user wishes to perform image processing. Item MI2 is selected for setting display preferences of a stereographic image. Item MI3 is selected for storing data of a stereographic image. Item MI4 is selected for terminating the application. Item MI5 is selected for starting to display moving images on Main screen MD. Item MI6 is selected for terminating displaying moving images on Min screen MD. Item MI7 is selected for pausing display of moving images in Min screen MD.

Item MI8 shows a mode (either normal (2D) mode or stereogram (3D) mode of moving images displayed on Main screen MD), and is selected for switching these modes. Specifically, MI8 is changed between normal (2D) and stereogram (3D) modes when selected by a user. The upper and the lower figures of FIG. 2 represent a screen when 2D mode and 3D mode are in effect, respectively.

Item MI9 is selected for specifying a mode of effecting a combining scheme (either odd/even mode or anaglyph mode). It is assumed in this embodiment that only these two schemes are available. However, it is possible to add other modes corresponding to other combining schemes for effecting stereopsis. Specifically, in combining images to obtain a single stereographic image, it is possible to employ a combining scheme in which four images corresponding to four viewpoints are used. Further, it is possible to employ a stereopsis scheme in which eight or nine images corresponding respectively to eight or nine viewpoints which are selected by a user are used.

Item MI10 indicates a mode of effecting a projection direction, one of which is an F1 mode that gives a viewer of the stereographic image a visual impression that a three-dimensional image is recessed relative to the surface of the screen, and the other of which is an F2 mode that gives a viewer of the stereographic image a visual impression that a three-dimensional image is projected frontward relative to the surface, and is used for switching these mode. In both screens depicted in FIG. 2 F1 mode is selected; thus, a viewer will perceive that a three-dimensional image is recessed relative to the surface.

Figure 3:
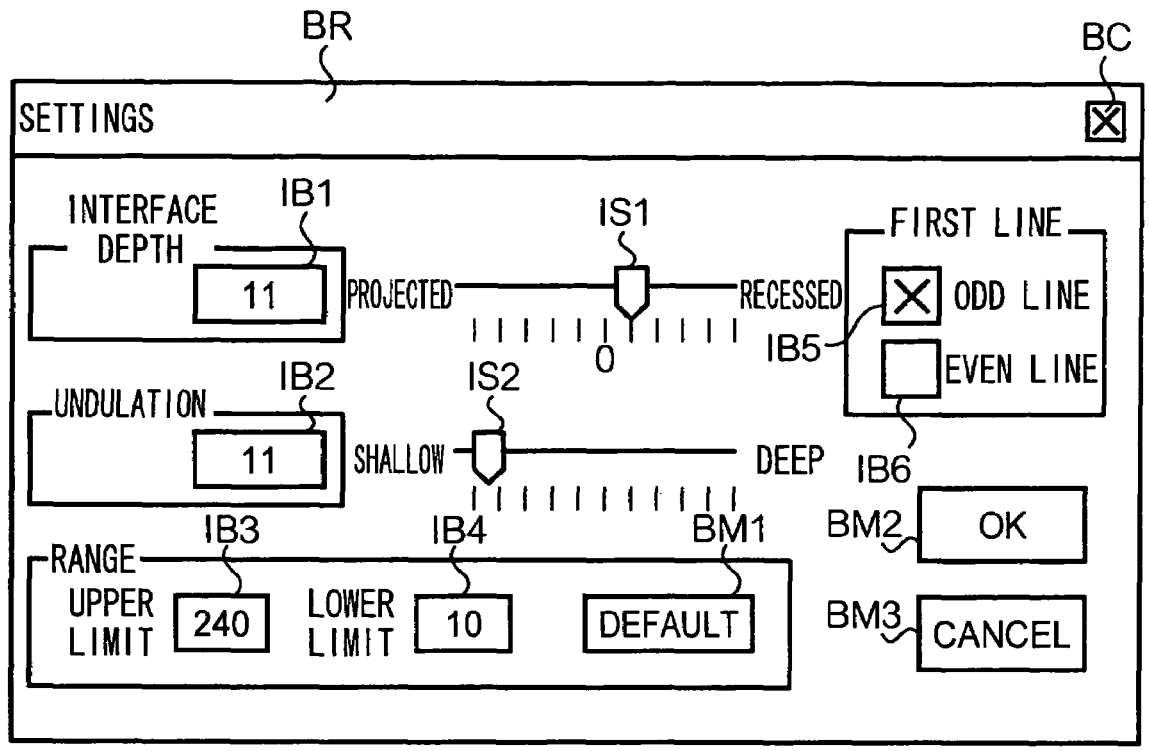
FIG. 3 is a schematic diagram illustrating an example of a configuration of a setting dialogue panel.

FIG. 3 shows an example of a dialogue panel displayed in display 21 when a user clicks Item MI2. As shown in FIG. 3, a Title bar BR is located in the upper side of the screen, in which a Close box BC for causing this dialogue panel to close is located.

Sliders IS1 and IS2, Input boxes IB1, IB2, IB3, and IB4, Check boxes IB5 and IB6, and buttons BM2 and BM3 are arranged in the setting dialogue panel. A user can operate slider IB1 to specify a value of an interface depth. The value of "an interface depth" specified by the user is displayed in Input box IB1. It is possible for the user to input a number directly in Input box IB1.

It is to be noted that interface depth represents a perceived degree of being recessed (or projected frontward) of an image relative to the surface of the screen. Thus, the larger the interface depth is, the more the three-dimensional world is perceived to be projected (or recessed). For example, a stereographic image which is generated by combining an image for the left eye of a user in which pixels are displaced leftward on the basis of a parallax, and an image for the right eye of the user in which pixels are displaced rightward is perceived by the user as if the world is recessed relative to the surface; if the pixels of both images are moved in the opposite directions, a user will perceive that the stereographic image is projected frontward.

A user can move Slider IS2 to specify a value of "undulation". The value specified by the user is displayed in Input box IB2. It is possible for a user to directly enter a number in Input box IB2. It is to be noted that the undulation indicates a difference of altitudes between the farthest (deepest) point and the nearest (shallowest) point in a stereographic image. Thus, the bigger the undulation is, the more the undulation is emphasized. On the contrary, a user perceives that the world is flatter with a smaller undulation.

A user can enter the maximum and the minimum values of "an object depth" in Input boxes IB3 and IB4, respectively. An object depth is assigned for a single object included in an image, which is a parameter representative of a position of the object in perceived depth (the degree of being projected frontward or backward relative to the surface of the screen). Button BM1 is used for setting the maximum and the minimum values of an object depth to a default value.

A user can specify a first line to be depicted (either an odd-numbered line or an even-numbered line) by checking either a Check box IB5 or IB6. When the button BM2 is pressed, the current settings are set. When the button BM3 is pressed, the current settings are cancelled and the previous setting is set. Parameters set via this dialogue panel are used in image processing which will be described later.

There are various schemes using a pair of images for effecting stereopsis for a viewer. In this embodiment, a so-called odd-even scheme should be adopted. In this case, with a polarizing stripe filter placed on a screen of display 21, a user wearing polarized glasses is able to perceive an image on the screen three-dimensionally.

Figure 4:
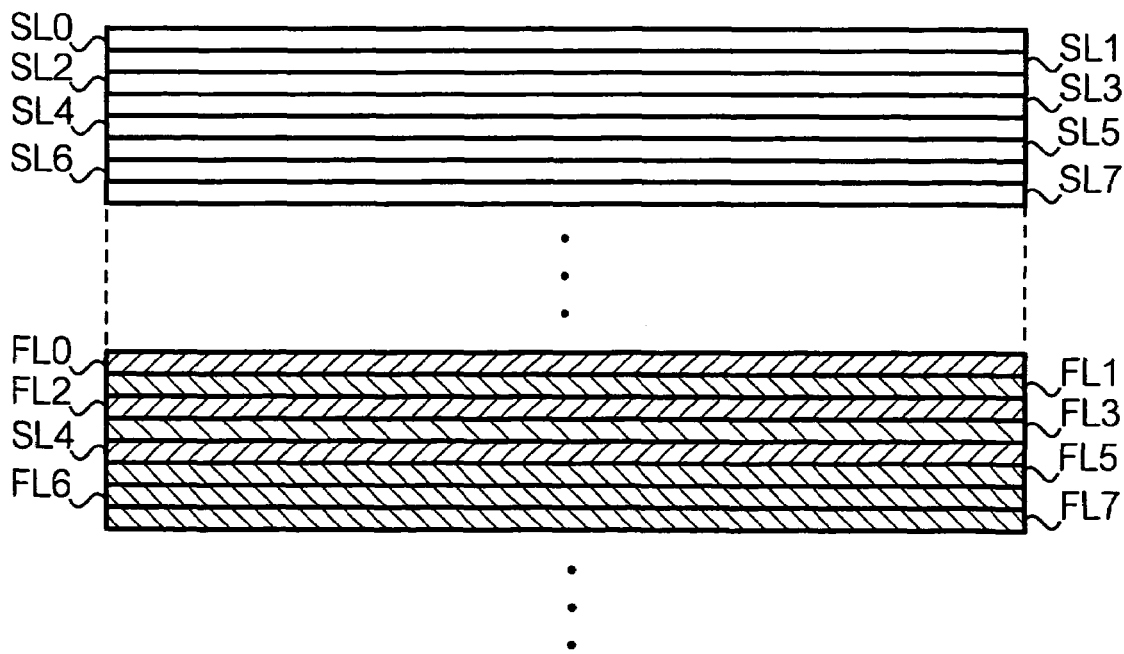
FIG. 4 is a schematic diagram illustrating a mechanism of displaying a 3D image according to the first embodiment of the present invention
Figure 5:
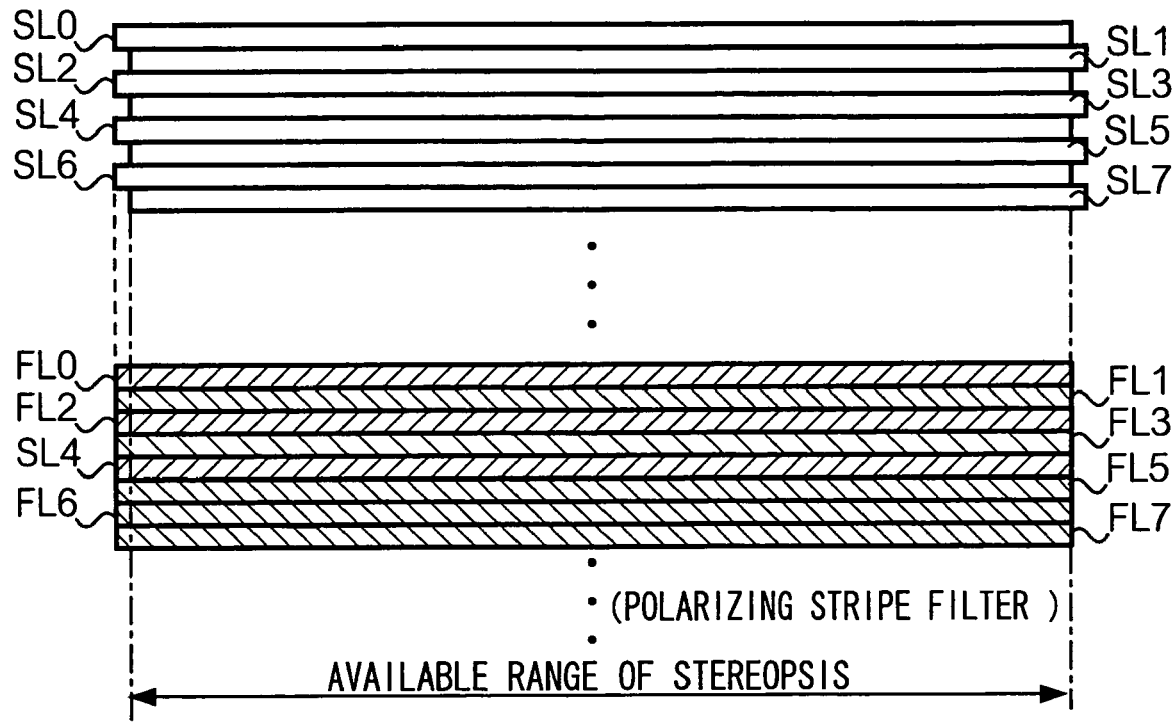
FIG. 5 is also a schematic diagram illustrating a mechanism of displaying a 3D image according to the first embodiment of the present invention.

More specifically, as shown in FIG. 4, Polarized stripe filters for the left eye FL0, FL2, . . . , having a predetermined width and length are placed, at regular intervals, over even-numbered lines of the horizontal scanning lines of the screen SL0, SL2, . . . , respectively. Over the odd-numbered lines of the screen SL1, SL3, . . . , Polarizing filters FL1, FL3 having a predetermined width are placed at regular intervals, respectively. As shown in FIG. 5, image data for the left eye is displayed in the even-numbered lines of Display 21 SL0, SL2, . . . , and image data for the right eye is displayed in the odd-numbered lines of Display 21 SL1, SL3, . . . . A polarization direction of Polarization stripe filters for the left eye FL0, FL2, . . . are orthogonal to a direction of polarization stripe filters for the right eye FL1, FL3, . . . .

Figure 6:
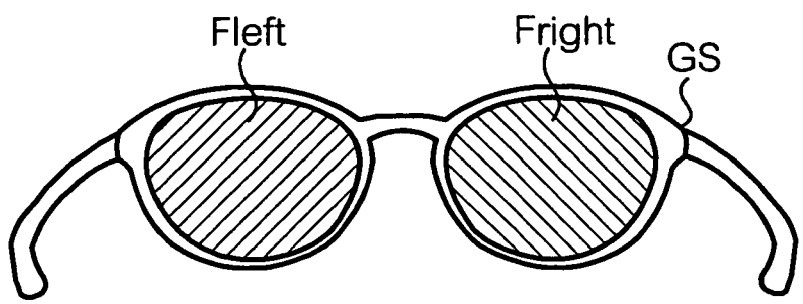
FIG. 6 illustrates anaglyph glasses.

As shown in FIG. 6, a filter for the left eye Fleft and a filter for the right eye Fright are placed in Polarized glasses GS. Polarization directions of Fleft and Fright are the same as the directions of the polarization filters for the left and the right eye, respectively.

When a user watches the screen of Display 21 wearing Polarized glasses GS, light originated at the even-numbered lines of Display 21 SL0, SL2, . . . are transmitted through Polarizing filters FL0, FL2, . . . ; thus, the light reaches the left eye of the viewer through the filter Fleft, but does not reach the right eye of the viewer since the filter Fright cuts the light. On the contrary, light originated at the odd-numbered lines of Display 21 SL1, SL3, . . . are transmitted through Polarizing filters FL1, FL3, . . . , and then reach the right eye of the viewer, but the light does not reach the left eye of the viewer with the filter Fleft. Thus, images intended for the left and the right eyes are subjected to the left and right eye, respectively, thereby enabling the viewer to perceive a displayed image three-dimensionally.

<B. Image Processing>

Figure 7:
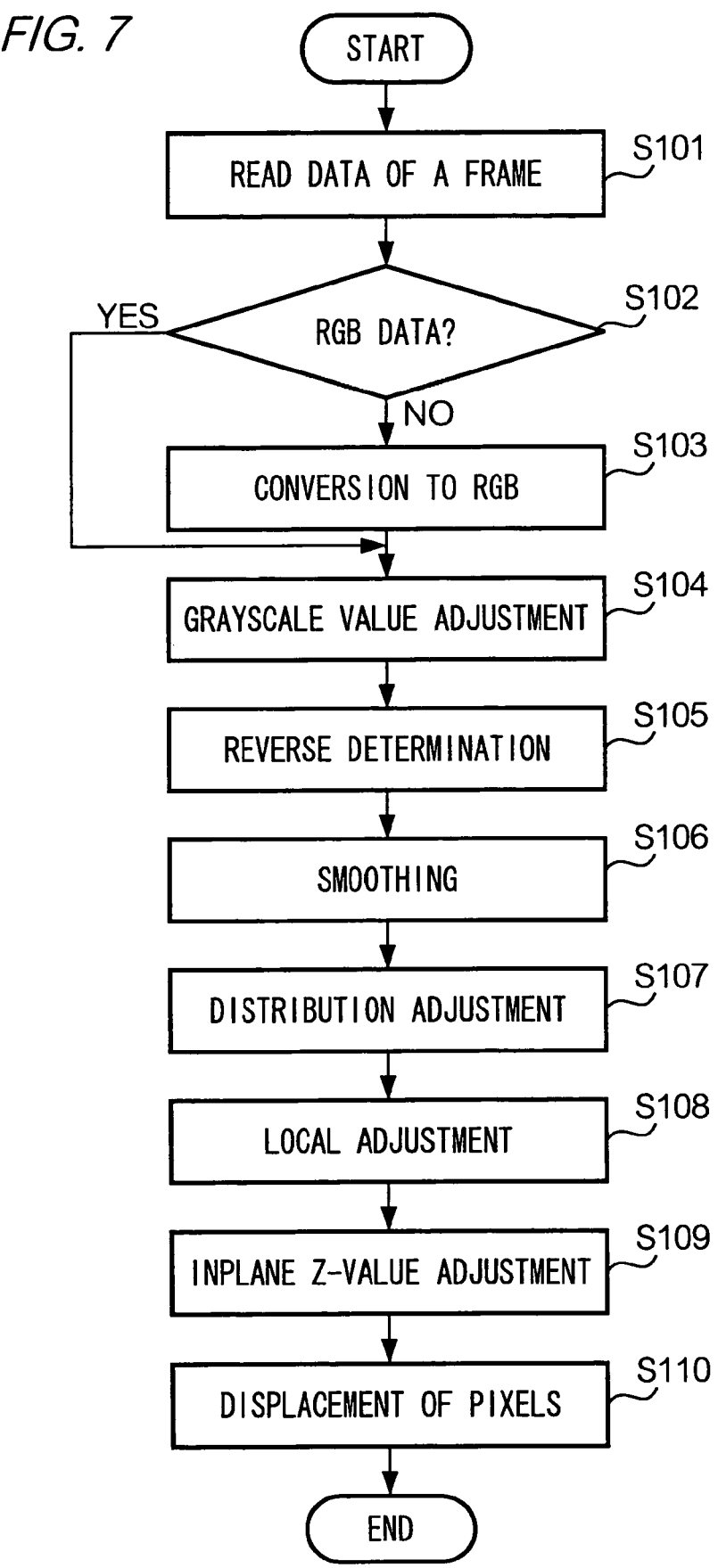
FIG. 7 is a flowchart showing image processing performed when a 3D mode is selected.

FIG. 7 shows a flow of an image processing performed by 3D image generating apparatus 1 in a case where a user has performed a predetermined operation to select 3D mode when the application displaying a 3D image is running.

At first, CPU 11 reads data of a single frame of color moving images (step S101), and checks whether the data is in RGB format (step S102). In a case where the data is not in RGB format, CPU 11 converts the data to RGB format (step S103). The data of color moving images can be formatted in any type of formats. The data may be compressed. In a case where the data is compressed, decompression is employed before step S103. Color depth (bit depth) for a pixel of color moving image data may be 16, 24, or 32 bits.

Further, the color moving image data may be stored on Magnetic disk 18 or CD-ROM 20. Still further, the data may be input via a cable from an image reproducing device such as a DVD player. Still further, the data may be image data of a TV program broadcast via a satellite or cable, to be supplied from a TV set connected to 3D image generating apparatus 1. Still further, the data may be downloaded from a server on the Internet.

Next, CPU 11 calculates grayscale values of pixels on the basis of image data value (R value, G value, B value), and assigns the grayscale values to Z-values of the pixels (step S104, hereinafter referred to as a grayscale value adjustment).

After Z-values are determined for all the pixels, Z-values are adjusted through reverse determination (step S105), smoothing (step S106), distribution adjustment (step S107), and local adjustment (steps S108 and S109). Finally, the degree of displacement of a pixel is calculated on the basis of Z-values using the above adjustments. A single stereographic image is generated by displacing pixels (step S110). In the following, the adjustment processes are described in detail.

In the following description, a method for describing syntaxes and declaration of data types is assumed to be in conformity with C Language or an extension thereof (C++ etc.). In addition, in this embodiment, color image data is formatted by a color depth of 16, 24, or 32 bits, as described above. As shown in FIG. 8, in a case of 16 bits color image data, each pixel has data of 5 bits, 6 bits, and 5 bits corresponding to R, G, and B, respectively. In a case of 24 bits data, each pixel has data of 8 bits, 8 bits, and 8 bits corresponding to R, G, and B, respectively. In a case of 32 bits data, each pixel has data in which dummy data is added ahead of the 24 bits color image data.

<B-1. Grayscale Value Adjustment>

Grayscale value adjustment shown in Step S104 of FIG. 7 will now be described with reference to FIGS. 9, 10 and 11.

In the grayscale value adjustment, grayscale components of R, G, and B are modified using certain weights. Specifically, according to Equation (1) predetermined weights are respectively assigned to R, G, and B color components of each pixel, to revise a grayscale value.

$$Z=0.3*R+0.59*G+0.11*B \quad (1)$$

In a case of 16 bits data, available values for Z-value of a pixel range from 0 to 31. In a case of 24 or 32 bits data, the values range from 0 to 255. It is to be noted that the above weights 30%, 59%, and 11% are determined based on the ratio of cone cells sensitive to R, G, and B, respectively, which exist in the retina of a human. Although other weights may be employed, a stereographic image generated on the basis of a grayscale obtained by the above weights can give a viewer the most natural plasticity.

Next, a weight-adjusted grayscale value is further adjusted. If the grayscale value per se is employed to express a depth, in which a single step gradation corresponds to a unit of depth, both a gradation step width for a pixel corresponding to an object located in the frontward area and a gradation step width for a pixel corresponding to an object located in the backward area in an original 2D image represent the depth difference. In other words, such a grayscale value cannot correctly express a depth of an object in an original image. It is therefore required to revise a grayscale step so that a single step of a grayscale for a pixel corresponding to an object located in the backward area can express farther depth than a single step for a grayscale of a pixel corresponding to an object located in the frontward area. Specifically, a series $a_n$ (n=1, 2, 3 . . . ) is employed to represent grayscales of pixels corresponding to different depths. Z-values of pixels are modified according to an arithmetic series according to Equation (2) or a geometric series according to Elution (3), to assign a bigger depth unit to a pixel corresponding to an object located in the backward area than to a pixel corresponding to an object located in the frontward area.

$$a_n = a + (n-1)*d \quad (2)$$

$$a_n = a*r^{n-1} \quad (3)$$

where n is a positive integer, a is a first term, and the common difference d and the common ratio r, which represents correction factors, can be determined based on characteristics of the original 2D image.

In the following description, *src is a pointer representative of an address in which original image data src is stored, WD represents the number of pixels horizontally lined in the original 2D image, HT represents the number of pixels vertically lined in the original image, and *zinfo is a pointer representing an address to store a calculated Z-value. For example, if a data size of the original 2D image is 1024 dots by 768 dots, WD is 1024 and HT is 768.

Figure 9:
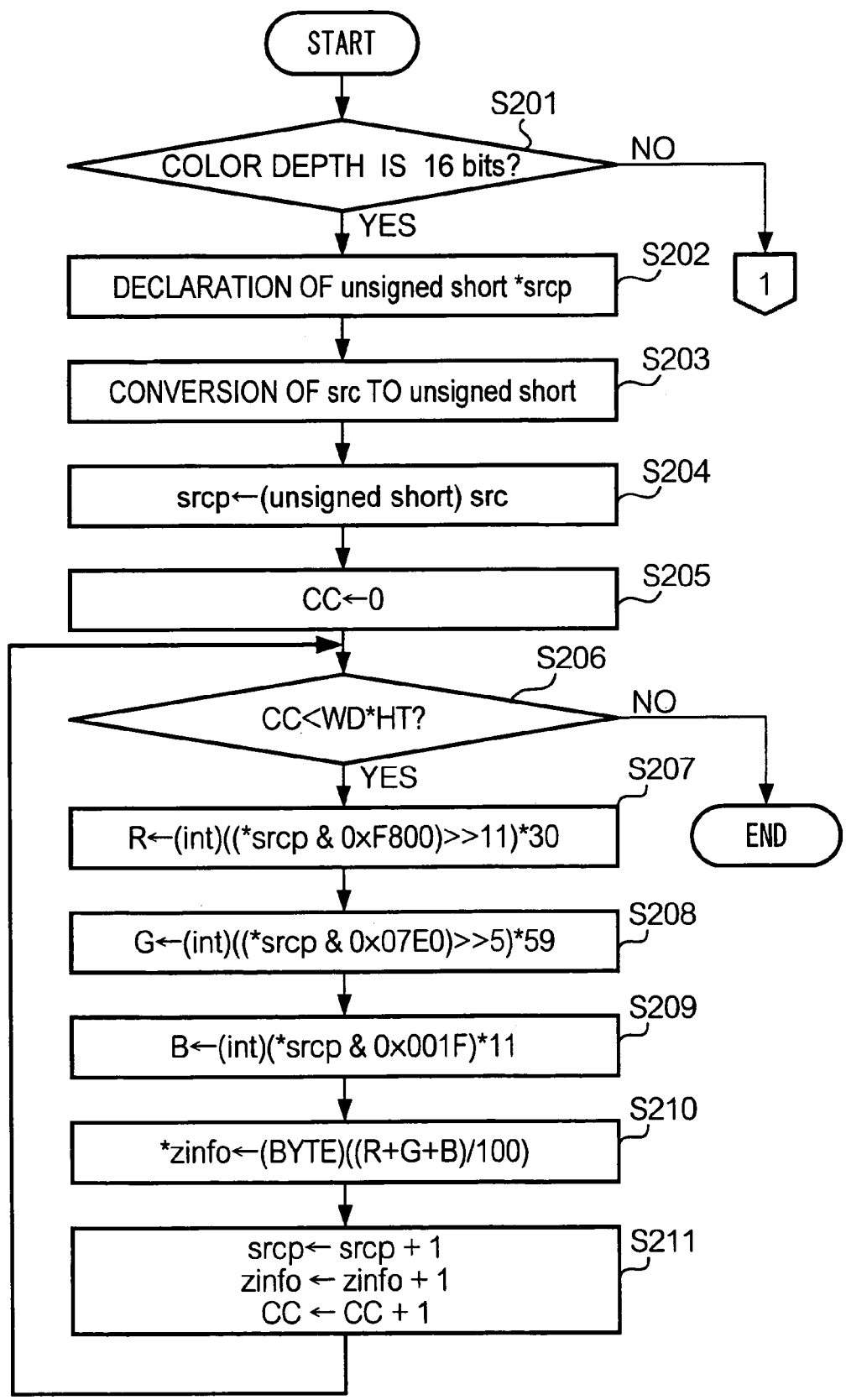
FIG. 9 is a flowchart showing a grayscale value adjustment.

First, as shown in FIG. 9, CPU 11 determines whether image data to be processed has a color depth of 16 bits (Step S201). When the color depth is 16 bits, a variable declaration unsigned short *srcp is carried out (Step S202), coercion of data of a target pixel is performed to obtain data in a form unsigned short (Step S203), and an address of the data src is assigned to the variable srcp (step S204).

Next, CPU 11 resets a value of a counter CC to 0 (Step S205). In Step S206 CPU 11 determines whether the value of the counter CC is smaller than WD*TH (Step S206). If the condition of Step S206 is not satisfied, CPU 11 determines that processing with respect to a an entire screen of pixels is completed, to end the grayscale value adjustment. If the condition of Step S206 is satisfied, grayscale value adjustment is performed in the following Steps S207 through S210. Specifically, in Step S207, with respect to R value, CPU 11 conducts an AND operation between 16 bits data stored in an area specified by the pointer *srcp and a hexadecimal F800 or 1111100000000000 in binary, performs an arithmetic shift right by five bits, and then multiplies by 30. Next CPU 11 performs a coercion with respect to the value calculated above so as to obtain an updated R value in int type (Step S207). Thus far, a value of the original R value multiplied by 30 is assigned to the variable R. In Step S208, with respect to G value, CPU 11 conducts an AND operation between 16 bits data stored in an area specified by the pointer *srcp and a hexadecimal 07E0, performs an arithmetic shift right by 6 bits, and then multiplies by 59. Next CPU 11 performs a coercion with respect to the value calculated above, so as to obtain an updated G value in int type (Step S208). As a result, a value of the original G value multiplied by 59 is assigned to the variable G.

In Step S209, with respect to the B value, CPU 11 conducts an AND operation between 16 bits data stored in an area directed by the pointer *srcp and a hexadecimal 001F, performs an arithmetic shift right by 5 bits, and then multiplies by 11. Next CPU performs a coercion with respect to the value calculated above, so as to obtain an updated G value in int type (Step S209). As a result, a value of the original G value multiplied by 11 is assigned to the variable B. Finally, CPU 11 assigns the sum of variables R, G, and B divided by 100 to an address identified by a pointer *zinfo (Step S210).

Thus far, processing with respect to a single pixel is finished, the variables srcp, zinfo, and a current value of the counter CC are incremented by 1 (Step S211), and the processing goes back to Step S206 to perform the above processing on another pixel. This processing is similarly performed on all the pixels within a screen.

Figure 10:
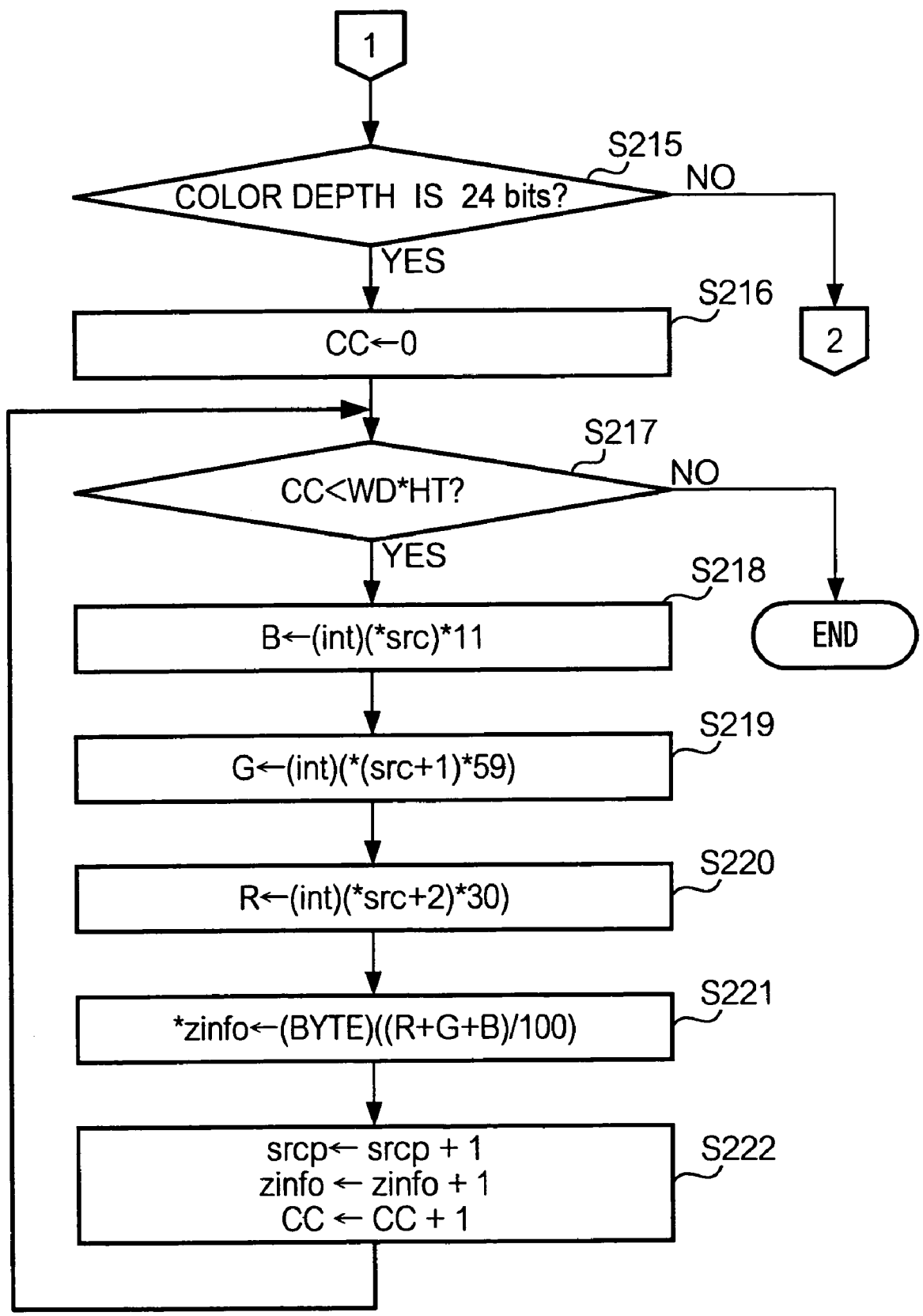
FIG. 10 is a flowchart showing the grayscale value adjustment (cont'd).
Figure 11:
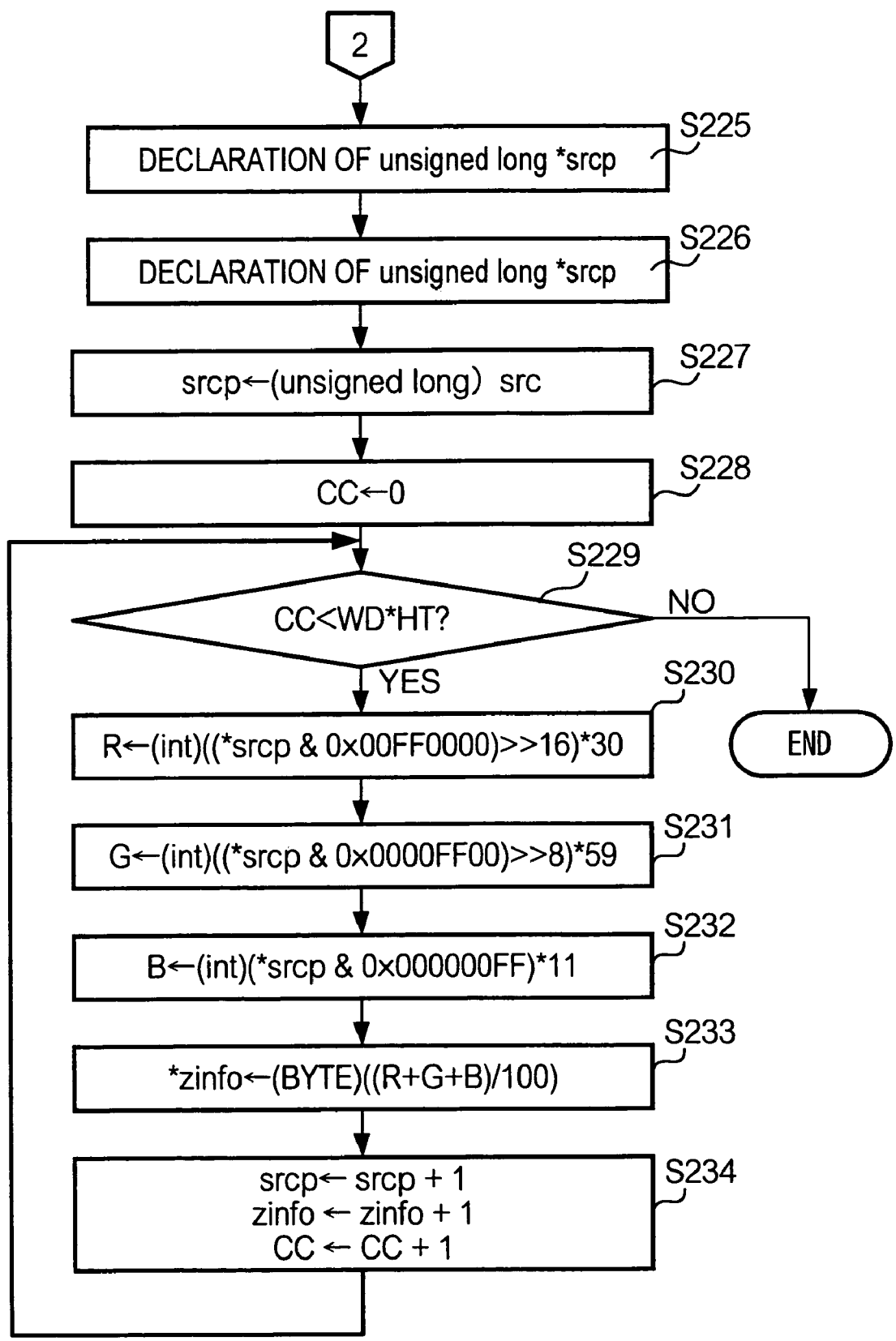
FIG. 11 is a flowchart showing the grayscale adjustment (cont'd).

In a case where the condition of Step S201 is not satisfied, CPU 11 further determines whether the image data is 24 bits formatted (Step S215 of FIG. 10). Next, as in Steps S205 and S206 shown in FIG. 9, the counter is reset (Step S216) and the determination of Step S217 is carried out.

Next, R, G, and B values are adjusted in a manner similar to a case of 16 bits data. Specifically, instead of Steps S207 through 209 shown in FIG. 9, Steps S218 through S220 shown in FIG. 10 are carried out. Specifically, as for the variable B, 24 bits data stored in an address specified by a pointer *src is multiplied by 11 to assign to the variable B (Step S218). Next, 24 bits data stored in an address specified by a pointer *(src+1) is multiplied by 59 to assign to the variable G (Step S219). Next, 24 bits data stored in an address specified by a pointer *(src+2) is multiplied by 30 to assign to the variable R (Step S220). The subsequent steps, including Steps 221 and 222, are similar to a case of 16 bits data.

If the condition of Step S215 is not satisfied, CPU 11 determines that a color depth of the data is 32 bits data. In this case, a variable declaration unsigned long *srcp is performed (Step S225 of FIG. 11), and a type of data of a target pixel is converted to unsigned long (Step S226), and an address of data src is assigned to the variable srcp (Step S227). Next, similarly to a case of 16 bits data , the counter is reset (Step S228) and the terminate check is performed in Step S229.

In Steps S230 through S232, R, G, and B values are adjusted. Specifically, an AND operation between 32 bits data stored in an address specified by a pointer *srcp and a hexadecimal 00FF0000 is conducted, and an arithmetic shift right by 16 bits is carried out and then multiplied by 30. Data type of the value is converted to int type, and finally the value is assigned to the variable R (Step S230). As a result, a value of the original 8 bits R value multiplied by 30 is assigned to the variable R.

Next, CPU 11 conducts an AND operation between 32 bits data and a hexadecimal 0000FF00, performs an arithmetic shift right by 8 bits, and then multiplies it by 59, so as to assign original G value multiplied by 59 to the variable G. As a result, G value multiplied by 11 is assigned to the variable B. Next, CPU 11 conducts an AND operation between 32 bits data stored in an area specified by the pointer *srcp and a hexadecimal 000000FF, and multiplies it by 11. This data is converted to int type data to be assigned to the variable B (Step S232). As a result, B value multiplied by 11 is assigned to the variable B. Subsequent steps are similar to a case of 16 and 24 bits data.

<B-2. Reverse Determination>

Figure 12:
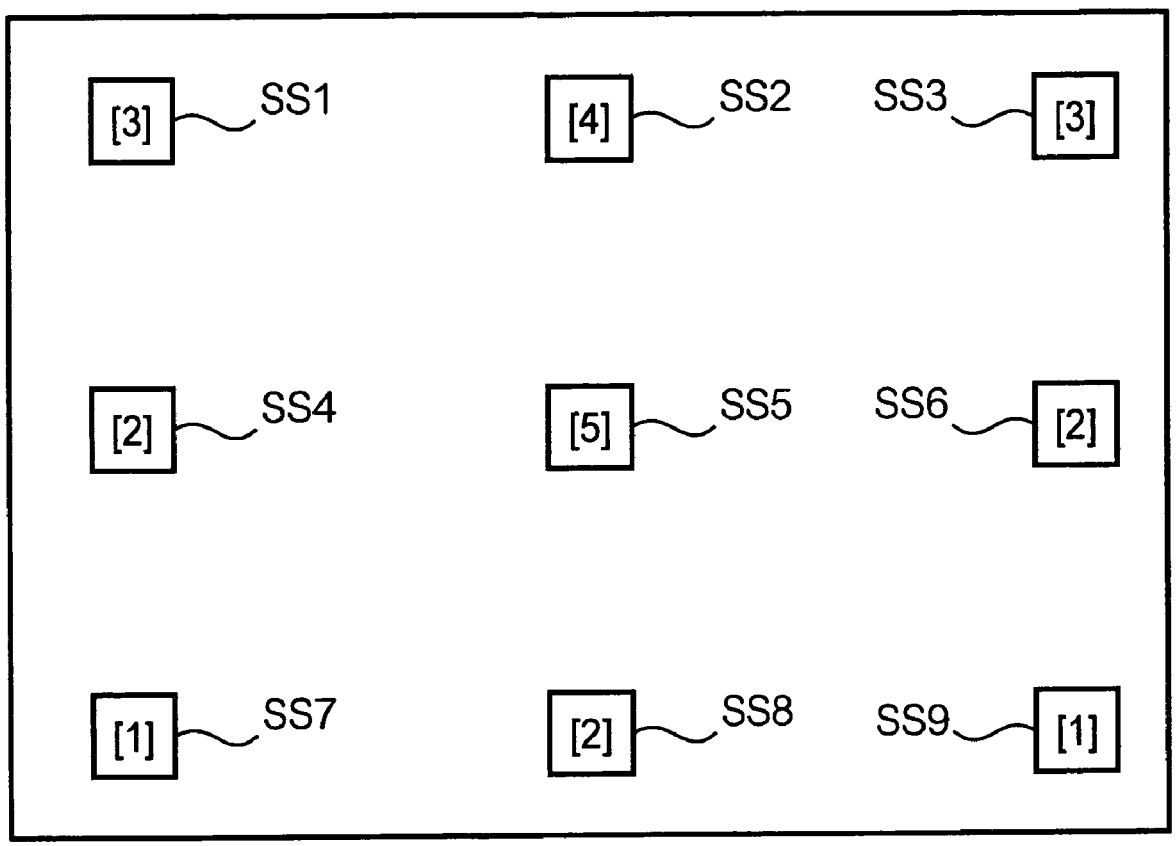
FIG. 12 is a diagram illustrating sampling areas and corresponding weight coefficients used in a reverse determination.
Figure 13:
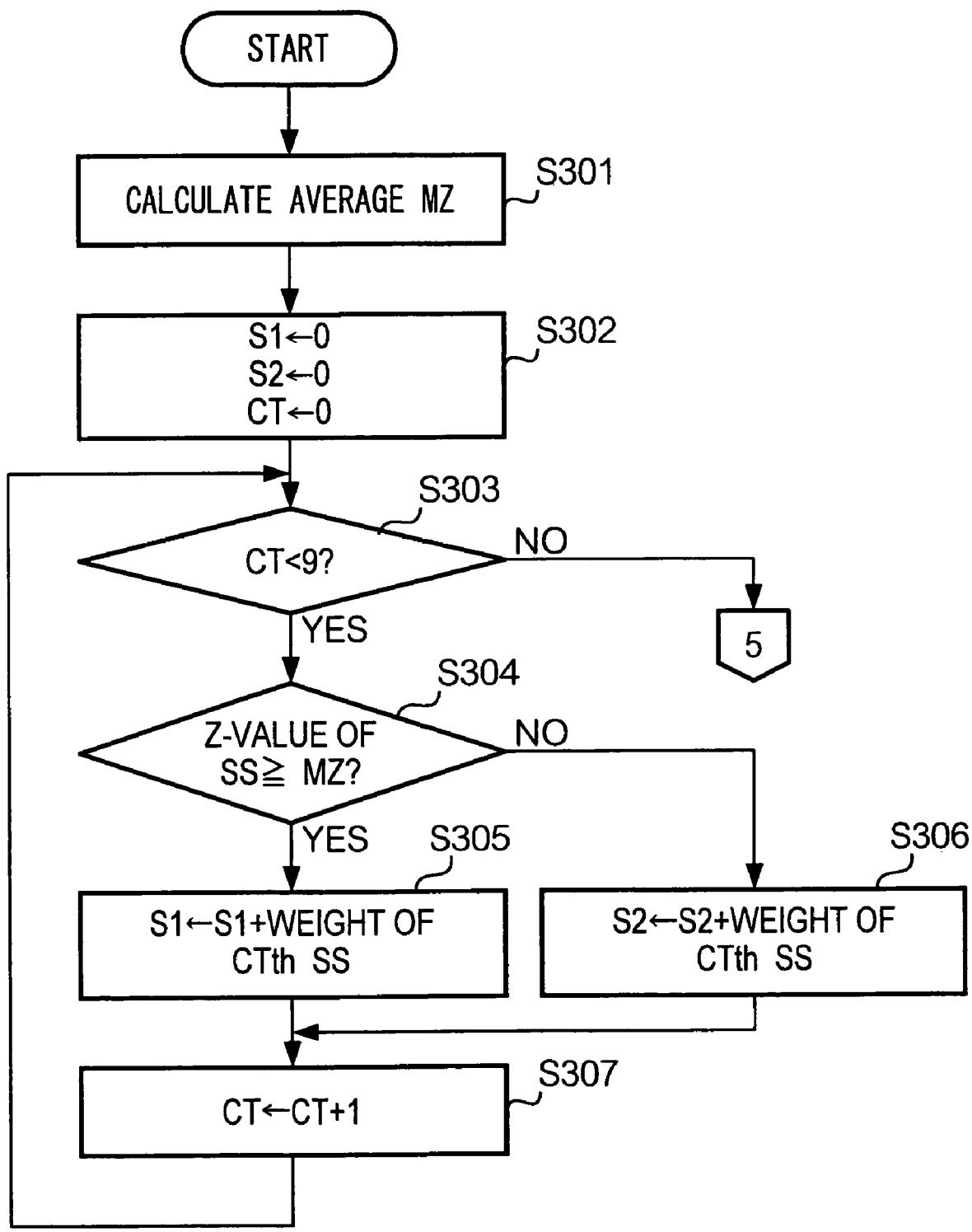
FIG. 13 is a flowchart showing the reverse determination.
Figure 14:
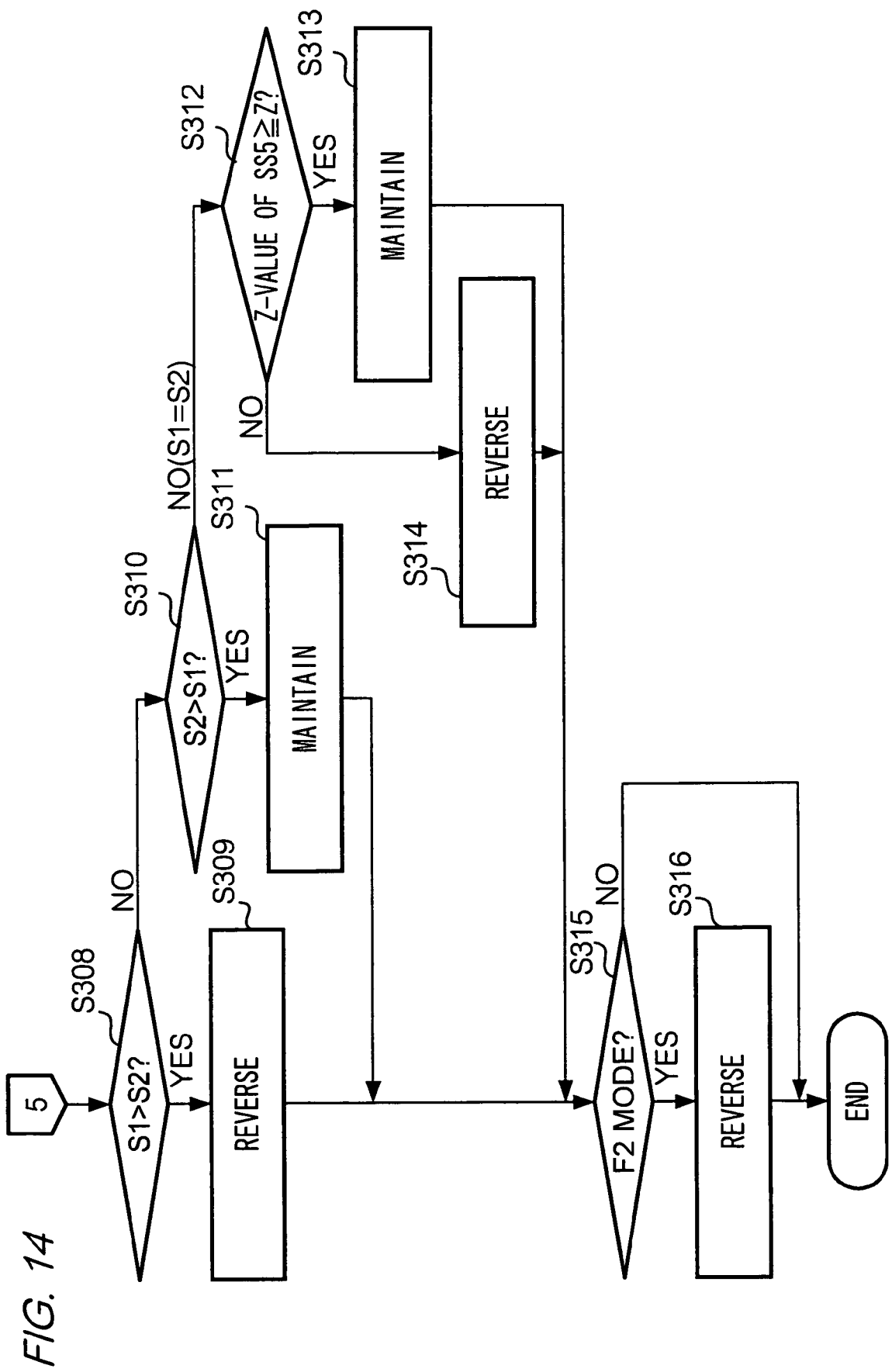
FIG. 14 is a flowchart showing the reverse determination (cont'd).

Referring to FIGS. 12 through 14, the reverse determination of Step S105 of FIG. 7 will now be described. In the reverse determination, a Z-value calculated in Step S104 is adjusted so as to trigger natural plasticity.

As described above, it is enough, in principle, for generating a stereographic image only to determine the amount of displacement of a pixel on the basis of a Z-value of the pixel. The amount of displacement is, for example, determined in direct proportional to a Z-value calculated in Step S104. Accordingly, a viewer of a stereographic image perceives that an object having a larger Z-value ("brighter" object) is located in the near side and an object having a smaller Z-value ("dimmer" object) is located in the far side. Thus, when a dimmer object is actually disposed in a far side and a brighter object is actually disposed in a near side in an original 2D image, a 3D image generated from that 2D image will successfully trigger natural and realistic plasticity.

However, there is a case where an original 2D image which includes an object having a large Z-value should be disposed in the far side and an object having a small Z-value should be disposed in the near side; for example, when a dim object is disposed in a bright background (e.g. blue sky). In this case, if the amount of displacement is simply determined in direct proportion to a Z-value of the pixel, a generated 3D image will trigger unnatural plasticity since the positional relation of objects between far and near is reversed.

In light of the above, in the reverse determination, tendency of Z-values in an original 2D image is analyzed, and whether to reverse a qualitative relation between the amount of displacement and a Z-value is determined on the basis of the deviation. Specifically, as shown in FIG. 12, a screen displaying data of an original 2D image is divided into the upper left, upper center, upper right, middle left, middle center, middle right, lower left, lower center, and lower right areas SS1 though SS9 (hereinafter referred to as "sampling areas"), each of which is 8 pixels in width and 8 pixels in length. It is possible to modify the size and the number of the sampling areas.

Each sampling area has a weight. Specifically, 3, 4, 3, 2, 5, 2, 1, 2, and 1, are assigned to areas SS1, SS2, SS3, SS4, SS5, SS6, SS7, SS8, and SS9, respectively. Although it is possible to employ other weights, the weights are determined on the basis of a general tendency relating to an object in an image. "General tendency" is an empirical rule that the upper portion of an image is more likely to include a background (e.g. a blue sky) than the lower portion of the image, and that, in a case where an image is a picture including, for example, a man or a flower, an object is usually disposed in the center of the image. According to the general tendency, it is preferable to assign the largest weight to a central area and larger weights to the upper areas than to the lower areas.

Referring to FIGS. 13 and 14, a flow of the reverse determination will be described in detail. At first CPU 11 calculate an average of Z-values of all the pixels of data of an image (Step S301). Next, CPU 11 resets values of variables S1 and S2, and a counter CT to 0 (Step S302). The variables S1 and S2 are parameters that represent weights of areas having weights larger than and smaller than an average weight of all the pixels in the screen, respectively. A value of the counter CT represents the number of sampling areas for which the reverse determinations have already been performed.

Next, it is checked whether a current value of the counter CT is smaller than 9 (Step S303), to determine whether the reverse determination has been performed on all of the sampling areas SS. If the condition of Step S303 is satisfied, whether an average of Z-values of pixels within a target sampling area is larger than the average value MZ is checked (Step S304).

If the condition of Step S304 is satisfied, a weight of the CTth sampling area is added to the variable S1 (Step S305). If the condition of Step S304 is not satisfied, the weight of the CTth sampling area is added to the variable S2 (Step S306). Next, a value of the counter CT is incremented by 1 (Step S307), and the process goes back to Step S303 to perform the processing on another sampling area.

When the reverse determination is finished for all the 9 sampling areas (Step S303, NO), the processing goes to Step S308 of FIG. 14, in which it is checked whether the variable S1 is larger than the variable S2. In a case where S1>S2 (Step S308, YES), a qualitative relation between the amount of displacement and the Z-value is reversed (Step S309). In a case where the condition of Step S308 is not satisfied (Step S308, NO), it is checked whether S1 is smaller than S2 (Step S310). In a case where S1<S2 (Step S310, YES), the qualitative relation is not reversed (Step S311). In a case where S1>S2 and S1<S2, namely, S1=S2 (Step S310, NO), it is checked whether an average of the Z-values of the sampling area SS5 is larger than the average MZ (Step S312). If the condition of Step S312 is satisfied, the relation is not reversed (Step S313); if the condition is not satisfied, the relation is reversed (Step S314).

It is possible to employ another check as described below. Specifically, a sampling area(s) in which an average Z-value of pixels within the area is larger than an average Z-value of all pixels included in the image is specified, and the sum of the weights of the specified areas is obtained. If the sum is larger than a predetermined threshold, the relation between the amount of displacement and the Z-values is reversed, since the original 2D image has a tendency in which an object disposed in the near side is dimmer and an object disposed in the far side is brighter. If the sum is lower than the predetermined threshold, the relation is maintained.

Next, CPU 11 checks whether the item MI1 of the application for displaying a 3D image is set to F2 mode (frontward projection view) (Step S315). When F2 mode is effected, the relation which has or has not been reversed in Steps S309, S311, S313, and S314 is reversed or further reversed (Step S316). This is because when F2 mode is effective, it is required to reverse the relation between depths and Z-values. At this stage, the reverse determination is completed. The final determination as to whether to effect reverse of the relation, which is obtained through the reverse determinations, is reflected in the subsequent processing in Step S110 of FIG. 7 which will be described later.

<B-3. Smoothing>

Subsequent to the reverse determination, CPU 11 performs processing for smoothing deviations of Z-values calculated in Step S104 of FIG. 7 (Step S106). The reason for performing this process will now be described.

As described above, a stereographic image is generated by shifting pixels horizontally by an amount corresponding to their parallaxes determined by their Z-values. Accordingly, a difference between a parallax of a pixel and that of the neighboring pixels will be large in an area which includes pixels having a considerable difference in Z-values. In that area, 'pixel crossing phenomenon' will arise in an area where the neighboring pixels are shifted in opposite directions. This phenomenon tends to appear especially at an edge of a highlighted object. When the phenomenon appears, blur of the edge, halation, interference fringe or the like will appear in a generated stereographic image. The smoothing is performed to adjust a Z-value so as to prevent those abnormalities.

Figure 15:
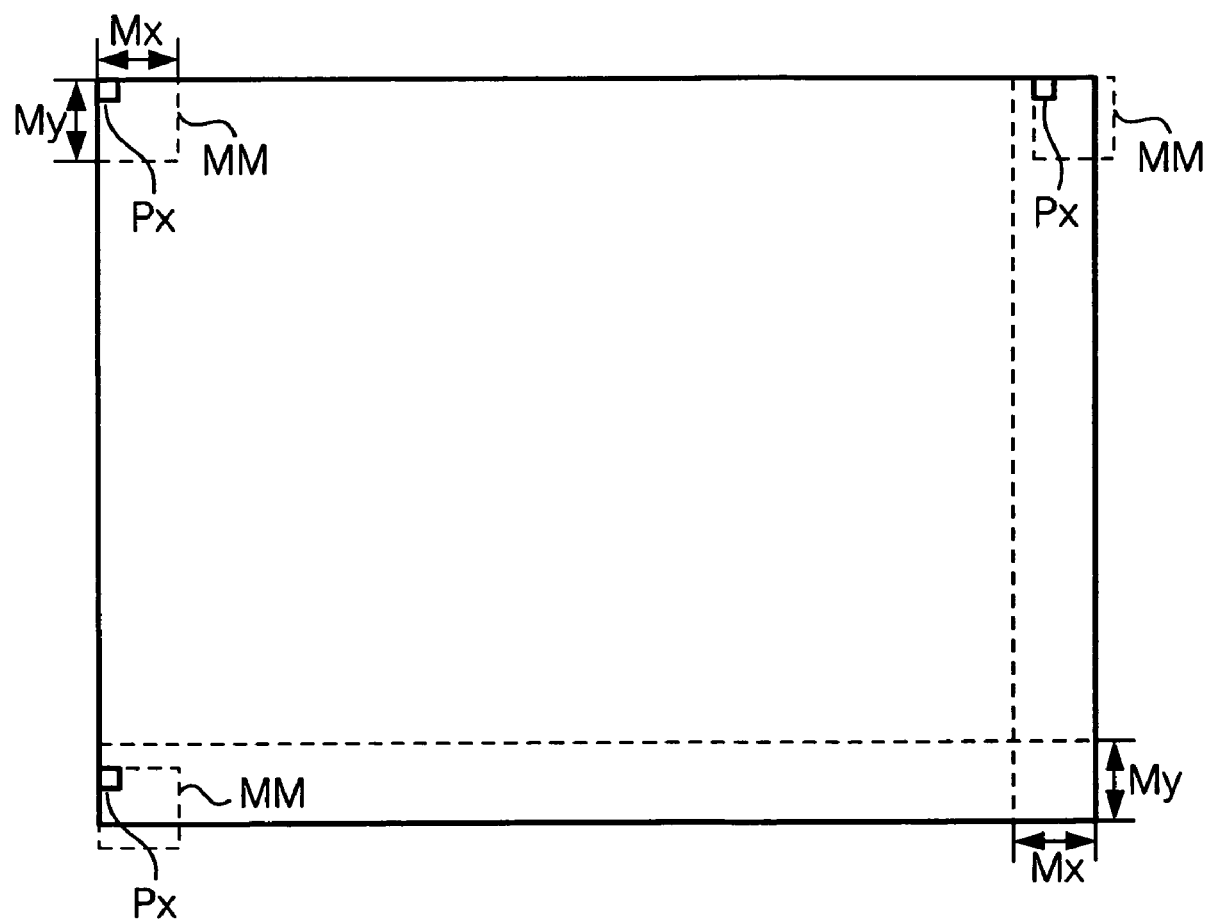
FIG. 15 is a diagram illustrating matrix areas MMs used in smoothing.

Specifically, as shown in FIG. 15, CPU 11 calculates for a pixel Px an average of Z-values included in an original 2D image, and an average of Z-values of the pixels in a predetermined region MM (hereinafter referred to as a matrix), the region including the pixel Px. CPU 11 then updates the calculated average for a Z-value of the pixel Px. Accordingly, the Z-value of the pixel Px is assigned to an average of Z-values of the pixels in a matrix MM, the matrix MM including the pixel Px in its upper left corner, and the matrix including 144 dots of 12 longitudinal dots (My) and 12 horizontal pixels (Mx). After the smoothing, deviation of neighboring pixels is smoothed in comparison with Z-values obtained in Step S104.

It is possible to employ other sizes of the matrixes MM. The larger a size of the matrix MM is, the larger the number of the pixels effecting an average of the Z-values is. As a result, a difference in Z-values among neighboring pixels is small; thereby a viewer perceives a world depicted in a stereographic image as being flatter. On the other hand, the smaller a size of the matrix MM is, the more rough a viewer's perception of a world depicted in a stereographic image.

Figure 16:
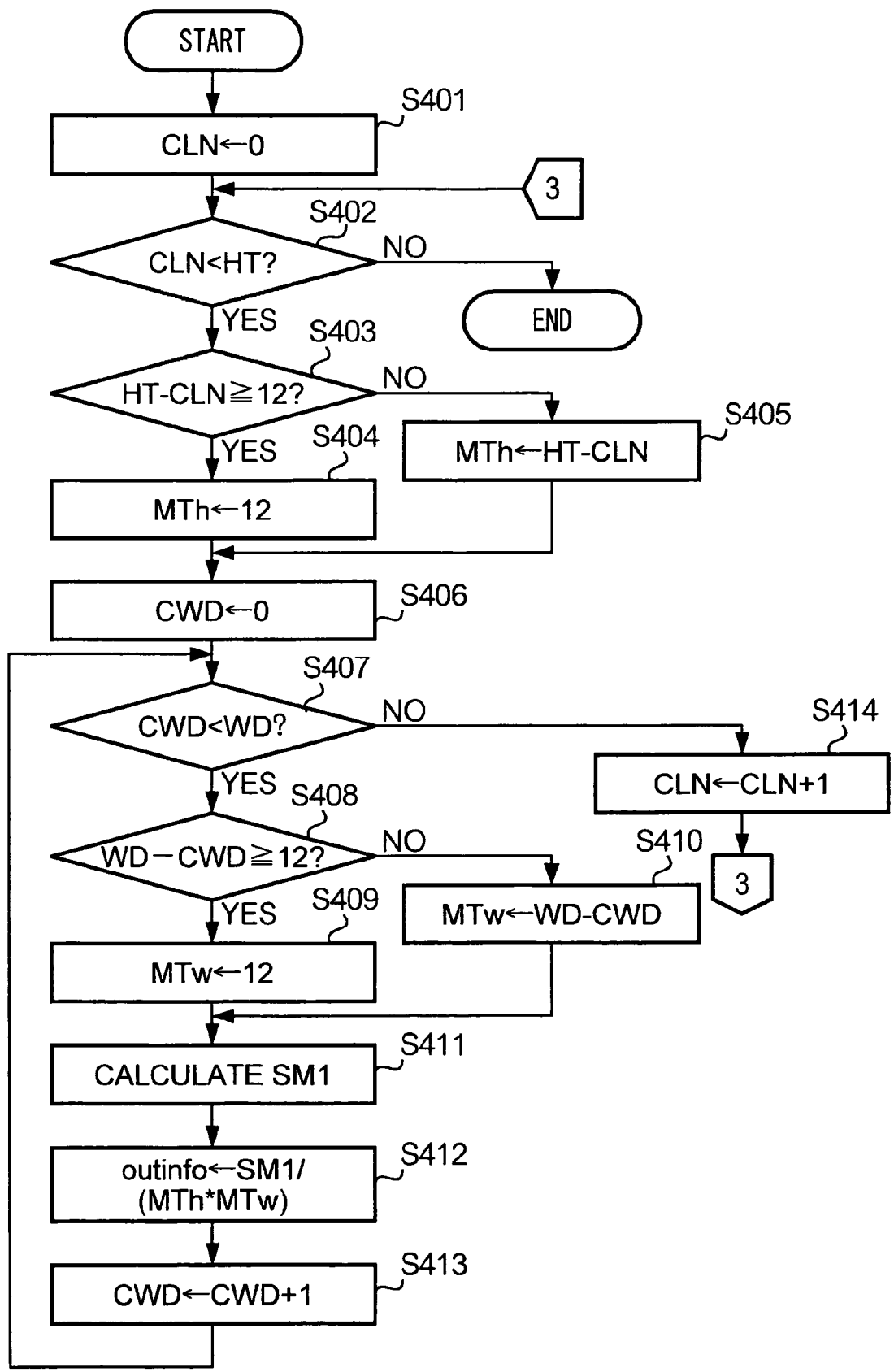
FIG. 16 is a flowchart showing the smoothing.

In the following, detailed description of the smoothing will be provided with reference to FIG. 16. It is to be noted that *outinfo is a pointer representative of an address to which Z-values through the smoothing are stored.

In Step S401, a value of a counter CLN which represents a longitudinal position of a target pixel is reset. Next, it is checked whether a value of the counter CLN is smaller than the total number of ongitudinal pixels HT (Step S402). If the condition of Step S402 is not satisfied, it is determined that the smoothing has been performed on all the pixels on the screen, and thus the smoothing ends.

In Step S403, it is checked whether a target pixel Px is located 12 pixels from the bottom of the screen, or HT-CLN is equal to or larger than 12. If the condition of Step S403 is satisfied, 12 is assigned to a variable MTh representative of the length of matrix MM (Step S404). If the condition of Step S403 is not satisfied, HT-CLN is assigned to the variable MTh (Step S405). By this substitution, a size of the matrix MM in a case where a target pixel is located near the bottom of the screen is adjusted.

Next, a counter CWD representative of a horizontal position of the target pixel is initialized (Step S406). It is checked whether a current value of the counter CWD is smaller than the total number of horizontal pixels WD (Step S407). If the condition of Step S407 is satisfied, it is checked whether the target pixel Px is located 12 pixels left or more from the right edge of the screen, or WD-CWD is equal to or larger than 12 (Step S408).

If the condition of Step S408 is satisfied, 12 is assigned to a variable MTw representative of the width of a matrix MM (Step S409). If the condition of Step S408 is not satisfied, WD-CWD is assigned to the variable MTw (Step S410). By this substitution, a size of the matrix MM in a case where the target pixel is located near the right edge of the screen is adjusted.

Next, with respect to a target pixel specified by values of the counters CLN and CWD, the sum of Z-values (zinfo) of all pixels in the matrix MM (SM1) is obtained, the size of the matrix MM being defined by MTh*MTw (Step S411). SM1/(MTh*MTw), which is an average of Z-values of all the pixels in the matrix MM, is assigned to outinfo (Step S412).

Thus far, the smoothing is performed on a single pixel; thus a current value of the counter CWD is incremented by 1 (Step S413), and the processing goes back to Step S407 to perform the smoothing on another target pixel. If the condition of Step S407 is not satisfied, it is determined that the smoothing has been performed on all pixels in a single line. Thus, a current value of the counter CLN is incremented by 1 (Step S414) and the processing goes back to Step S402 to perform the smoothing on another target pixel. Thus, the smoothing is eventually performed on all pixels of the screen.

B-4. Distribution Adjustment

The distribution adjustment (Step S107 of FIG. 7) will now be described. Since Z-values of pixels though the smoothing depend on the average of Z-values over all the pixels in the image, the distribution of Z-values may be biased. The upper part of FIG. 17 shows an example of a biased distribution of Z-values. In this case, a stereographic image generated using Z-values without any adjustment will not successfully achieve natural plasticity. In view of the above, the distribution of Z-values is revised in this distribution adjustment, as shown in the lower part of FIG. 17.

Figure 18:
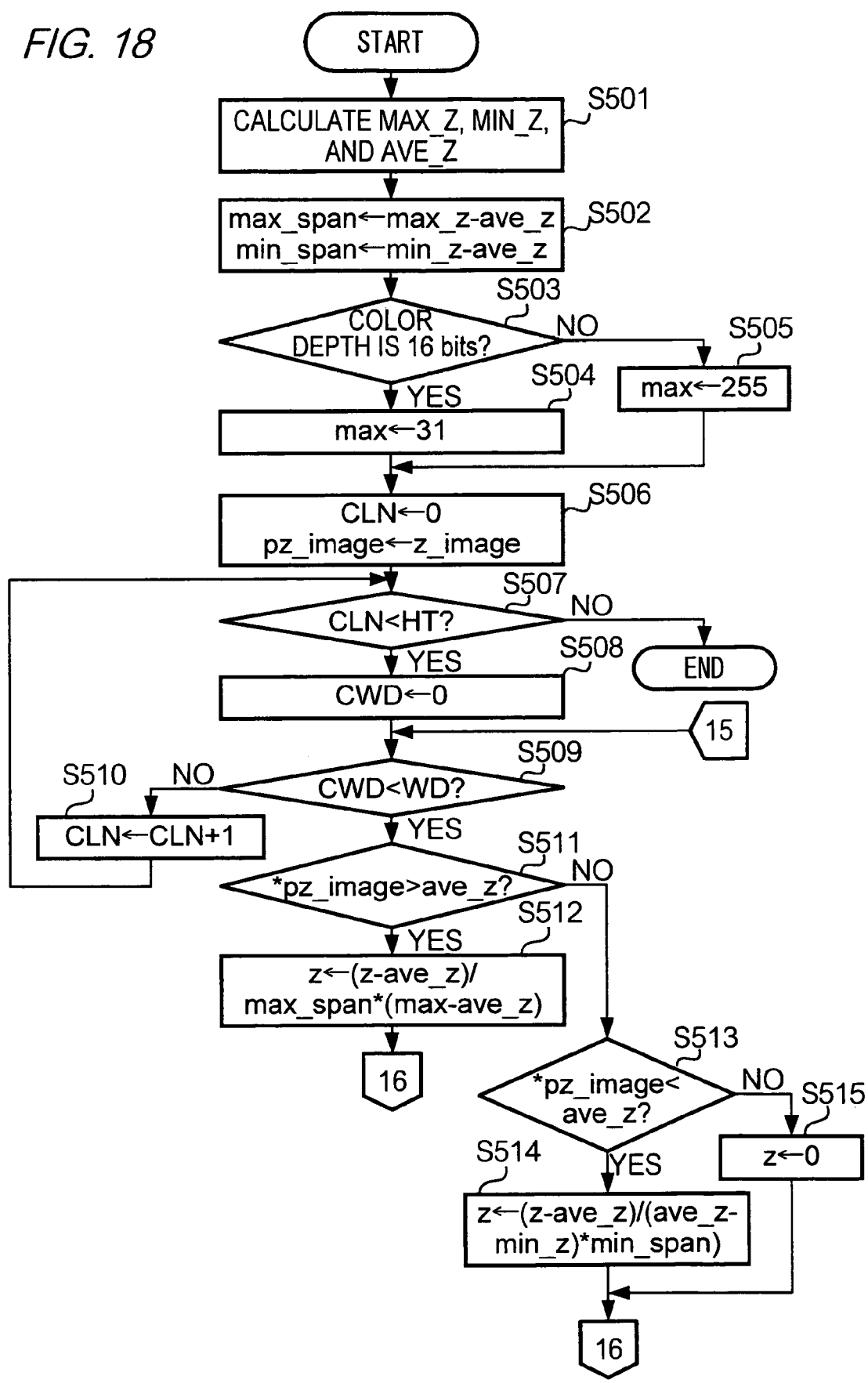
FIG. 18 is a flowchart showing the distribution adjustment.
Figure 19:
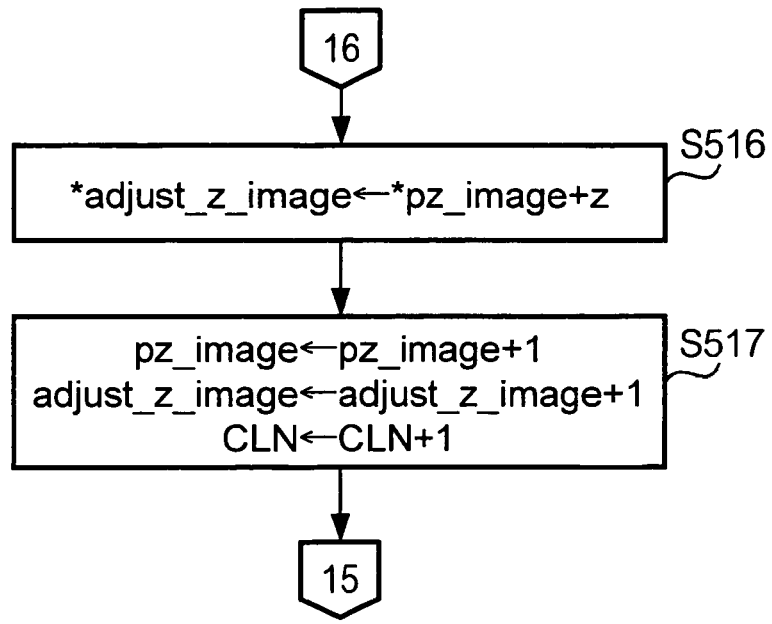
FIG. 19 is also a flowchart showing the distribution adjustment (cont'd).

Referring to FIGS. 18 and 19, the distribution adjustment will be described in detail. *z_image is a pointer representative of an address in which a Z-value is stored, ave_z is an average value of Z-values of all pixels in a screen, mix and min_z are the maximum and minimum of Z-values, respectively, and *adjust_z_image is a pointer representative of an address in which Z-values through the distribution adjustment is performed.

Firstly, max_z, min_z, ave_z are calculated (Step S501). Next, max_z–ave_z and min_z–ave_z are assigned to variables max_span and min_span which are parameters representative of a variance of the distribution, respectively (Step S502).

Next, it is checked whether the color depth is 16 bits (Step S503). When the color depth is 16 bits, 31 is assigned to a variable max representative of gradation scale (Step S504). When the color depth is 24 bits or 32 bits (Step S503, NO), 255 is assigned to the variable max (Step S505).

Next, a value of the counter CLN is reset to 0 and an address to which z_image is stored is assigned to a pointer variable *pz_image representative of a modification value for a Z-value of a target pixel (Step S506). Next, it is checked whether a value of the counter CLN is smaller than the number of total longitudinal pixels HT (Step S507). If the condition of Step S597 is not satisfied, the processing has been performed on all pixels; thus, the distribution adjustment ends.

If the condition of Step S507 is satisfied, a value of the counter CWD is reset to 0 (Step S508). In Step S509, it is checked whether a current value of the counter CWD is smaller than the total number of the longitudinal pixels. If the condition of Step S509 is not satisfied, the processing on pixels in a single line is finished; thus, a current value of the counter CLN is incremented by 1 (Step S510) and the processing goes back to Step S507 to perform the distribution adjustment on pixels of the next line.

If the condition of Step S509 is satisfied, it is checked whether pz_image is larger than ave_z (Step S511). In a case where pz_image>ave_z, namely the Z-value is larger than the average value, (z–ave_z)/max span*(max-ave_z) is assigned to a variable z representative of a modification value of the pixel (Step S512).

If the condition of Step S511 is not satisfied, it is checked whether pz_image<ave_z (Step S513). If the condition of Step S513 is satisfied, (z–ave_z)/(min_z–ave_z)*min_span is assigned to the variable z (Step S514). If the condition of Step S514 is not satisfied, or the value of *pz_image is equal to ave_z which is the average of Z-values, 0 is assigned to the variable z (Step S515).

After the variable z is determined at this stage, a value pz_image+z is assigned to *adjust_z_image (Step S516), so as to store a corrected Z-value of the target pixel. Next, values of *pz-image, adjust_z_image, and CLN are incremented by 1 (Step S517), and the processing goes back to Step S509 to perform the distribution adjustment on another pixel.

The local adjustment (Step S108 of FIG. 7) will now be described. There may be a case where a further correction is required in addition to the adjustment described above. Specifically, distortions appear in a distribution of Z-values of pixels relating to a single object. For example, inside a spherical object Z-values should change gradually and radially from the center to the perimeter. However, a case may arise where Z-values of a certain portion of the object are significantly large or small for some reason, or a case where irregularities of Z-values in the distribution may appear.

If a stereographic image is generated using Z-values having a distorted distribution described above, the order of depth of objects will be distorted accordingly; thus an image that should be perceived as a single object appears unnatural to a viewer. In light of this, in the local adjustment, Z-values of pixels are corrected on an object basis.

Figure 20:
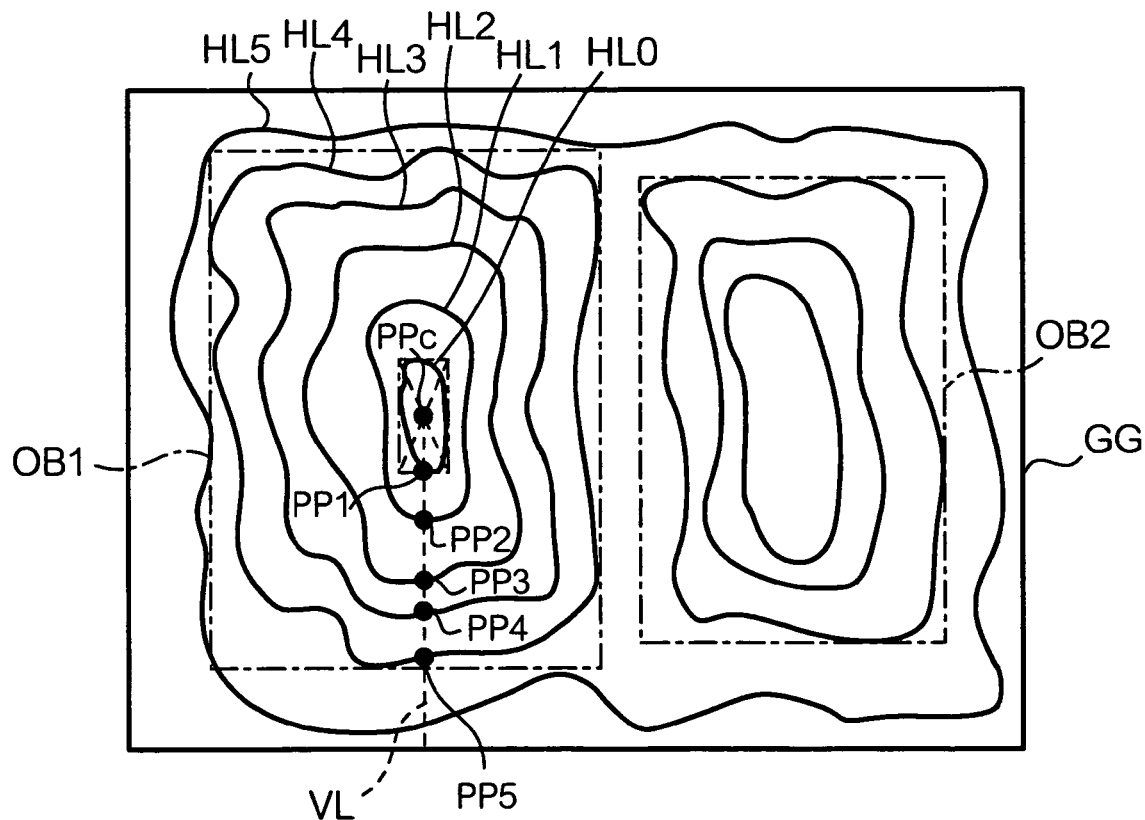
FIG. 20 illustrates a distribution of Z-values with regard to an object adapted to a local adjustment.

An overview of the local adjustment will be described with reference to FIGS. 21 and 21. Firstly, a range (the number of steps) of Z-values obtained in Steps S101 through S107 is corrected (Step S700 of FIG. 21). Next, contour lines HL0 through HL5, each of which is comprised of pixels of equivalent Z-values which are corrected in Step S700, are obtained (Step S701). Next, objects (e.g. OB1 and OB2 of FIG. 20) are identified on the basis of the obtained contour lines (Step S702). Y coordinate of the center of Z-values with respect to the object PPC is identified. Y coordinates of intersections of the vertical line which begins at the point PPC and the contour lines are obtained (Step S703).

Z-values of pixels relating to the object are obtained using the coordinates calculated above (Steps S704 and S705). Finally, Z-values within a region between the neighboring two lines (hereinafter referred to as a plane of equal altitude) are corrected (Step S706). It is to be noted that when only a single contour line is obtained, the region inside the line should be regarded as the plane of equal altitude. Detailed processing will be described in the following.

(a) Correction of Gradation Steps

As described above, a minimum unit of displacement of a pixel is a pixel, when generating a stereographic image. In other words, it is impossible to displace a pixel by a distance shorter than a pixel width. As a result, if it is determined that an increment of a Z-value 1 corresponds to the minimum displacement distance which is equivalent to a single pixel, the maximum Z-value 255 will result in a displacement of a pixel by a distance equivalent to a 256 pixel width. However, a significantly large distance of displacement (e.g. 8 mm on a screen) will cause fatigue for a viewer, and will prevent the viewer from perceiving the image three-dimensionally. In view of this, CPU 11 performs approximation of Z-values obtained in Step S101 through 107 to replace the Z-values with certain discrete values.

Specifically, CPU 11 divides a Z-value obtained in Step S107 by a rounding factor MK, rounds the number of decimal places (rounding up, rounding down, or rounding off to the nearest integer), and multiples it by the factor MK. As a result, the Z-values of pixels are replaced by numbers which are integer times of the rounding factor MK.

In other words, the rounding factor MK is a number representative of a step size of Z-valued to be descretized. In this embodiment, the rounding factor MK is set to a value by dividing the maximum number of the Z-values 255 by an object depth Ob specified by a user and rounding it. The object depth Ob is a parameter representative of the number of steps available for Z-values. For example, if MK=10, the Z-values can be assigned by 0, 1, 2, 3, . . . , 25, which means that 26 steps are available for the Z-values.

(b) Calculation of Contour Lines

Figure 22:
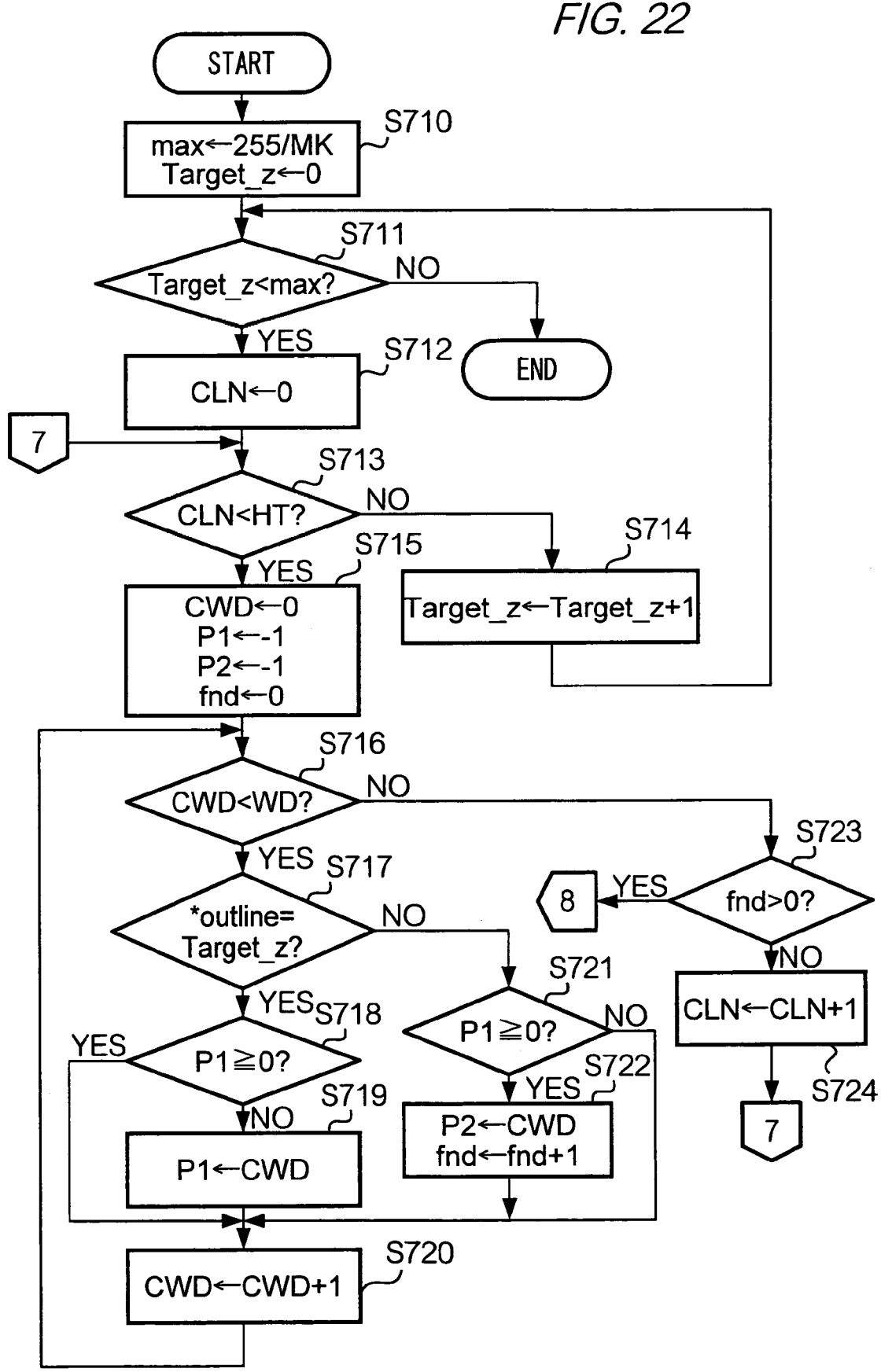
FIG. 22 is a flowchart showing a contour determination included in the local adjustment.
Figure 24:
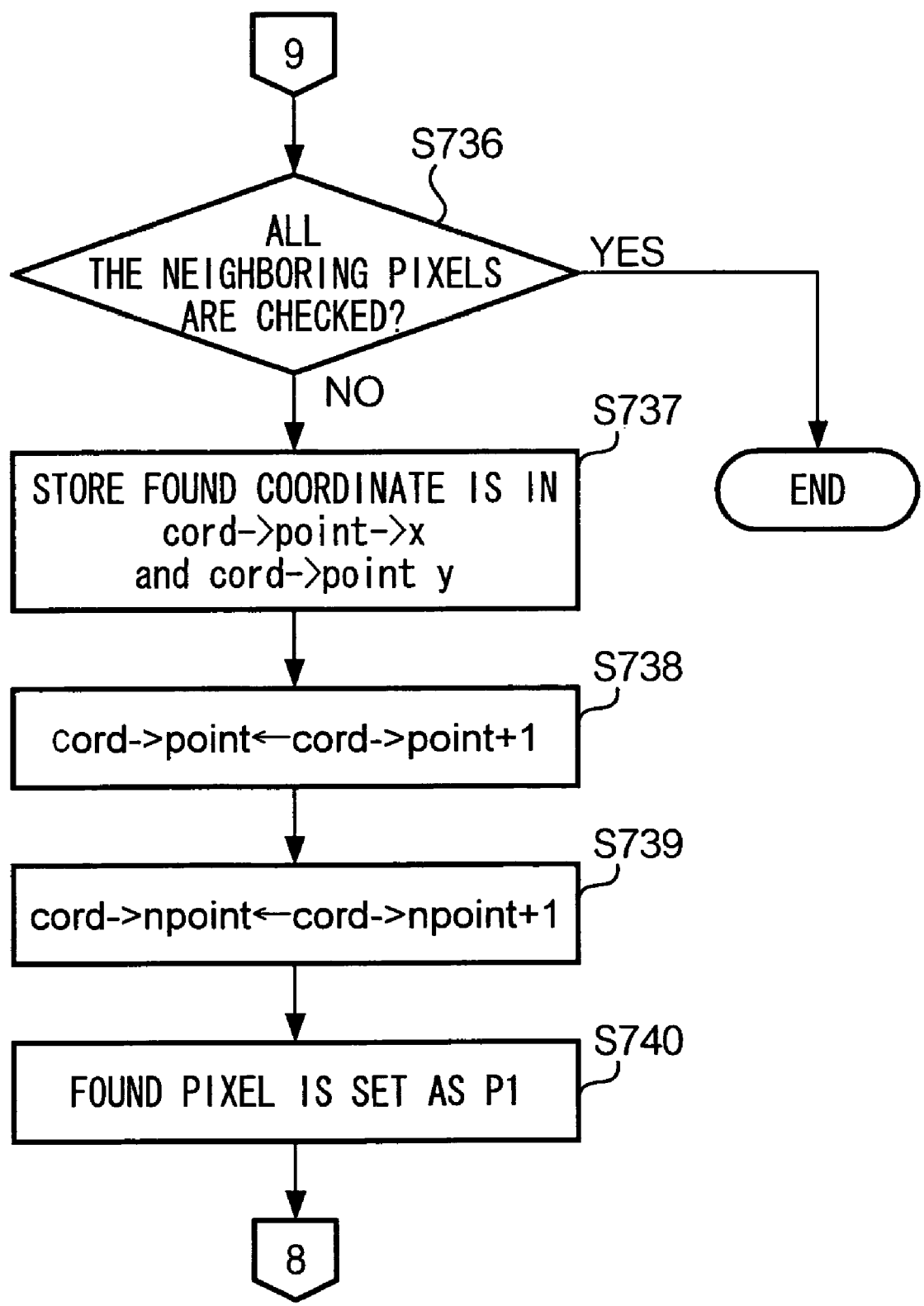
FIG. 24 is a flowchart showing the contour determination (cont'd).

Calculation of contour lines will be described in detail referring to FIGS. 22 through 24. *Outline is a pointer representative of an address in which contour line basic data is stored, and *cord is a pointer representative of an address in which Z-value vectors is stored. Cord is data having a structure Vinfo. The structure Vinfo includes data elements including Z-values, npoint (an integer), and *point (coordinate data).

Firstly, CPU 11 assigns 255 divided by the rounding factor MK to a max, which is a constant, and assigns 0 to a variable Target_z representative of the number of pixels on which the processing has already been performed (Step S710).

Next, it is checked whether a value of the variable Target_z is larger than the constant value max (Step S711). If the condition of Step S711 is not satisfied, calculation of contour lines ends. If the condition of Step S711 is satisfied, the counter CLN is reset to 0 (Step S712) and it is checked whether a current value of the counter CLN is smaller than HT (Step S713). If the condition of Step S713 is not satisfied, a value of Target_z is incremented by 1 (Step S714) and the processing goes back to Step S711. If the condition of Step S713 is satisfied, the counter CWD is reset to 0, and −1 is assigned to the variable P1 and P2, and 0 is assigned to a variable fnd (Step S715).

Next, it is checked whether a value of the counter CWD is smaller than WD (Step S716). If the condition of Step S716 is satisfied, it is checked whether a value of *outline is identical to a value of Target_z (Step S717). If the condition of Step S717 is satisfied, it is checked whether a value of the variable P1 is larger than 0 (Step S718). If the condition of Step S718 is not satisfied, the value of the counter CWD is assigned to the variable P1 (Step S719), a value of the counter CWD is incremented by 1 (Step S720), and the processing goes back to Step S716.

If the condition of Step S718 is satisfied, processing is forwarded to Step S720 to perform subsequent processing.

If the condition of Step S717 is not satisfied, it is checked whether a current value of the variable P1 is larger than 0 (Step S721). If the condition of Step S721 is satisfied, a current value of the counter CWD is assigned to the variable P2, a value of the variable fnd is incremented by 1 (Step S722), and the processing goes back to Step S720 to perform the subsequent processing. If the condition of Step S716 is not satisfied, it is checked whether a value of the variable fnd is larger than 0 (Step S723). If the condition of Step S723 is not satisfied, a current value of the counter CLN is incremented by 1 (Step S724), and the processing goes back to Step S713.

If the condition of Step S723 is satisfied, a search is carried out to find neighboring pixels of a target pixel, the pixels having Z-values which are different from a Z-value of the target pixel. Specifically, the search is carried out in an order shown in the left part of FIG. 23. At first, a target pixel P1 is compared with the upper right pixel (Step S730). If Z-values of both pixels are the same (Step S730, NO), the Z-value of the target pixel P1 is compared with a Z-value of the pixel located directly above the pixel P1 (Step S731). Similarly, the comparison is carried out for the six pixels neighboring the target pixel (Steps S732 though S735). A schematic diagram of the search order is shown in the right part of FIG. 23.

If a pixel having a Z-value different from the Z-value of the target pixel P1 (YES in Steps 730, 731, 732, 733, 734, and 735) is found, it is checked whether the pixel has previously been found, so as to confirm that all the pixels around the target parcel P1 have been checked (Step S736). Thus, an edge comprising differing Z-values is extracted. When all pixels relating to the edge are checked (Step S736, YES), the calculation of contour lines ends.

If the condition of Step S736 is not satisfied, x and y coordinates of a pixel which were found in the previous processing are assigned to x and y values of point of cord, respectively (Step S737). Next, values point of cord and npoint are incremented by 1 (Step S738 and S739), the found pixel is set as the target pixel P1 (Step S740), and the processing goes back to Step S730 to perform the comparison. Thus, edges are found so as to extract a single contour line.

(c) Determination of Object's Center

Figure 25:
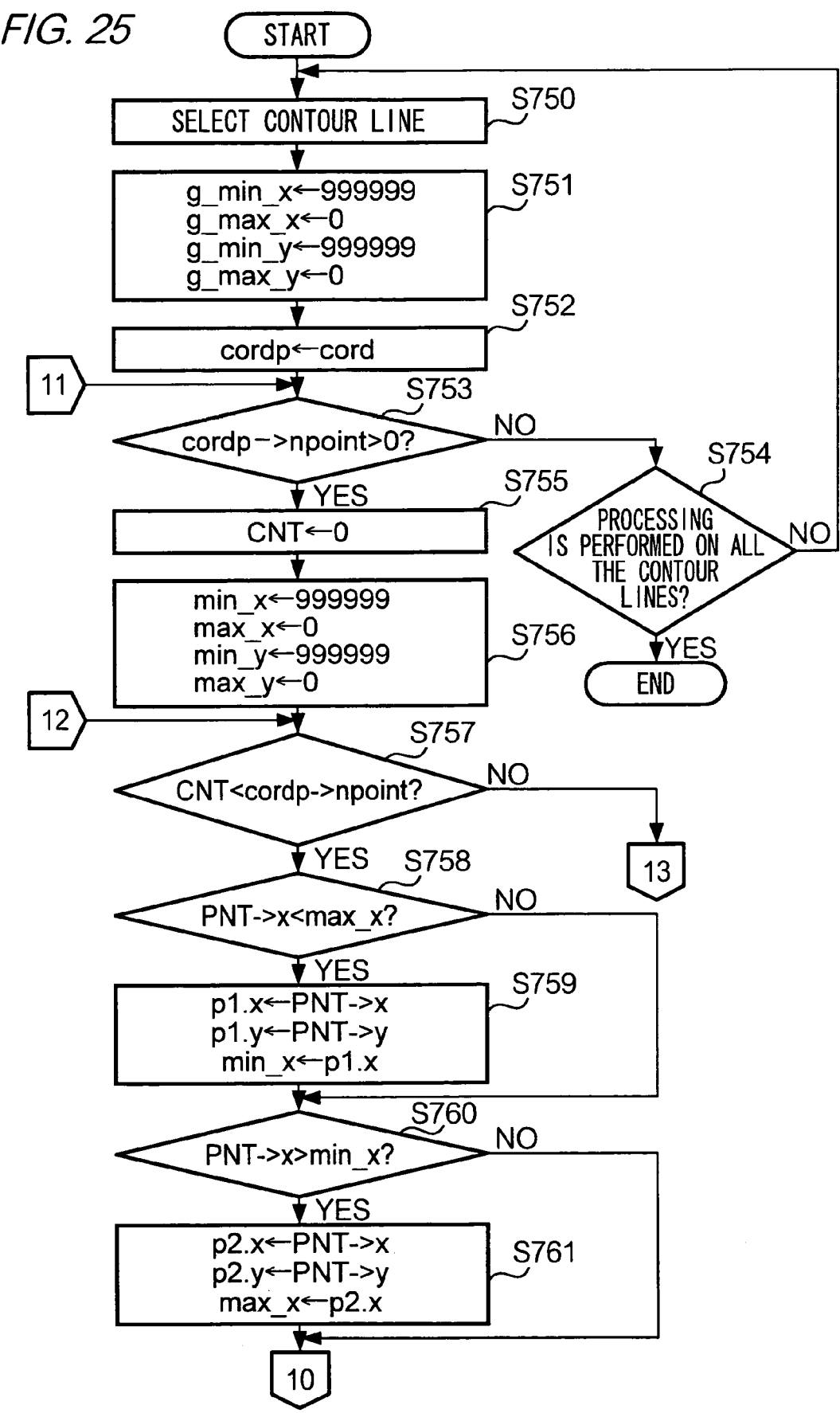
FIG. 25 is a flowchart showing an object center determination included in the local adjustment.
Figure 26:
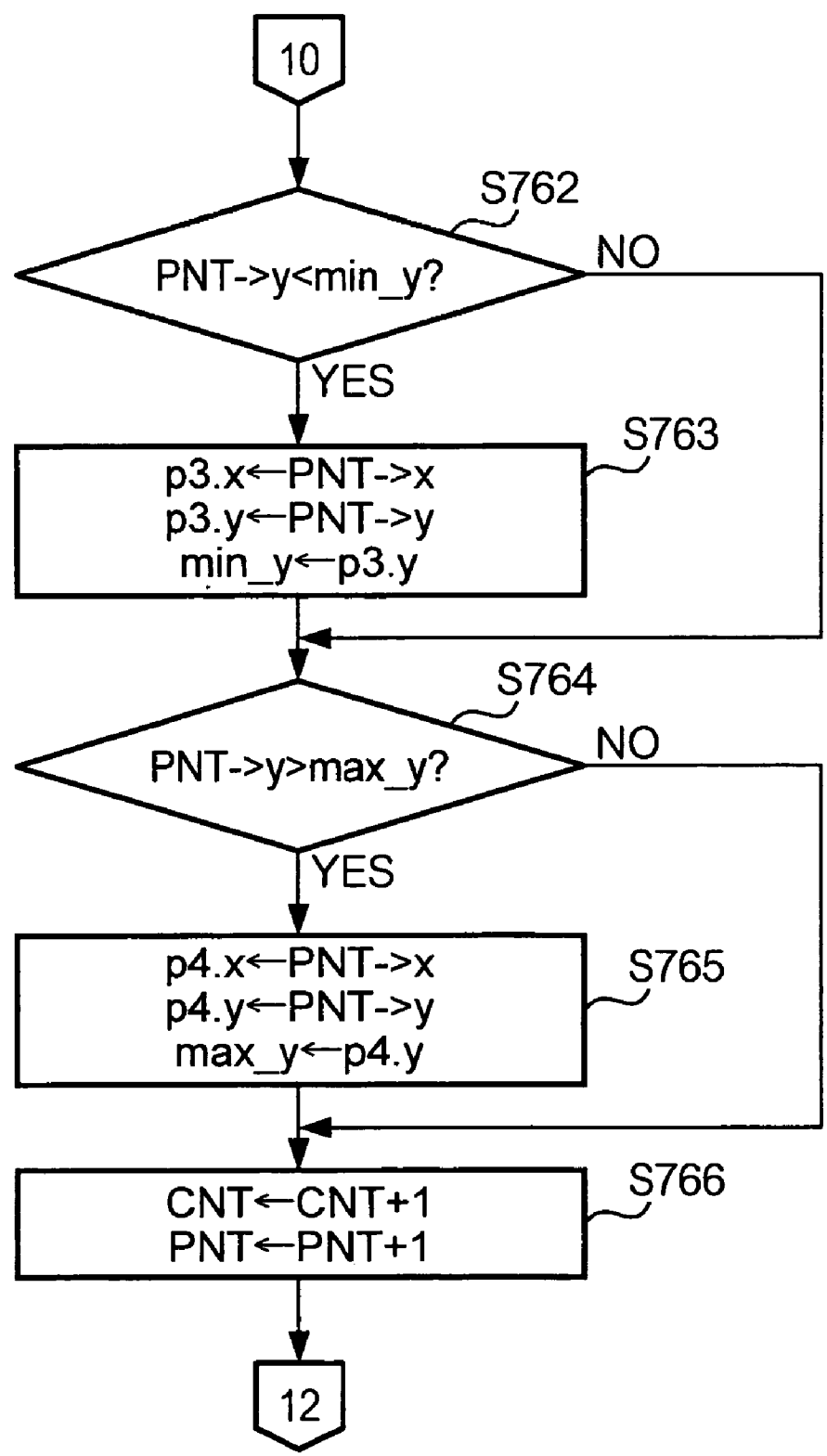
FIG. 26 is a flowchart showing the object center determination (cont'd).
Figure 27:
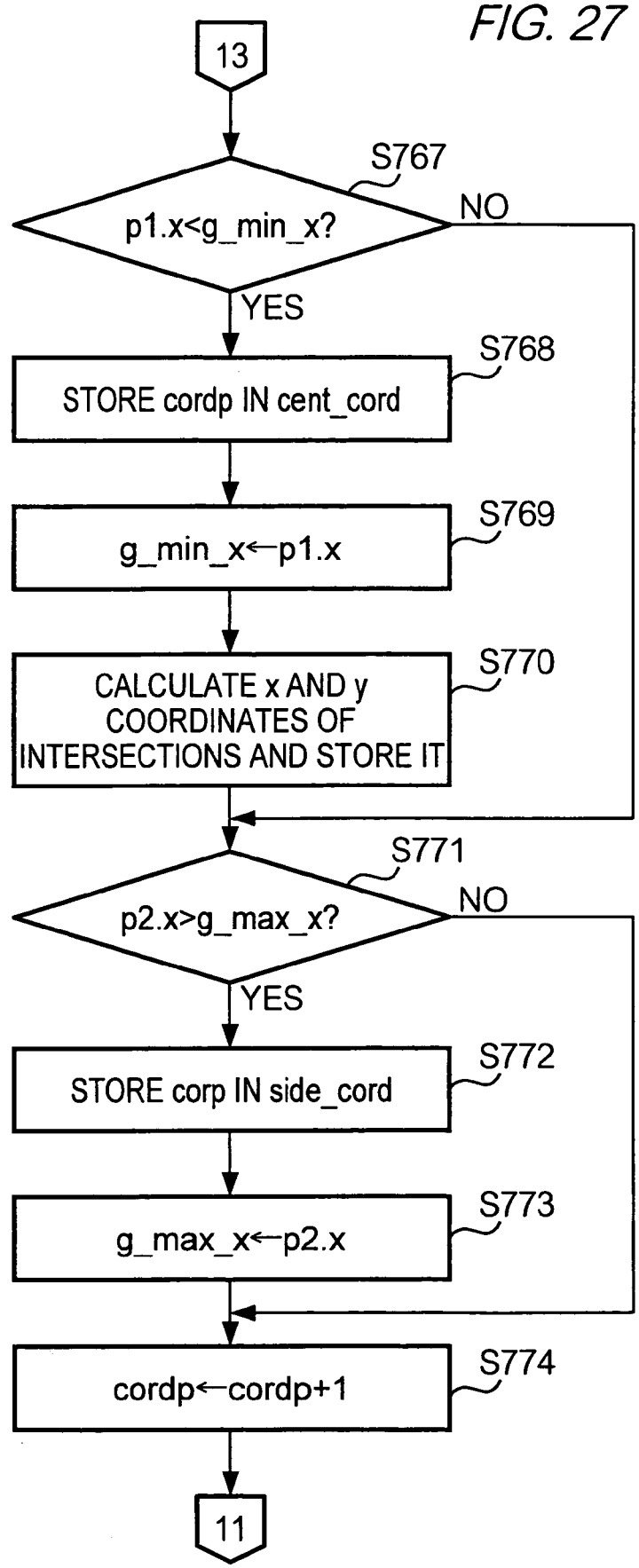
FIG. 27 is a flowchart showing the object center determination (cont'd).

The determination of an object's center (Step S702 of FIG. 21) will now be described with reference to FIGS. 25 though 27. In the determination of object's center, coordinates of vertexes of a rectangle circumscribing the inner most contour line relating to a single object are obtained, a center of the rectangle is regarded as a center of Z-values of the object. Cent_cord is a pointer representative of a vector area for storing the innermost rectangle, center is coordinates of a center to be obtained, and *side_cord is a pointer representative of a vector area for storing the rectangle other than the innermost one.

At first, CPU 11 selects a contour line (Step S750). Next, variables g_min_x, g_man_x, g_min_y, g_man_y, that represent the minimum and the maximum values of x and y coordinates of pixels on the contour line are initialized (Step S751). In FIG. 25, for simplicity, the initial value of g_min_x is shown as 999999, but other values which are larger than WD can be used instead. This also applies to g_min_y. In Step S752 a value of cord is assigned to cordp.

Next, it is checked whether a value of npoint of cord is larger than 0 (Step S753). If the condition of Step S753 is not satisfied, it is checked whether processing is performed on all contour lines (Step S754). If the condition of Step S754 is not satisfied, the processing goes back to Step S750 to perform processing on another contour line. If the condition of Step S754 is satisfied, the processing ends. If the condition of Step S753 is satisfied, variables are initialized. Specifically, a value of the counter is reset to 0 (Step S755), 999999 is assigned to min_x, 0 is assigned to max_x, 999999 is assigned to min_y, 0 is assigned to max_y (Step S756), and a value of npoint of cord is assigned to a variable PNT.

Next, it is checked whether a current value of the counter CNT is smaller than the value of npoint of cord, namely whether the processing has been performed on all pixels relating to a single contour line is checked (Step S757). If the processing is not finished (Step S757, YES), it is checked whether an x value of the variable PNT is smaller than min_x (Step S758). If the condition of Step S758 is satisfied, the horizontal minimum position is assigned to P1. Specifically, an x value of the PNT is assigned to p1.x and a y value of the PNT is assigned to p1.y, and pi.x is assigned to min_x (Step S759). If the condition of Step S758 is not satisfied, Step 759 is omitted.

Next, it is checked whether the x value of PNT is larger than max_x (Step S760). If the condition of Step S760 is satisfied, the maximum horizontal position is assigned to p2. Specifically, the x value of PNT is assigned to p2.x and the y-value of PNT is assigned to p2.y, and p2.x is assigned to max_x (Step S761). If the condition of Step S760 is not satisfied, Step S761 is omitted.

Next, it is checked whether the y value of the variable PNT is smaller than min_y (Step S762). If the condition of Step S762 is satisfied, the minimum vertical position is assigned to p3. Specifically, the x value of PNT is assigned to p3.x, the y value of PNT is assigned to p3.y, and p3.y is assigned to min_y (Step S763). If the condition of Step S762 is not satisfied, Step S763 is omitted.

Next, it is checked whether the y-value of the variable PNT is smaller than max_y (Step S764). If the condition of Step S764 is satisfied, the maximum vertical position is assigned to p4. Specifically, an x value of PNT is assigned to p4.x, the y value of PNT is assigned to p4.y, and p4.y is assigned to max_y (Step S765). If the condition of Step S672 is not satisfied, Step S765 is omitted. Next, a value of the counter PNT is incremented by 1 (Step S766), and the processing goes back to Step S757.

When the vertexes of a circumscribing rectangle (Step S757, NO) is calculated, it is checked whether p1.x is smaller than g_min_x to determine whether the rectangle is the innermost one. If the rectangle is disposed innermost (Step S767, YES), cordp is stored in cent cord (Step S768) and p1.x is assigned to g_min_x (Step S769). Next, an intersection of a line segment starting at the vertex of the innermost rectangle (p1.x, p3.y) and ending at a point (p2.x, p4.y), and a line segment starting at a point (p2.x, and p3.y) and ending at a point (p1.x, p4.y), is calculated. X and y coordinates of the intersection are stored in center.x and center.y, respectively (Step S770). If the rectangle is not the innermost one (Step S767, NO), Steps S768 through 770 are skipped.

Next, it is checked whether p2.x is larger than g_max_x (Step S771). If p2.x>g_max_x (Step S711,YES), cordp is stored in side_cord and p2.x is stored in g_max_x (Steps S772 and S773). If p2.x is smaller than g_max_x (Step S771, NO), Steps S772 and 773 are omitted. Next, a value of cordp is incremented by 1 (Step S774) and the processing goes back to Step S753 to perform similar processing on another contour line.

(d) Determination of Intersections

Figure 28:
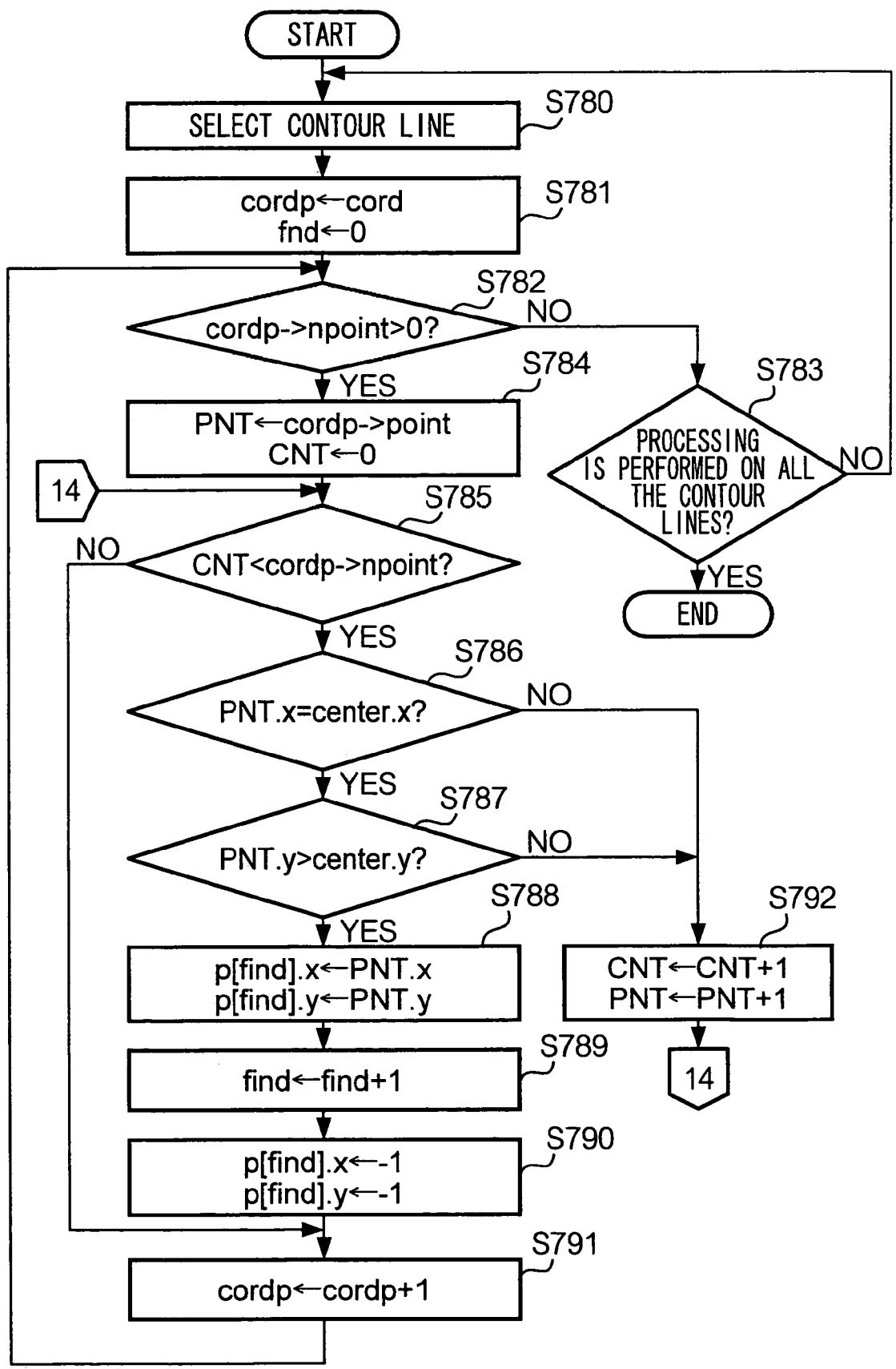
FIG. 28 is a flowchart showing an intersection determination included in the local adjustment.

The intersection determination (Step S703 of FIG. 21) will be described with reference to FIG. 28. It is to be noted that p[] is an array for storing coordinates of an intersection. At first, a contour line is selected (Step S780), cord is assigned to cordp, and a variable find is set to 0 (Step S781). Next, it is checked whether npoint of cord is larger than 0 (Step S782). If the condition of Step S782 is not satisfied, it is checked whether the calculation has been performed on all contour lines (Step S783). If the condition of Step S783 is not satisfied, the processing goes back to Step S780 to perform the intersection determination on another contour line. If the condition of Step S783 is satisfied, the intersection determination ends.

If the condition of Step S782 is satisfied, npoint of cordp is assigned to the variable PNT and a value of the counter CNT is reset to 0 (Step S784). Next, it is checked whether a value of the counter CNT is smaller than the npoint of cord (Step S785). If the condition of Step S785 is satisfied, it is checked whether PNT.x is identical to center.x (Step S786).

If the condition of Step S786 is satisfied, it is checked whether PNT.y is larger than center.y (Step S787). If the condition of Step S787 is satisfied, an intersection of a vertical line starting at the center and the contour line is determined. Specifically, PNT.x is assigned to p[find] and PNT.y is assigned to p[find] (Step S788).

Next, a value of the variable find is incremented by 1 (Step S789), and −1 is assigned to p[find].x and p[find].y (Step S790). Next, a value of cordp is incremented by 1 (Step S791) and the processing goes back to Step S782.

If the condition of Step S786 or 787 is not satisfied, values of CNT and PNT are incremented by 1 (Step S792), and the processing goes back to Step S785. If the condition of Step S785 is not satisfied, the processing goes back to Step S791.

(e) Inplane Z-Value Calculation

Figure 29:
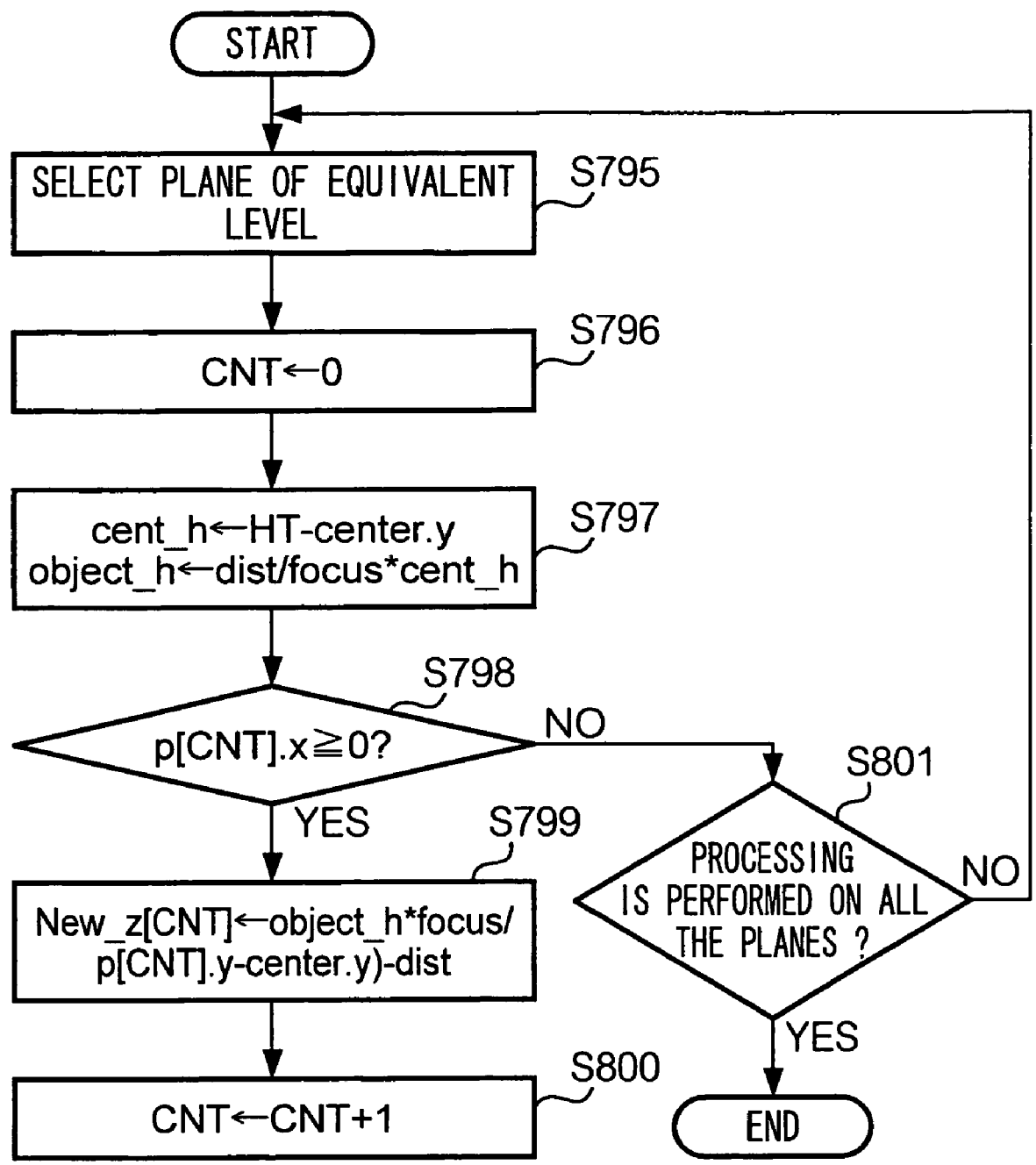
FIG. 29 is a flowchart showing an inplane Z-value calculation included in the local adjustment.

The inplane Z-value calculation (Step S704 of FIG. 21) will be described with reference to FIG. 29. In this calculation, Z-values within a plane of equivalent level are revised using coordinates of the center of an object and the intersections which are obtained in the previous processing. A constant value dist represents a distance between a position of a camera and a screen assuming that the image displayed on the screen is shot by a camera, a constant value of focus represents a focal length of the camera, and new_z[] represents an array for storing a Z-value calculated in the inplane Z-value calculation.

At first, CPU 11 selects a contour line (Step S795) and resets a value of the counter CNT to 0 (Step S796). Next, HT subtracted by center.y is assigned to cent_h and dist/focus*cent_h is assigned to object_h, which is representative of a depth of the object (Step S797). Next, it is checked whether a value of P[CNT].x is larger than 0 (Step S798). If the condition of Step S798 is satisfied, object_h*focus/(p[CNT].y-center.y)-dist is new_z[CNT] is assigned to new_z[CNT] (Step S799), so as to revise a Z-value of a pixel within a plane of equivalent level, so that the Z-value is proportional to a y component of a distance between the center of Z-values with respect to the object and the pixel.

Next, a value of the counter CNT is incremented by 1 (Step S800) and then the processing goes back to Step S798. If the condition of Step S798 is not satisfied, it is checked whether the inplane Z-value calculation has been performed on all the contour lines (Step S801). If the condition of Step S801 is not satisfied, the processing goes back to Step S795 to perform the inplane calculation on another contour line. If the condition of Step S801 is satisfied, the inplane calculation ends.

(f) Calculation of Inplane Modification Z-Value

Figure 21:
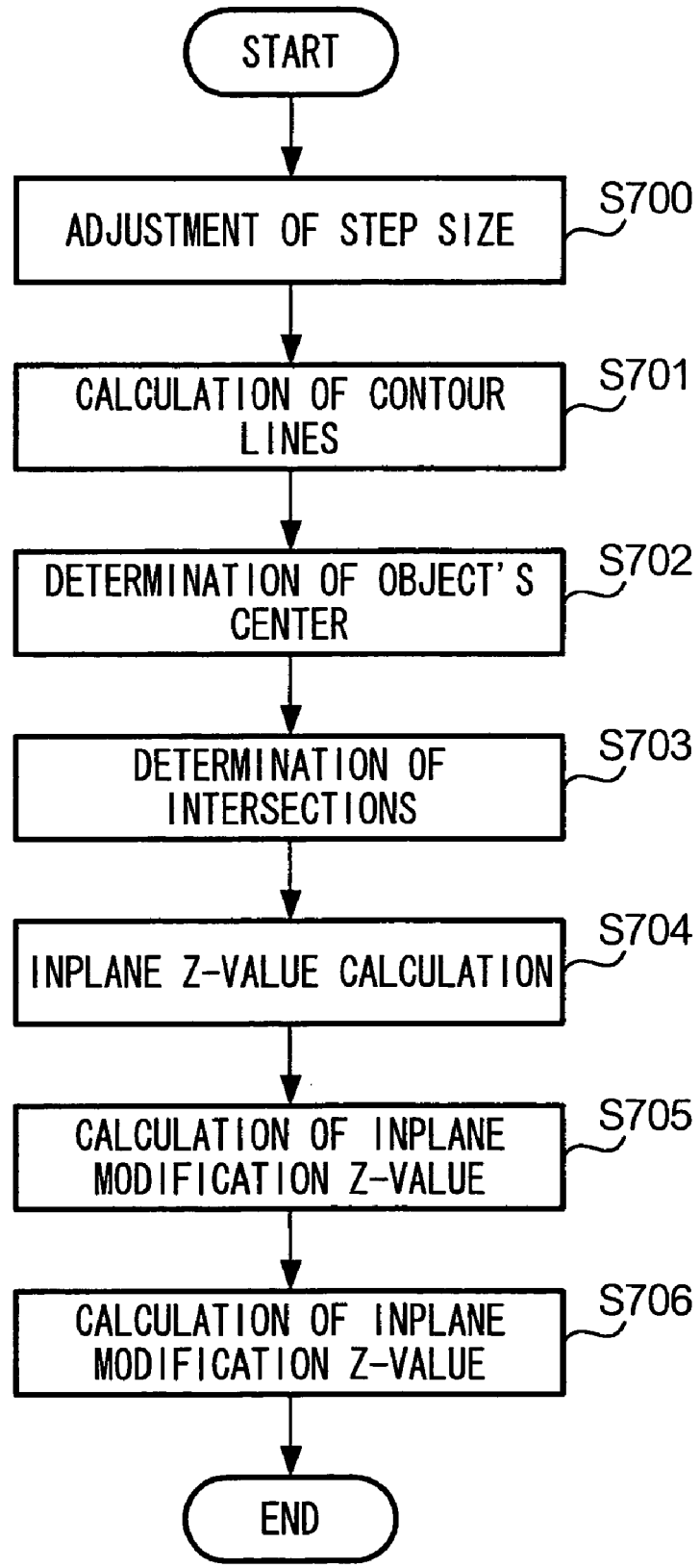
FIG. 21 is a flowchart showing the local adjustment.
Figure 30:
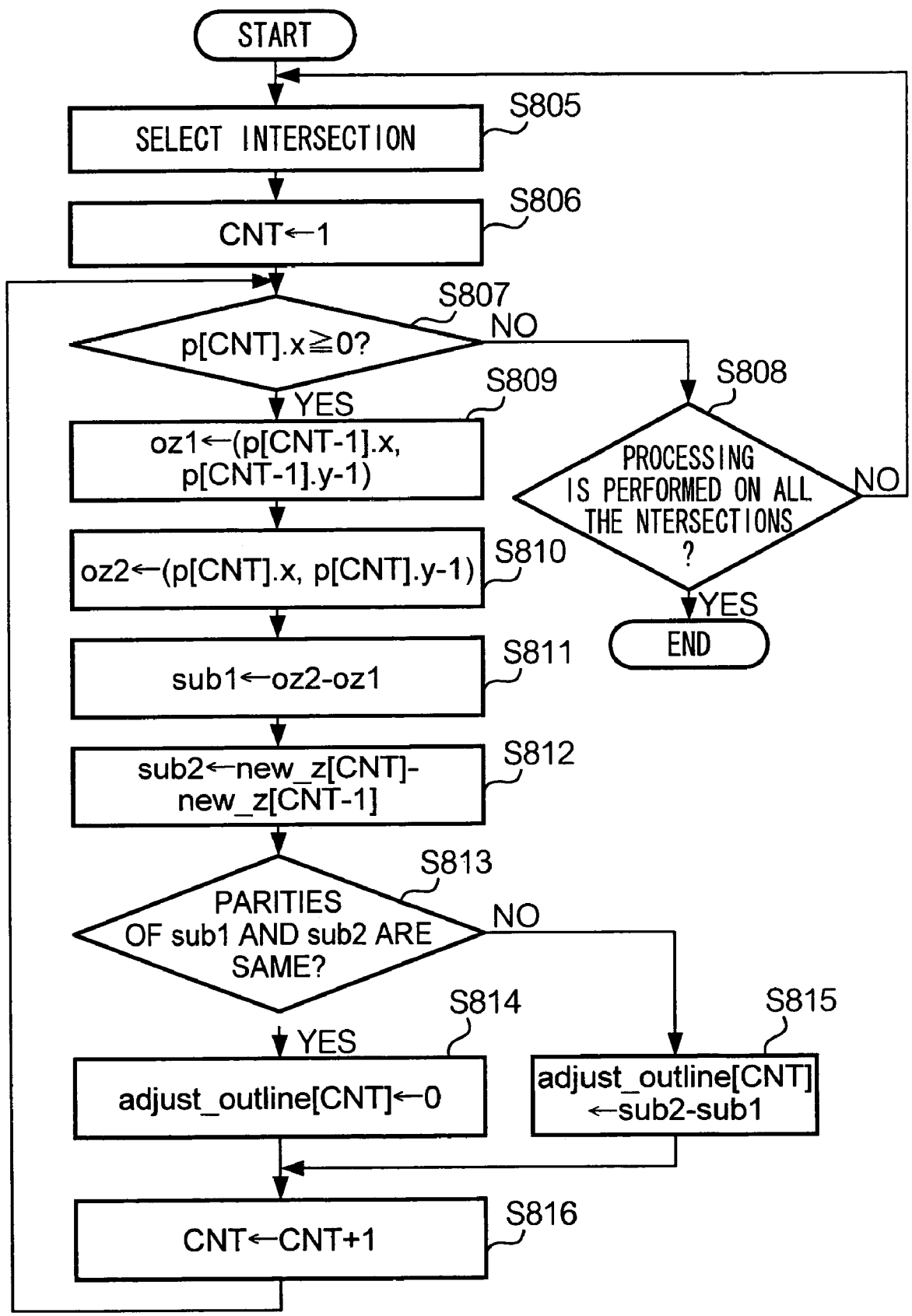
FIG. 30 is a flowchart showing an inplane Z-value correction.

In the calculation of inplane modification of a Z-value, a Z-value within a plane of equivalent level is corrected using a Z-value obtained in Step S704 of FIG. 21. In the following, detailed description on the calculation of inplane modification Z-value will be provided with reference to FIG. 30. It is to be noted that adjust_outline[] is an array for storing a difference of Z-values before the correction and after the correction.

At first, an intersection obtained in the previous processing is selected (Step S805) and 1 is assigned to a value of the counter CNT (Step S806). Next, it is checked whether p[CNT].x is larger than 0 (Step S807). If the condition of Step S806 is not satisfied, it is determined that the processing is finished for a single intersection, and it is checked whether the processing has been performed on all the intersections (Step S808). If the condition of Step S808 is not satisfied, the processing goes back to Step S805 to perform the processing on another intersection. If the condition of Step S808 is satisfied, the calculation of inplane modification of Z-value ends.

If the condition of Step S807 is satisfied, a Z-value of a pixel identified by a coordinate (p[CNT-1].x, p[CNT-1].y-1) is assigned to a variable oz1 (Step S809) and a Z-value of a pixel identified by a coordinate (p[CNT].x, p[CNT].y-1) is assigned to a variable oz2 (Step S810). Next, oz2-oz1 is assigned to a variable sub1 (Step S811) and new_z[CNT]-new_z[CNT-1], which is an increment by which a Z-value is adjusted is assigned to a variable sub2 (Step S812).

Next, it is checked whether signs of sub1 and sub2 are the same (Step S813). If the signs are the same (Step S813, YES), 0 is assigned to adjust_outline[CNT] (Step S814). If the signs are different (Step S813, NO), sub2-sub1 is assigned to adjust_outline[CNT] (Step S815). Next, the counter CNT is incremented by 1 (Step S816) and then the processing goes back to Step S807.

(g) Object-Basis Z-Value Adjustment

Figure 31:
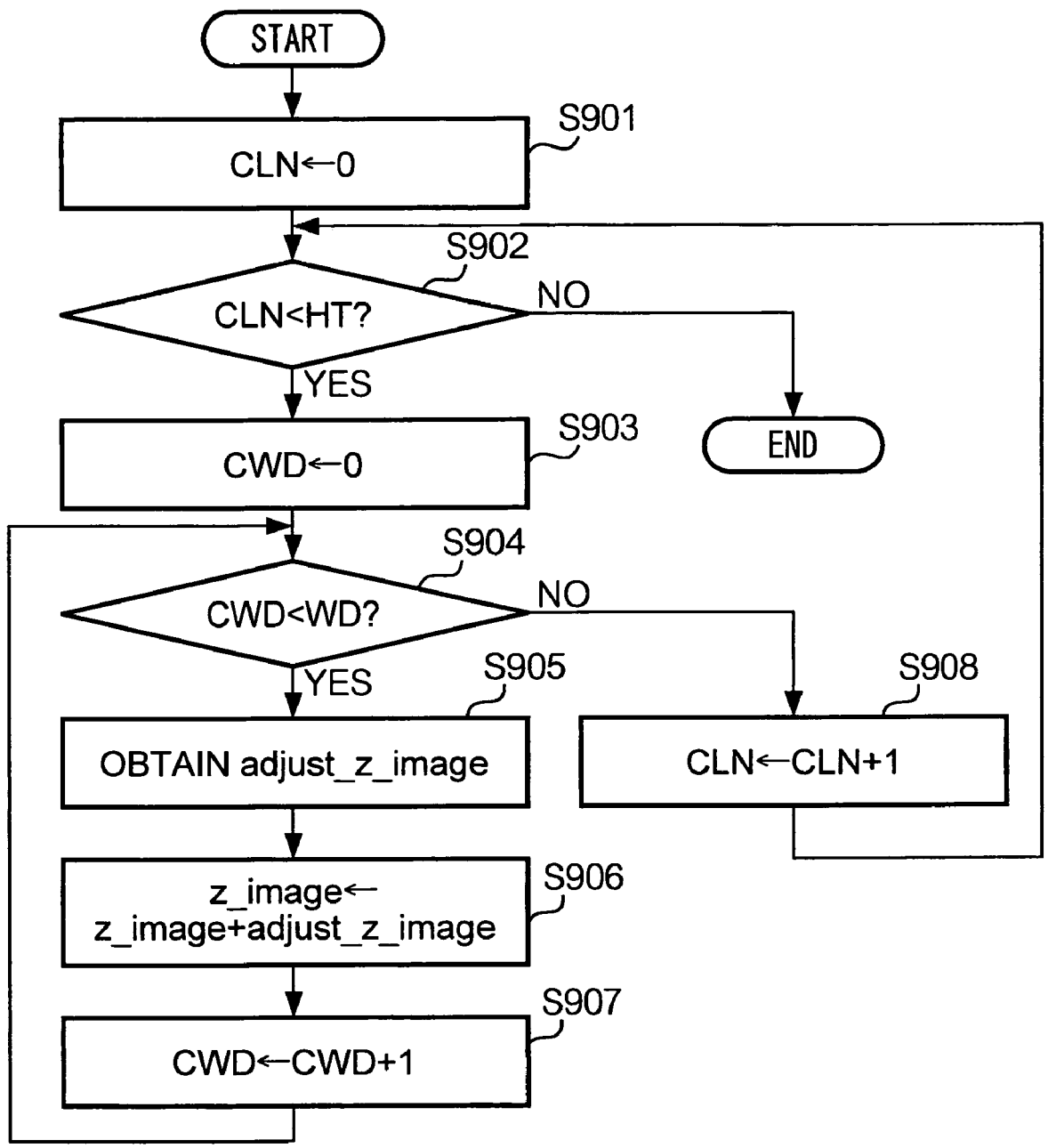
FIG. 31 is a flowchart showing a Z-value adjustment.

In this adjustment, Z-values of pixels in an object are adjusted using inplane modification Z-value obtained in Step S705. Detailed description of the object-basis Z-value adjustment (Step S109 of FIG. 7) will be provided in the following with reference to FIG. 31. It is to be noted that *adjust_Z_image is a pointer representative of an address in which adjusted Z-values are stored.

At first, the counter CLN is reset to 0 (Step S901) and it is checked whether a current value of the counter CLN is smaller than HT (Step S902). If the condition of Step S902 is not satisfied, the processing ends. If the condition of Step S902 is satisfied, 0 is assigned to the counter CWD and it is checked whether CWD is smaller than WD (Step S904). If the condition of Step S904 is satisfied, adjust_z_image of the target pixel is obtained (Step S905), and the z_image is updated by adding adjust_z_image to the z-image (Step S906). Thus far, update of a Z-value of a single pixel is finished.

Next, a value of CNT is incremented by 1 (Step S907) and the processing goes back to Step S904 to perform the processing on another pixel. If the condition of Step S904 is not satisfied, a value of CWD is incremented by 1 (Step S908) and the processing goes back to Step S902 to perform processing on pixels on another line. Thus, Z-values of all the pixels are adjusted.

<B-6. Displacement of Pixels>

Figure 32:
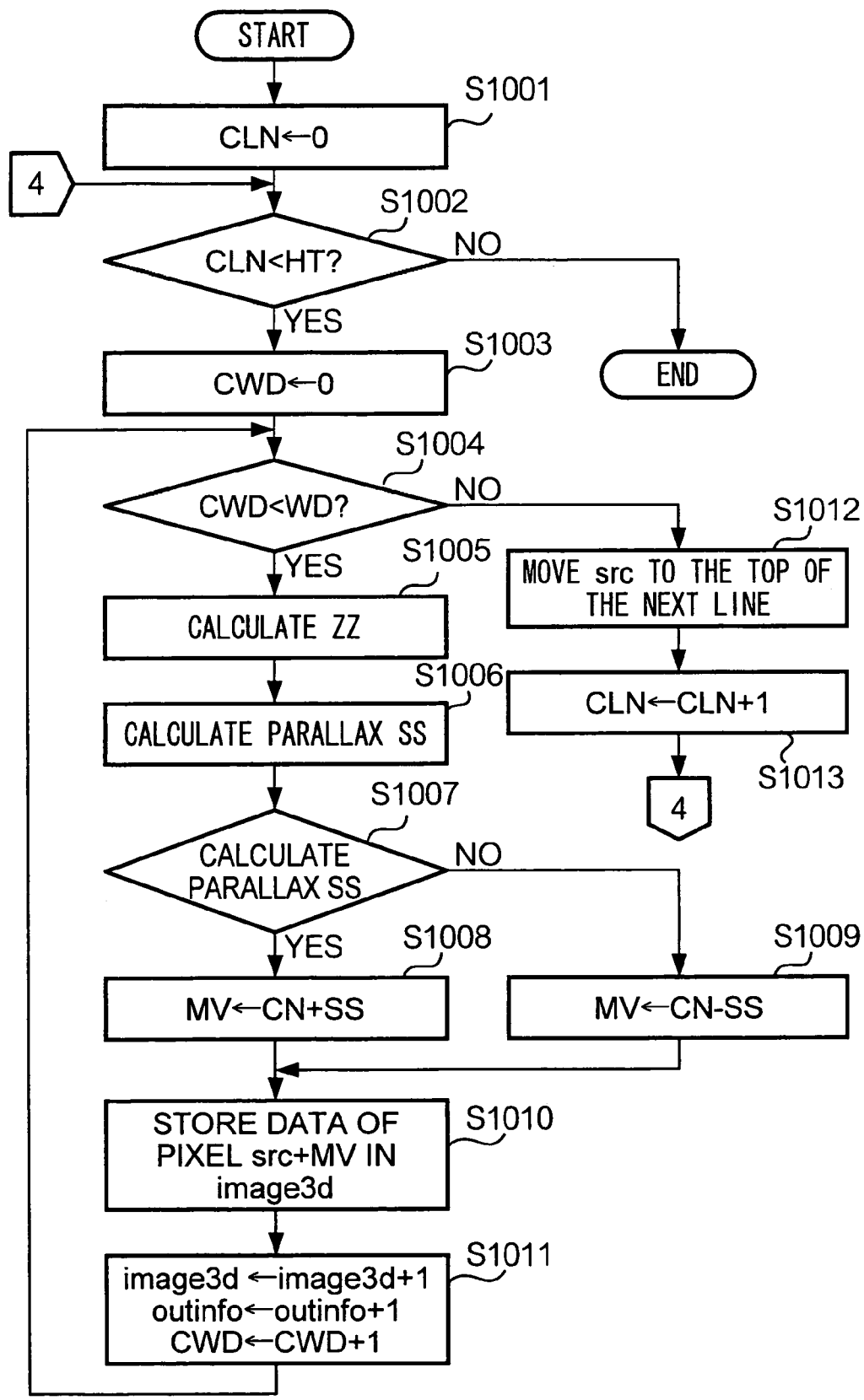
FIG. 32 is a flowchart showing a pixel displacement.

In this section, parallax (the amount of displacement) is determined on the basis of a Z-value obtained thus far, and a parameter specified by a user, and a pixel is moved horizontally according to the amount of displacement. Overall processing of displacement of pixels (Step S110 of FIG. 7) is shown in FIG. 32. It is to be noted that *image3d is a pointer representative of an address in which stereographic image data is stored.

At first, the counter CLN is reset to 0 (Step S1001) and it is checked whether a current value of CLN is smaller than HT (Step S1002). If the condition of Step S1002 is not satisfied, the processing ends. If the condition of Step S1002 is satisfied, the counter CWD is reset to 0 (Step S1003).

Figure 33:
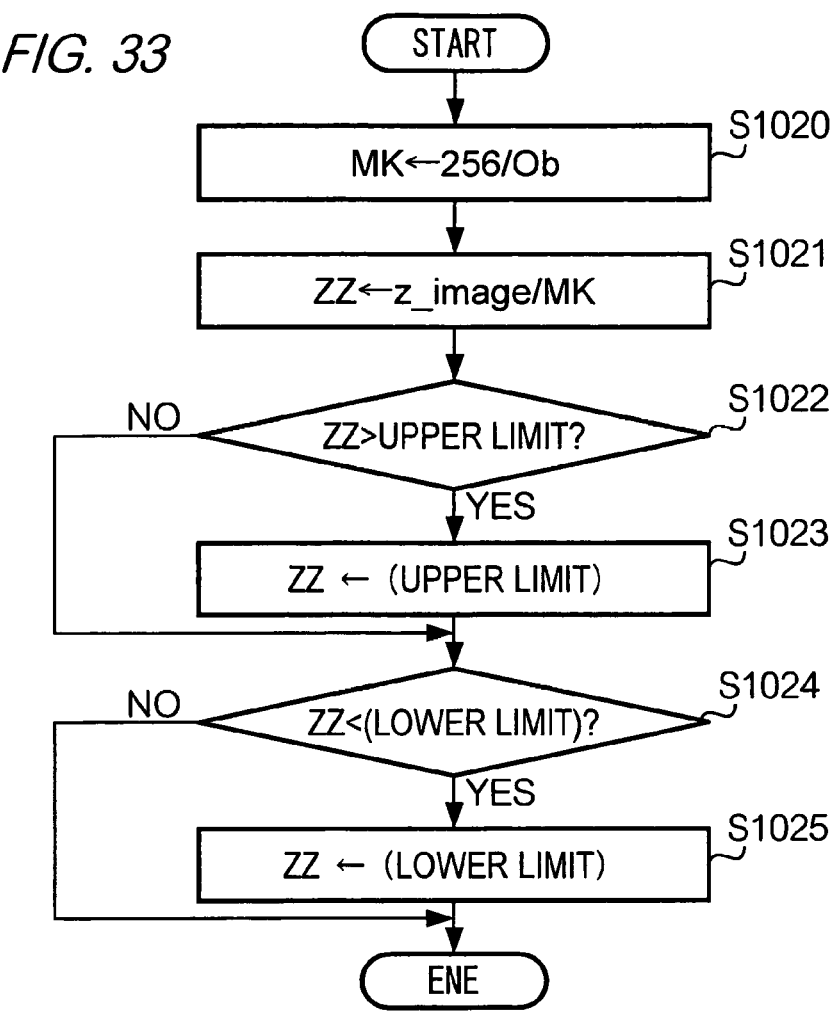
FIG. 33 is a flowchart showing the pixel displacement (cont'd).

Next, it is checked whether a current value of CWD is smaller than WD (Step S1004). If the condition of Step S1004 is satisfied, a range of Z-values corresponding to the respective outinfo are adjusted (Step S1005). A Z-value obtained in Step S 1005 is hereinafter referred to as a ZZ. Calculation of ZZ will de described with reference to FIG. 33.

At first, values available for a Z-value are adjusted using the rounding factor MK (Steps S1020 and S1021). This adjustment is similar to the processing of Step S700. A Z-value obtained in Steps S1020 and S1021 is hereinafter referred to as a ZZ.

Next, it is checked whether ZZ is larger than an upper limit (Step S1022). The upper limit is input by a user in the input box IB3 of the setting dialogue panel. If ZZ is larger than the upper limit (Step S1022, YES), ZZ is replaced by the upper limit (Step S1023). Similarly, it is checked whether ZZ is smaller than a lower limit (Step S1024). The lower limit is input by a user in the input box IB4 of the setting dialogue panel. If ZZ is smaller than the lower limit (Step S1024, YES), ZZ is replaced by the lower limit.

By the foregoing process, Z values lying beyond the upper and the lower limits are caused to fall within the predetermined range. This processing is employed in view of the fact that the number of pixels with large Z-values and small Z-values is small in comparison to the total number of the pixels. When a range of available Z-values are adjusted insofar as the pixel crossing phenomenon does not appear, quality of a generated stereographic image is improved.

Figure 34:
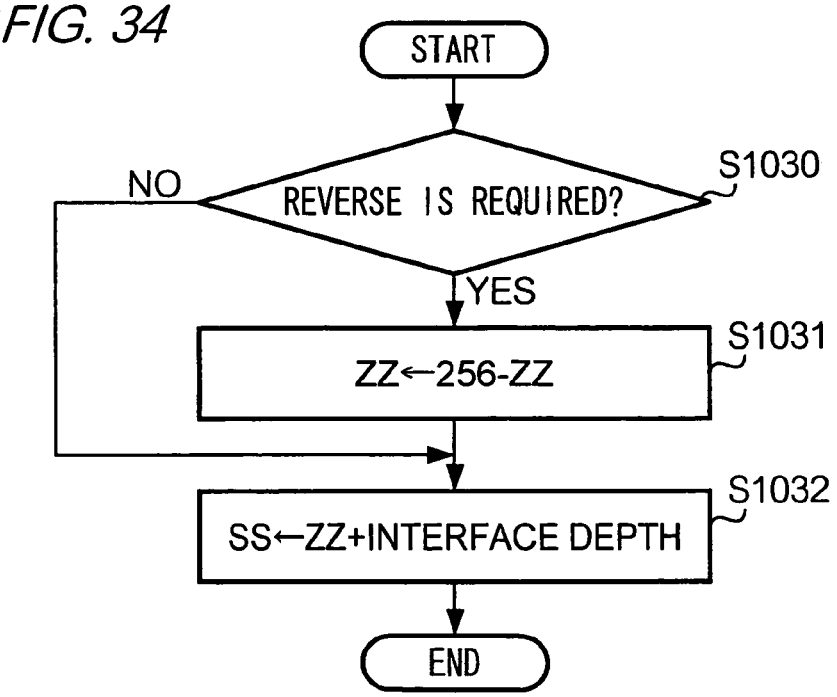
FIG. 34 is a flowchart showing the pixel displacement (cont'd).

Referring again to FIG. 32, parallax SS is calculated using ZZ obtained in the previous steps. Calculation of SS will now be described with reference to FIG. 34. In the reverse determination of Step S105, it is checked whether reverse of a Z-value is effected (Step S1030). If the reverse is effected (Step S1030, YES), 256-ZZ is assigned to ZZ (Step S1031). Next, ZZ added by an interface depth is assigned to SS (Step S1032). The interface depth is input via Input Box IB1 of the setting dialogue panel. If the reverse is not effected (Step S1032, NO), the processing proceeds to Step S1032.

Referring again to FIG. 32, when the parallax SS is calculated, a parity of a current value of the counter CLN is checked (Step S1007). If the value of the counter CLN is even (Step S1007, YES), CN+SS is assigned to MV which represents the amount of displacing a pixel (Step S1008). If the value of the counter CLN is odd, CN−SS is assigned to MV (Step S1009). Thus, a pixel is shifted in opposite directions to generate images for the right and left eyes. Next, pixel data of a position specified by src+MV in the original 2D data is stored in image3d (Step S1010). Thus far, the processing on a single pixel is finished.

Next, a value of image3d, outinfo, and the counter CWD are incremented by 1 (Step S1001), and the processing goes back Step S1004 to perform the processing on another pixel. The processing is repeatedly performed on the pixels on a single line. After the processing is performed on all the pixels in a line (Step S1004, NO), src is set to the beginning of the next line (Step S1012), a current value of CLN is incremented by 1 (Step S1013), and the processing goes back to Step S1002 to perform the processing on the next line. When the processing has been performed on all the lines (Step S1002, NO), the processing ends.

As described thus far, Z values are adjusted on an object basis that should be recognized as a single object, thus an order of depth relating to pixels within the object is maintained. As a result, a generated stereographic image successfully gives to a viewer a realistic impression.

In this embodiment, since the adjustments described above are performed on a Z-value, it is possible to generate a stereographic image with a high quality. In addition, since parameters are input by a user via the setting dialogue panel used for generating a stereographic image, it is also possible to generate a stereographic image in accordance with a user's preferences.

Although in this embodiment the adjustment of Steps S103 through S109 shown in FIG. 7 are sequentially carried out, it is not necessary to carry out all of Steps S103 through S109. Needless to say, it is possible to select a preferred adjustment(s) to be effected, from among the adjustments of Steps S103 through S 109.

<C. Modifications of the First Embodiment>

<1. Enhancements>

Figure 35:
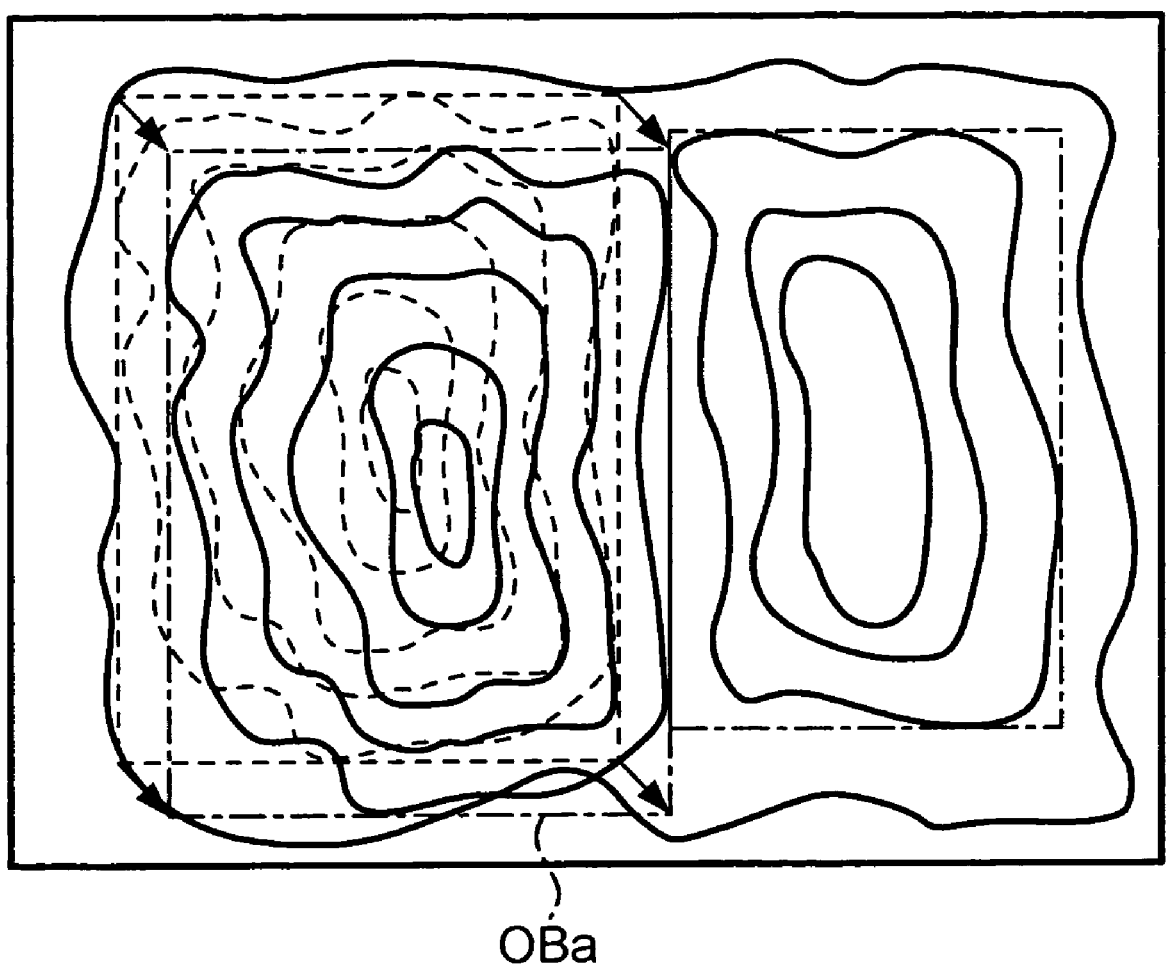
FIG. 35 illustrates an enhancement according to a modified embodiment of the present invention.

It is possible to give to a stereographic image an effect which enhances plasticity of a particular object(s) among objects displayed in a screen. The enhancement is effective especially for a case in which an object moves in a direction depth. FIG. 35 is a schematic diagram illustrating the enhancement. Specifically, the enhancement is carried out by addition of a predetermined value to Z-values in planes of equal altitude included in an object OBa, as shown in FIG. 35.

Figure 36:
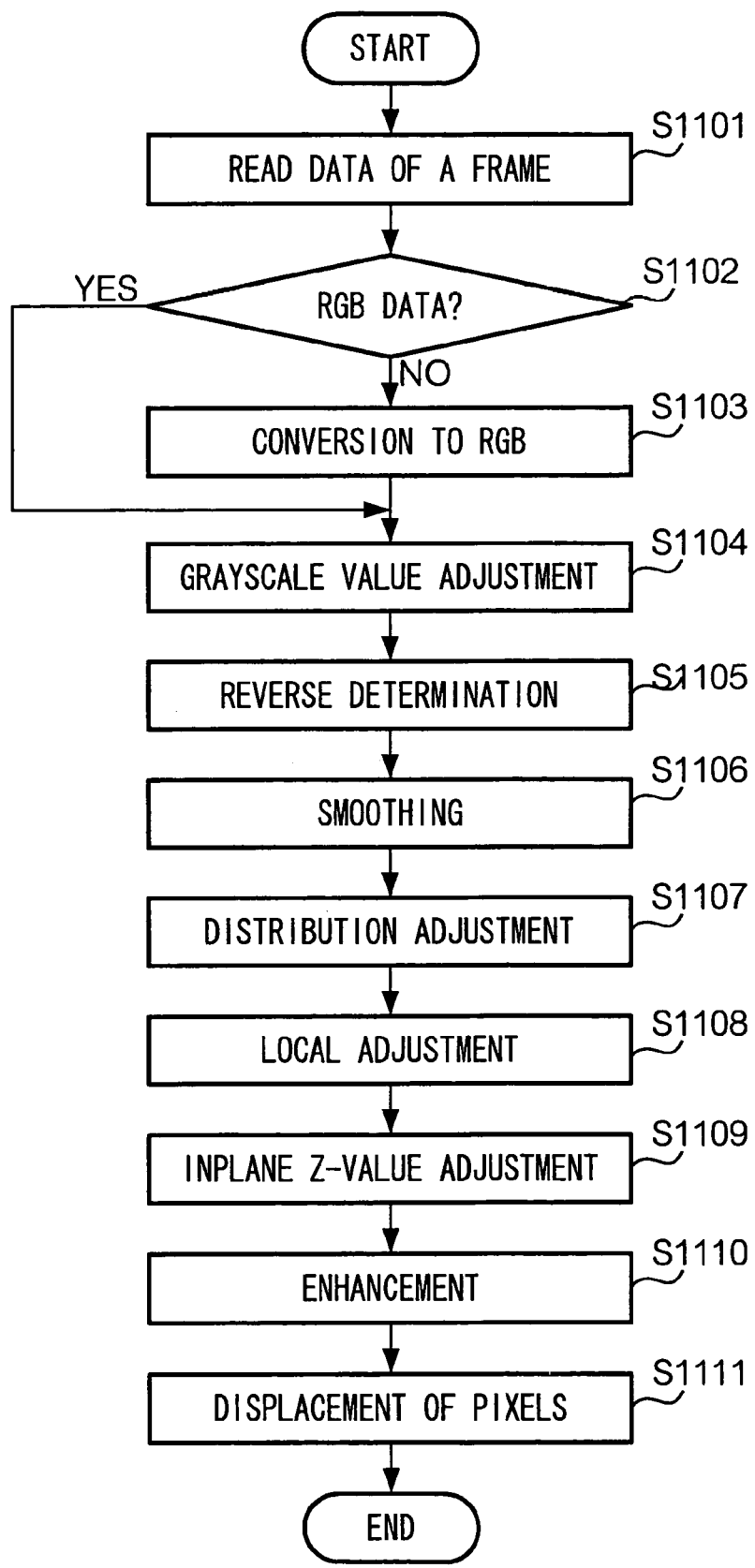
FIG. 36 is a flowchart showing an overview of image processing according to the modified embodiment.

FIG. 36 shows an example of a processing flow of the enhancement performed when 3D mode is effected. The processing shown in FIG. 35 differs from the first embodiment in that it performs the enhancement (Step S1110) before the displacement of pixels (Step S111). Steps S1101 through S1119 are the same as the respective steps of the first embodiment, and description thereof is therefore omitted.

Figure 37:
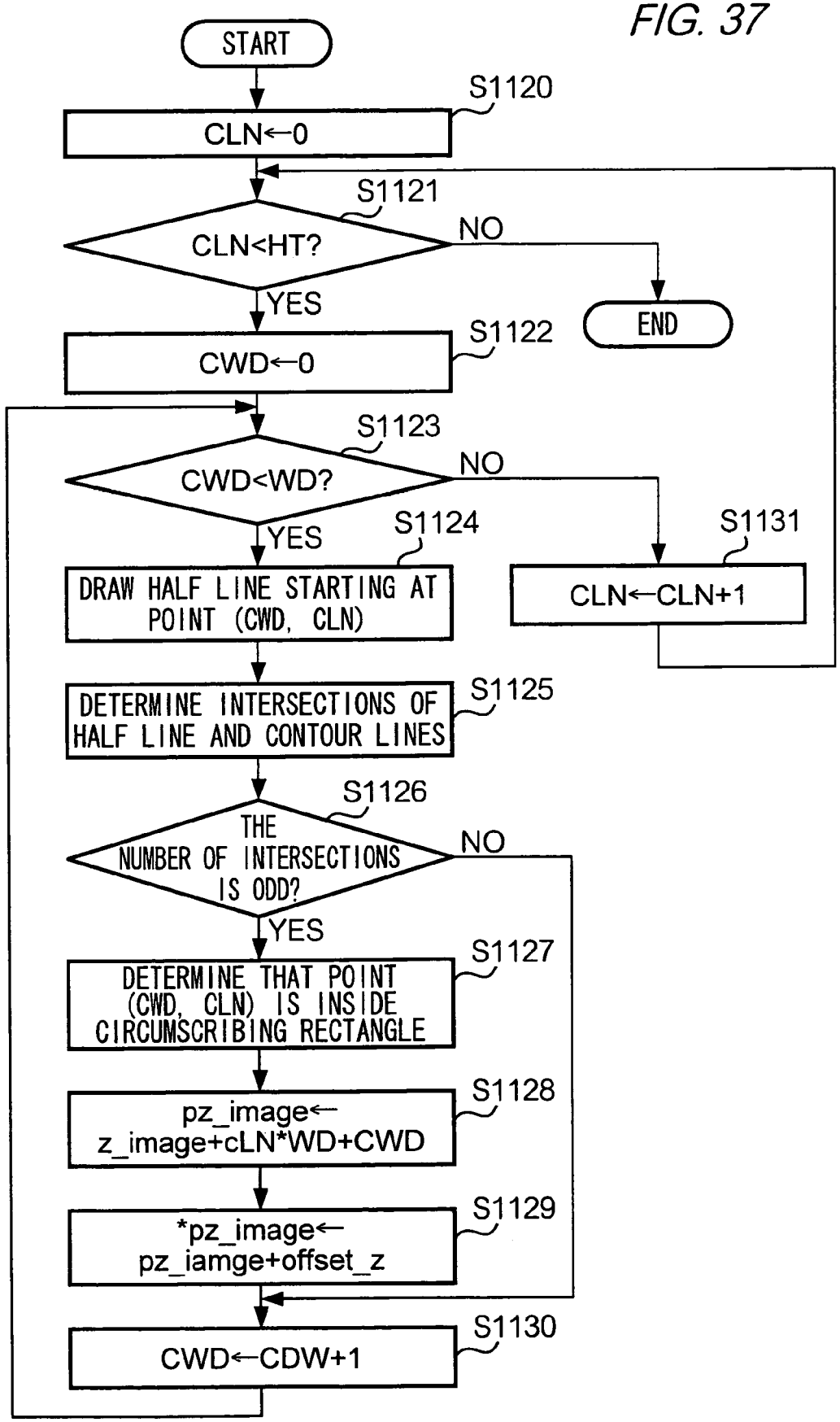
FIG. 37 is a flowchart showing an enhancement according to the modified embodiment.

The enhancement (Step S1110) will be described referring to FIG. 37. It is to be noted that offset_z is a parameter indicating a degree of enhancing an object. At first, a terminate check is performed in Steps S1120 through S1222. Specifically, the counter CLN is reset to 0 (Step S1120), and it is checked whether a current value of the counter is smaller than HT (Step S1121). If the condition of Step S1121 is not satisfied, the enhancement ends. If the condition of Step S1121 is satisfied, a value of CLN is reset to 0 (Step S1122).

Next, it is checked whether a current value of the counter CWD is smaller than WD (Step S1123). If the condition of Step S1123 is satisfied, a half line is drawn starting at a coordinate (CWD, CLN) and ending at the top of the upper edge of the image (Step S1124), and the number of intersections of the half line and the contour lines is obtained (Step S1125).

Next, a parity of the number of intersections is checked (Step S1126). If the number of the intersections is odd (Step S1126, YES), it is determined that the coordinate (CWD, CLN) lies inside a corresponding rectangle. Next, z_image+CLN*WD+CWD is assigned to pz_image (Step S1128), and a value of *pz_image+CLN*WD+CWD *to *pz_image (Step S1129). If the number of intersections is even (Step S1126, NO), Steps 1127 through S1129 are omitted. Thus far, the enhancement is performed on a single pixel. Next, a value of the counter CWD is incremented by 1, and the processing goes back to Step S1123 to perform the enhancement on another pixel. This processing ends when the enhancement is performed on all the pixels.

<2. Display Scheme>

In the above embodiment, so called Odd-even scheme for displaying a stereographic image is employed, in which images for the left eye are displayed in the even-numbered lines of a screen of Display 21 and images for the right eye are displayed in the odd-numbered lines of a screen of Display 21. However, other display schemes can be employed in the present invention. For example, it is possible to display images for the right eye in the even-numbered lines of a screen of Display 21 and images for the left eye in the odd-numbered lines of a screen of Display 21.

Figure 38:
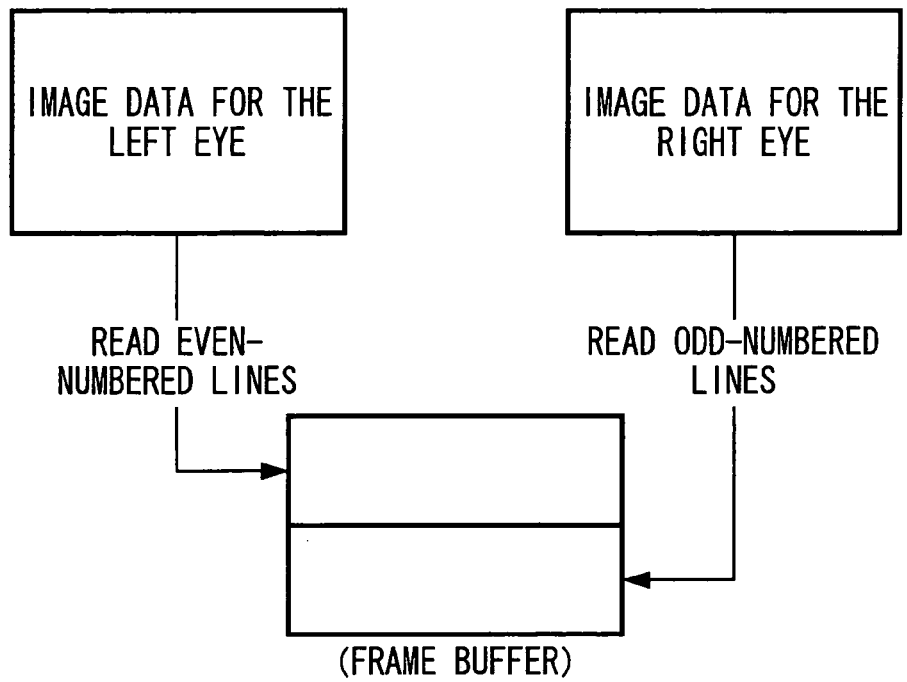
FIG. 38 is a conceptual diagram illustrating a scheme of displaying a stereographic image according to the modified embodiment.

Further, it is possible to employ a so called Up-down scheme, as shown in FIG. 38, in which data of the even-numbered lines of an image for the left eye are read and stored in the upper part of a frame buffer, and data of the odd-numbered lines of an image for the right eye are read and stored in the lower part of the buffer. This scheme is employed typically in a projector for displaying a stereographic image or the like. Needless to say, it is possible to read data of the even-numbered lines of an image for the right eye and store it in the upper part of the buffer, and read data of the odd-numbered lines of an image for the left eye and store it in the lower part of the buffer.

Figure 39:
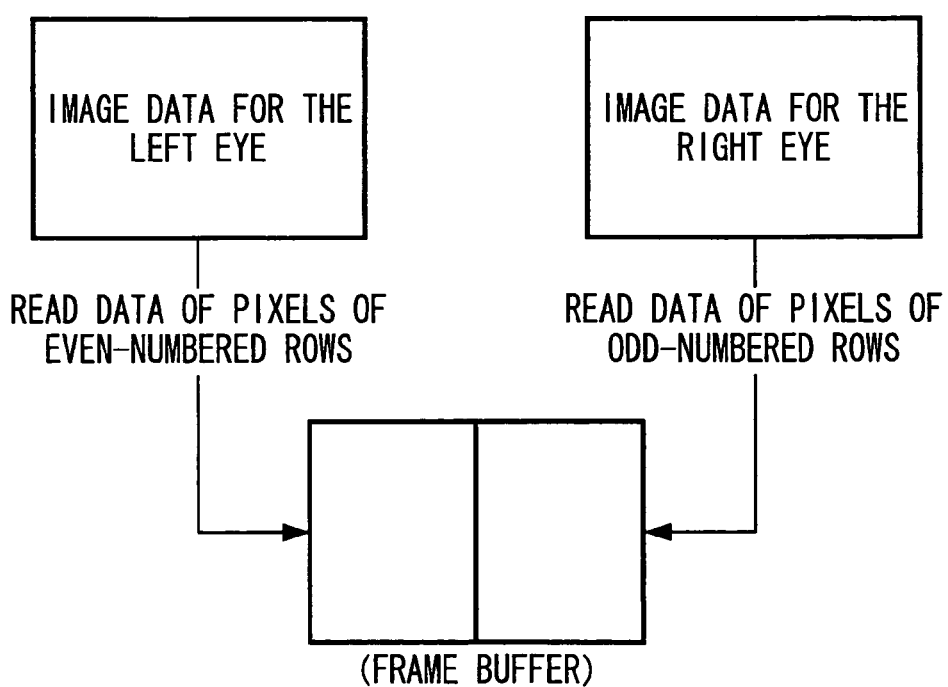
FIG. 39 is also a conceptual diagram illustrating a scheme of displaying a stereographic image according to the modified embodiment.

Still further, it is possible to employ a so called Left-right scheme shown in FIG. 39, in which data of the even-numbered rows for the left eye is read and stored in the left part of a frame buffer, and data of the odd-numbered rows for the right eye is read and stored in the right part of the buffer. This scheme is typically employed in a CRT for displaying a stereographic image. Needles to say, it is possible to store data of the even-numbered rows for the right eye in the left part of the buffer and to store data of the odd-numbered rows for the left eye in the right part of the buffer.

Figure 40:
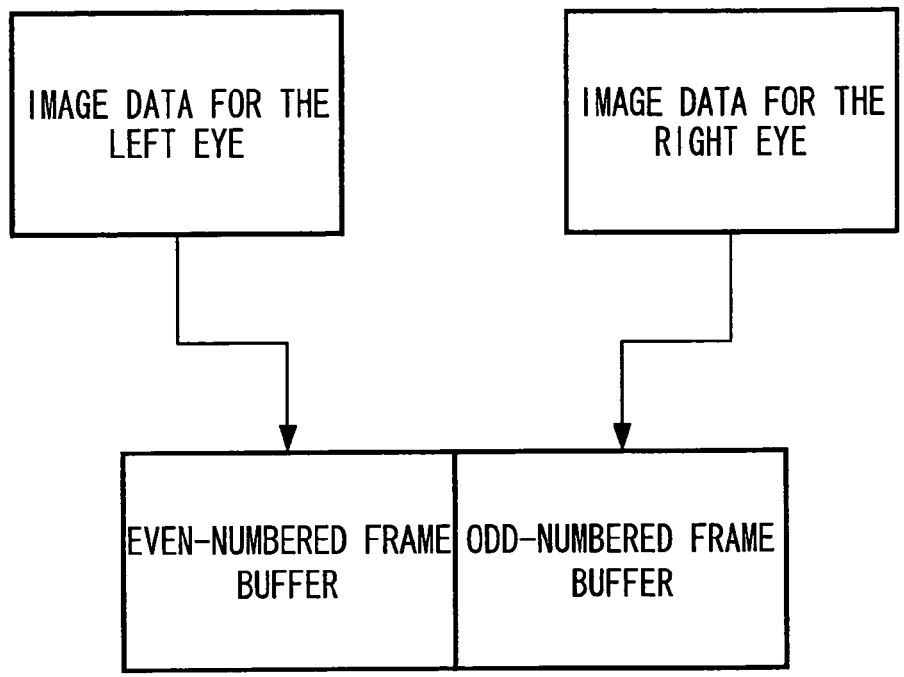
FIG. 40 is also a conceptual diagram illustrating a scheme of displaying a stereographic image according to the modified embodiment.

Still further, it is possible to employ a so called two-frame scheme, as shown in FIG. 40, in which an image for the left eye is stored in even-numbered frame buffers and an image for the right eye is stored in odd-numbered frame buffers. This scheme is typically employed in a projector for displaying a stereographic image or the like. Needless to say, it is possible to store image data for the right eye in even-numbered frame buffers, and to store image data for the left eye in odd-numbered frame buffers.

Figure 41:
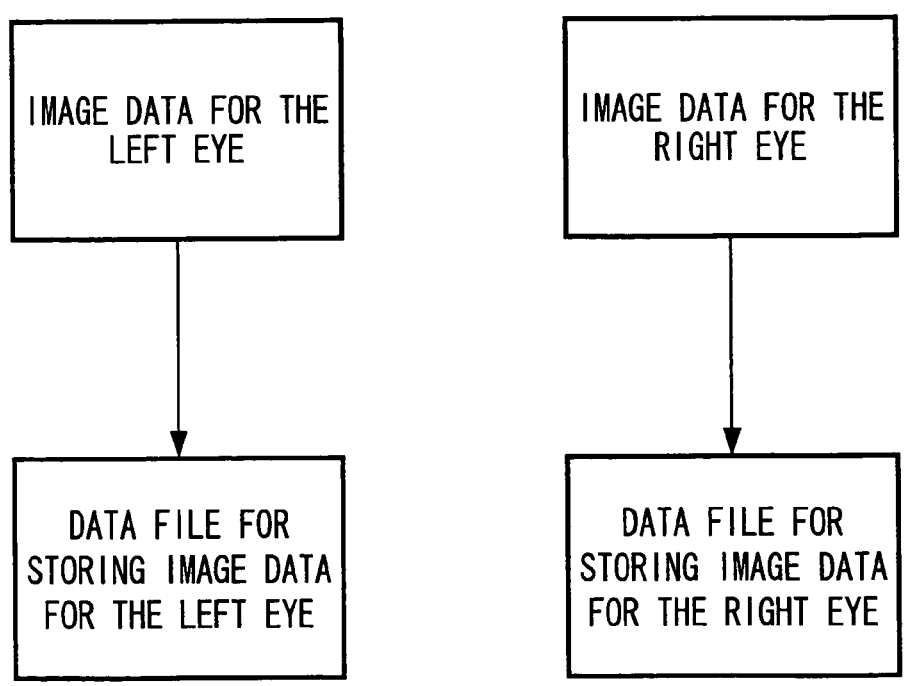
FIG. 41 is also a conceptual diagram illustrating a scheme of displaying a stereographic image according to the modified embodiment.

Still further, it is possible to employ a so called Odd-even file separation scheme, as shown in FIG. 41, in which image data for the left eye and image data for the right eye are stored in files separately. This scheme is typically employed in a projector for displaying a stereographic image.

<3. Data Storage Area>

Figure 42:
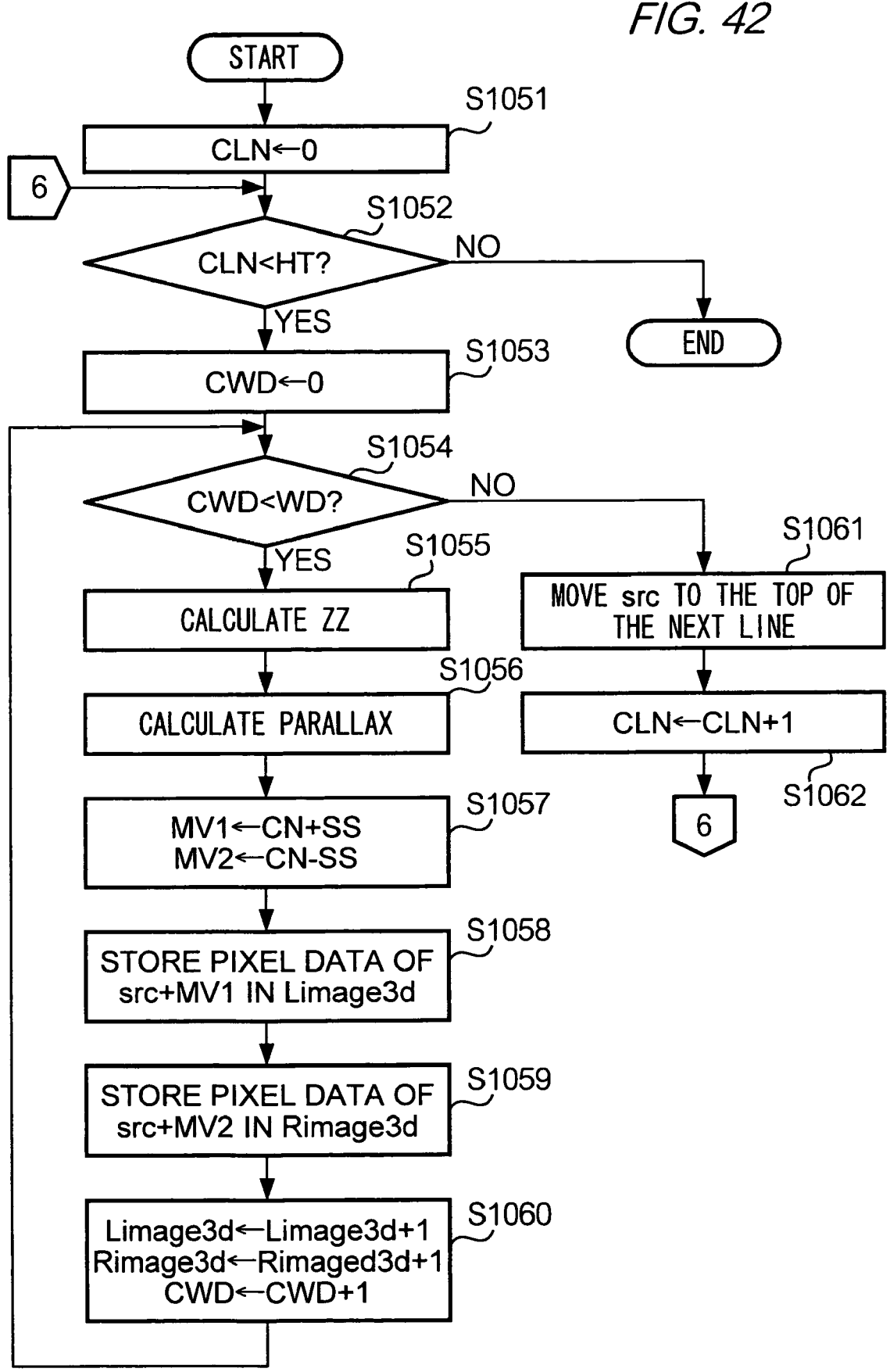
FIG. 42 is a flowchart showing a pixel displacement according to the modified embodiment.

It is possible to store images for the right and the left eyes in different storage areas. In this case, the displacement of pixels (Step S110 of FIG. 7) is carried out according to a flow shown in FIG. 42. The displacement of pixels according to the modifications of the first embodiment differs from the displacement of pixels according to the first embodiment itself in performing Steps S1057 through S1060 of FIG. 42, instead of Steps S1007 through S1011 of FIG. 32. Specifically, image data for the right and the left eyes is respectively stored in data storage areas which are identified by Rimage3d and Limage3d for the left and the right eyes.

More specifically, when parallax SS is obtained in Step S1056, CN+SS is assigned to MV1 and CN−SS is assigned to MV2 (Step S1057). Next, data of a pixel at a position identified by src+MV1 which is included in original 2D image data is stored in Limage3d (Step S1058), and data of a pixel at a position specified by src+MV2 is stored in Rimage3d (Step S1059). Next, values of Limage3d, Rimage3d, outinfo, and CWD are incremented by 1 (Step S1060), and the processing goes back to Step S1054 to perform the enhancement on another pixel.

<4. Data Type>

In the above embodiment image data is data of a 2D color image; however, the present invention can be adapted to data of a 2D monochrome multi gradation image such as a monochrome film. Also, in the above embodiment original data to be processed is data for a single frame of moving images; however, it is possible to process data of a freeze frame picture in the present invention.

<5. Calculation of Z-Value>

In the above embodiment R, G, and B values of an original image are multiplied by the coefficients 0.59, 0.30, 0.11, respectively, to generate a Z value to be processed by the subsequent adjustments; however, other coefficients can be used. The coefficients can be modified to obtain the most natural plasticity from the generated 3D image, or can be modified according to a user's preferences. Also, it is possible to describe a color of a pixel on the basis of brightness, saturation or hue, instead of RGB. Also, it is possible to use ARGB, in which A indicates an alpha component of a pixel, and the like.

<6. Identification of Objects>

In the above embodiment, contour lines with regard to Z-values are obtained, an object is identified on the basis of the contour lines, and then Z-values of pixels relating to the object are corrected. However, other methods for identifying an object can be used in the present invention. For example, edges are found based on information on brightness, saturation, or hue of pixels, so as to determine that an area enclosed by the edges corresponds to an area of a single object.

SECOND EMBODIMENT

<A. Configuration of Apparatus>

Figure 43:
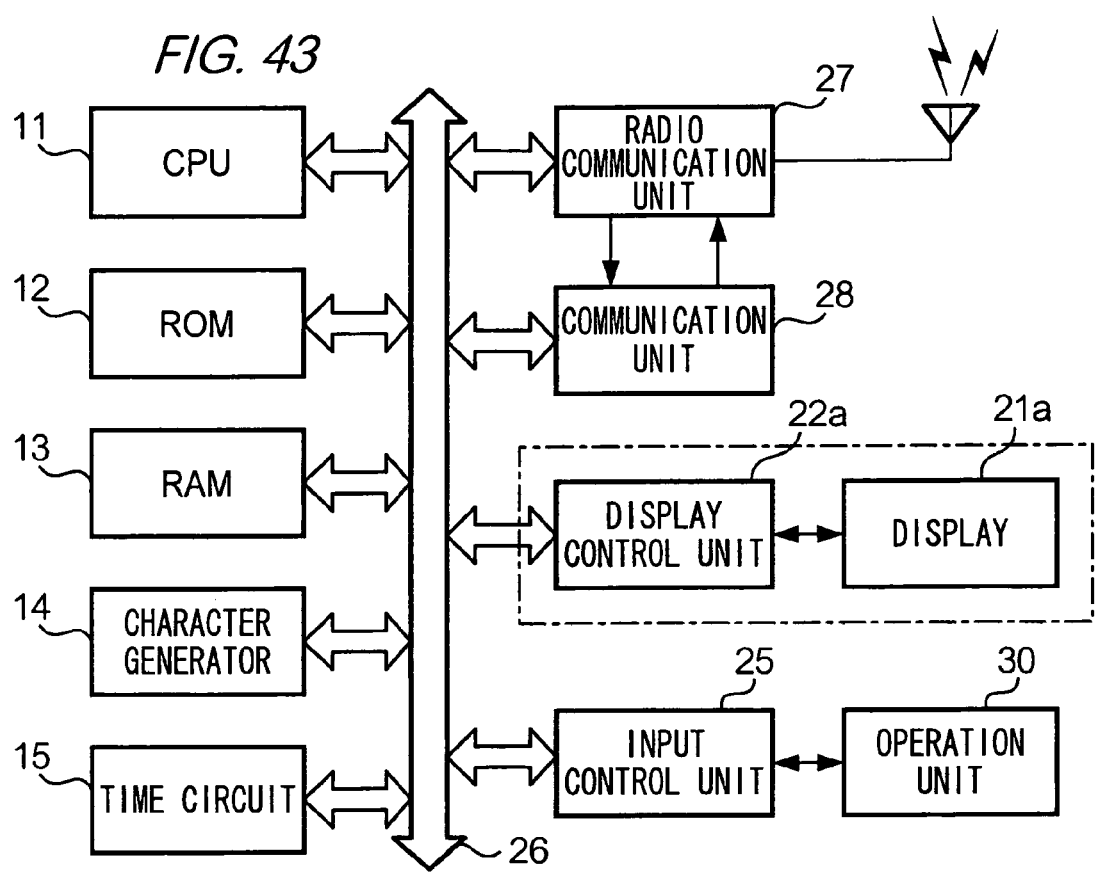
FIG. 43 is a block diagram illustrating a functional configuration of a Mobile terminal 1A of the second embodiment of the present invention.
Figure 44:
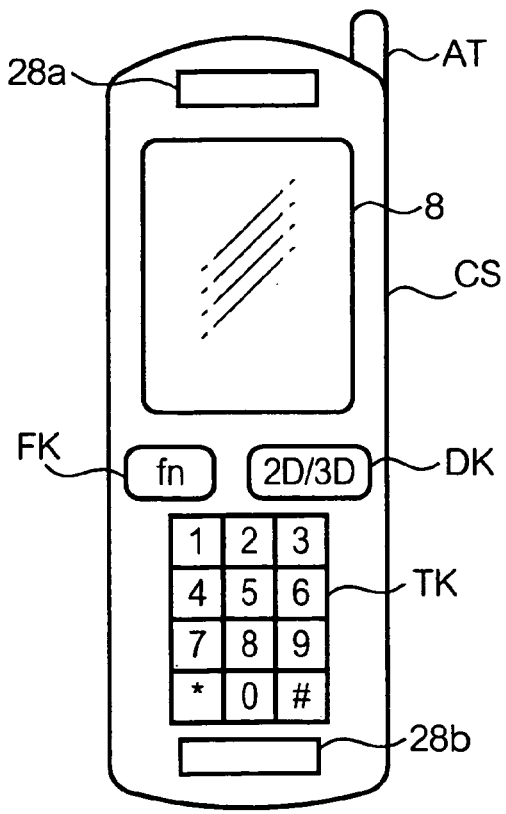
FIG. 44 is an external view of Mobile terminal 1A.

The second embodiment of the present invention will now be described. Like numerals are assigned to like elements of the first embodiment. The second embodiment differs from the first embodiment in that a Mobile terminal 1A is used instead of 3D image generation apparatus 1. FIG. 43 shows a functional configuration of Mobile terminal 1A and FIG. 44 shows an external view of Mobile terminal 1A. As shown in FIG. 44, Mobile terminal 1A is, for example, a mobile phone. The following description mainly describes differences between the first and the second embodiments.

FIG. 43 shows a radio communication unit 27, which includes an antenna AT, for connecting Mobile terminal to a mobile communications network to transmit and receive data such as moving images data. The network includes a communications unit 28, which includes a speaker unit and a microphone unit, for carrying out a voice communications. A Display 21a has a function of displaying 2D mode images and 3D images alternatively, and includes a display panel for exciting stereopsis when an image is viewed by the naked eye. A display control unit 22a controls Display unit 21a. An operations unit 30 is an input device such as a ten key pad or a cursor key, via which a user inputs directions to Mobile terminal 1A.

Figure 45:
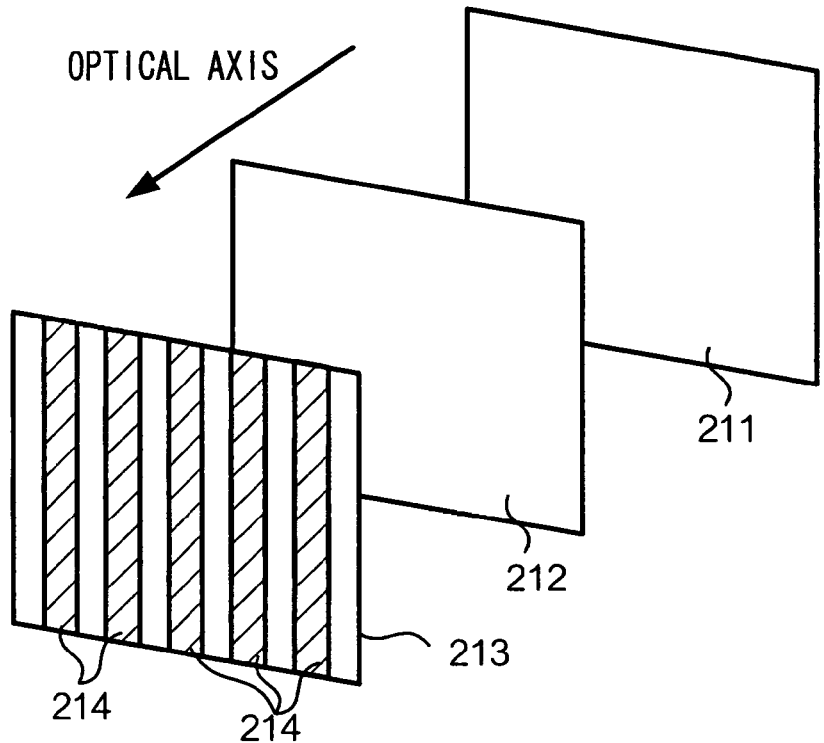
FIG. 45 is a schematic diagram illustrating a configuration of a display 21b.
Figure 46:
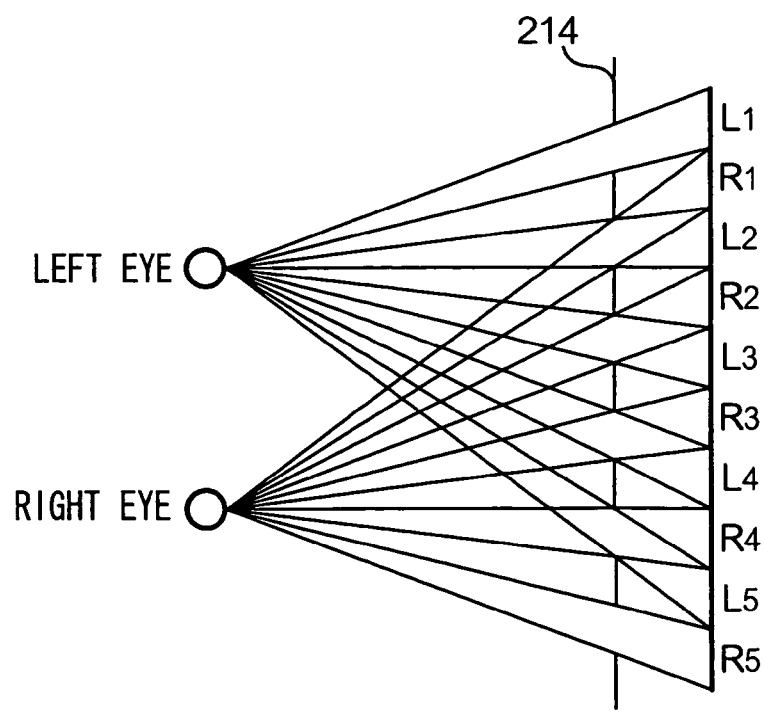
FIG. 46 illustrates a principle of exciting stereopsis when an image is viewed by the naked eye.

The principle of exciting stereopsis when an image is viewed by the naked eye will be briefly described with reference to FIGS. 45 and 46. As shown in FIG. 45, Display 21a includes a backlight 211, liquid crystal panel 212, and liquid crystal panel 213 on which parallax barriers are disposed. Striped formed images for the left eye L1 through L5 and striped formed images for the right eye R1 through R5 in the panel are displayed at a spacing equivalent to a slit width, respectively, so that the images L1 through L5 reach only the left eye of a viewer and the images R1 through R5 reach only the right eye of the viewer when the viewer is at a predetermined distance from the screen. In this case, if images are generated so that a difference of parallax of the images L1 through L5 and the images R1 through R5 is a constant, the images excite stereopsis when viewed by the naked eye.

Referring again to FIG. 44, a ten key pad TK is disposed in the lower body of Mobile terminal 1A, and above TK are disposed function keys and a switch DK used for switching modes between a normal mode (2D mode) and a stereograph mode (3D mode). A screen of Display 21a is disposed above FK and DK. Antenna AT is disposed above the screen. Holes 28a and 28b for a speaker unit included in Radio Communication unit 28 and a microphone unit, respectively, are disposed at suitable positions of Mobile terminal 1A.

<2. Operations>

<A. Display of Static Image>

Figure 47:
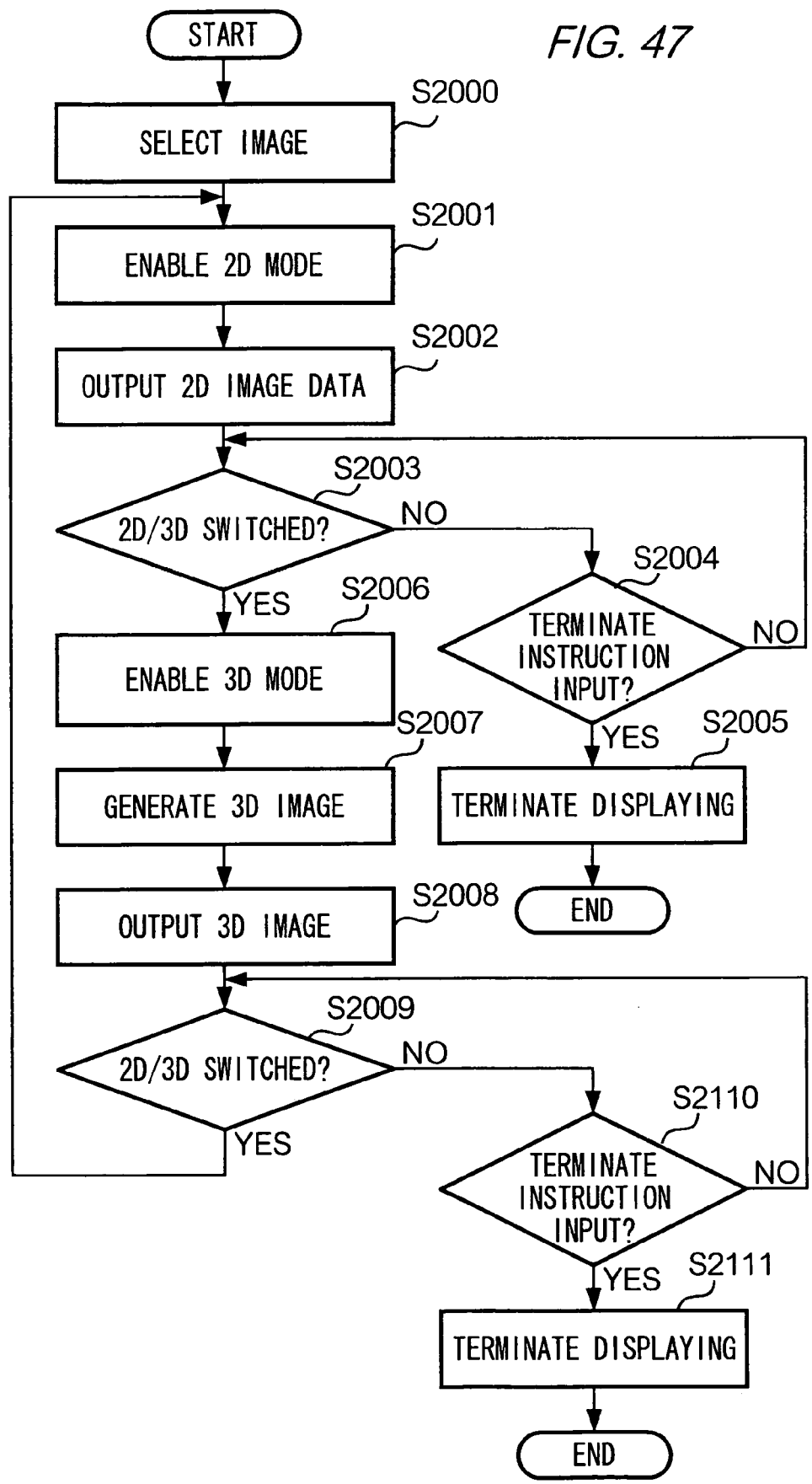
FIG. 47 is a flowchart showing a process for displaying a static image preformed by Mobile terminal 1A.

FIG. 47 shows an example of a processing flow of displaying a static image performed by Mobile terminal 1A, the image being stored in Mobile terminal 1A. At first, after a user switches on Mobile terminal 1A performs certain operations to select an image (Step S2000), CPU 11 enables the normal mode (2D mode) (Step S2001). Next, CPU 11 outputs image data to a display control unit 22a (Step S2002). As a result, the user is able to view the static image in the usual manner.

When the user inputs an instruction to stop reproduction of the image (Step S2003, NO and Step S2004, YES), CPU 11 terminates displaying the image (Step S2005).

When Switch DK is operated (Step S2003, YES), CPU 11 enables the stereograph mode (Step S2006) and starts generating data of a stereographic image (Step S2007). CPU 11 outputs the generated data to Display control unit 22a (Step S2008). As a result, the user is able to view the stereographic image. A method for generating data of a stereographic image is the same as the method employed in the first embodiment, and description thereof is therefore omitted.

When the user inputs an instruction to stop reproduction of the image (Step S2009, NO and Step S2110, YES), CPU 11 terminates displaying the image (Step S2111). When the user operates Switch DK once again (Step S2009, YES), the processing goes back to Step S2001 and the normal mode (2D mode) is effected.

<B. Display of Moving Images>

Figure 48:
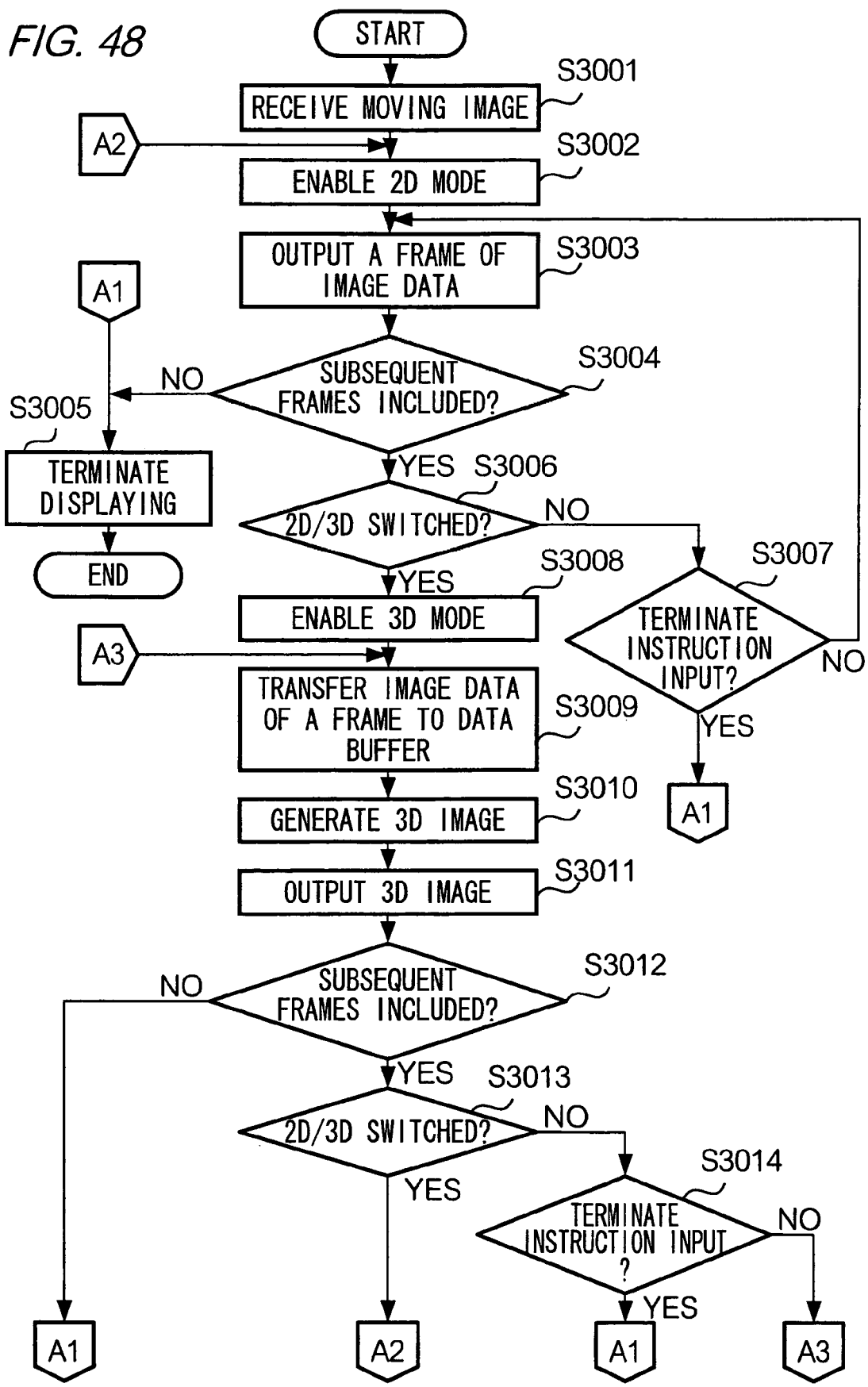
FIG. 48 is a flowchart showing a process for displaying moving images preformed by Mobile terminal 1A.

FIG. 48 shows an example of a processing flow for downloading moving images via a mobile communication network and displaying them in Mobile terminal 1A. When Mobile terminal 1A is turned on, CPU 11 enables normal mode (2D mode) (Step S3001). When a user carries out predetermined operations, data of moving images including a plurality of frames is received (Step S3002). CPU 11 stores the received data in RAM 13 and outputs data of the first of the frames to Display control unit 22a (Step S3003).

Next, CPU 11 determines whether the data includes subsequent frames (Step S3004). In a case where the data does not include subsequent frames (Step S3004, NO), or in a case where a user inputs an instruction to terminate reproduction of the images although the data includes subsequent frames (Step S3007, YES), CPU 11 terminates reproduction of the images. If the data includes subsequent frames (Step S3004, YES), CPU 11 reads 20 data of another frame from RAM 13 and outputs it to Display control unit 22a.

By the above process, image data is read and output to the display frame by frame, until a user inputs an instruction to terminate reproduction of the images (Step S3006, NO and Step S3007, NO). When a user inputs an instruction to terminate reproduction of the images (Step S3006, NO and Step S3007, YES), reproduction of the images is terminated (Step S3005).

Thus far, a user of Mobile terminal 1A is able to view moving images in a normal mode in a default setting.

When a user operates Switch DK (Step S3006, YES), CPU 11 enables stereograph mode (Step S3008). Next, CPU 11 read from RAM 13 image data of a frame subsequent to the frame (Step S3009). CPU 11 performs the processing on the read data so as to generate a stereographic image described above (Step S3010), and outputs processed data to Display control unit 22a (Step S3011). By this process, a user is able to view a moving stereographic image.

The stereographic moving images are displayed frame-by frame until at least of the following conditions is satisfied: there is no subsequent frame (Step S3012, NO); a user operates Switch DK (Step S3013, YES); and a user inputs a direction of terminating reproduction of the images (Step S3014, YES).

When a user operates Switch DK (Step S3013, YES), the processing goes back to Step S3001, and CPU 11 enables normal mode (2D mode) and outputs image data of the next frame to Display control unit 22a.

In this embodiment, when a user operates Switch DK, images (including a static image and moving images) displayed in Display 21a are immediately switched between 2D images and 3D images. Thus, a user is able to switch images between 2D images and 3D images while viewing the images. The capability of switching provides unprecedented enjoyment with a viewer. For example, it is possible that a user generally watches moving images in 2D mode and switches mode to 3D mode to enjoy a favorite scene.

Although in this embodiment data of moving images is assumed to be downloaded in toto, methods for receiving and reproducing moving images are not restricted to those described above. For example, live streaming can be employed in which Mobile terminal 1A receives data of images one after another.

THIRD EMBODIMENT

Figure 49:
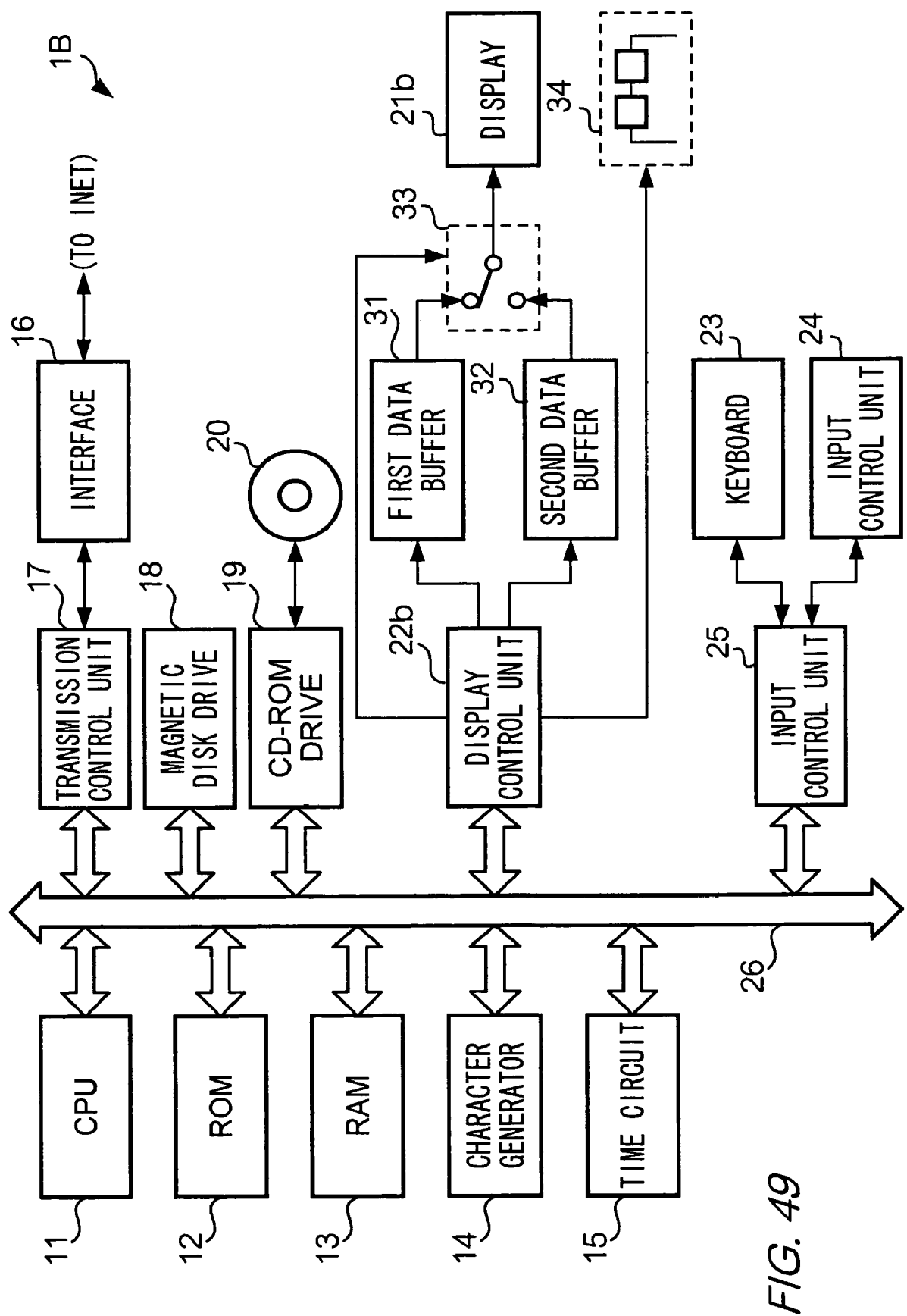
FIG. 49 is a block diagram illustrating an example of a functional configuration of a 3D image generating apparatus 1B according to the third embodiment of the present invention.

FIG. 49 shows a functional configuration of a 3D generating apparatus 1B of the third embodiment. 3D generating apparatus 1B differs from 3D generating apparatus 1 of the first embodiment in having a Display control unit 22b, the first data buffer 31, and the second data buffer 32 instead of Display control unit 22, and having a Display 21b instead of Display 21. In this embodiment, a scheme for exciting stereopsis in a user wearing Glasses 34 in which liquid crystal shutters are disposed is used.

Similarly to the second embodiment, in 3D image generating apparatus 1B stereogram mode and normal mode can be selected. In 3D mode, Display control unit 22b stores image data for the left and the right eyes in First data buffer 31 and Second data buffer 32, respectively. Display control unit 22b controls a Switch 33 to select First data buffer and Second data buffer alternately. Specifically, a screen is refreshed at a predetermined time interval on Display 21b, and Display control unit 22b switches Switch 33 in synchronization with the refresh interval. In addition, Display control unit 22b controls switching the shutters of Glasses 34 in synchronization with the refresh interval.

More specifically, when Switch 33 selects First data buffer 31, shutters disposed on the glass for the left eye are turned on (i.e. transparent state) and shutters disposed on the glass for the right eye are turned off (i.e. cutoff state). On the other hand, when Switch 33 selects Second data buffer 31, shutters disposed on the glass for the right eye are turned on (i.e. transparent state) and shutters disposed on the glass for the left eye are turned off (i.e. cutoff state). By this process, images for the left eye reach only the left eye and images for the right eye reach only the right eye, thereby stereopsis is excited. When 2D mode is effected, Display control unit 22b stores image data in First data buffer and controls Switch 33 to select First data buffer 31.

Figure 50:
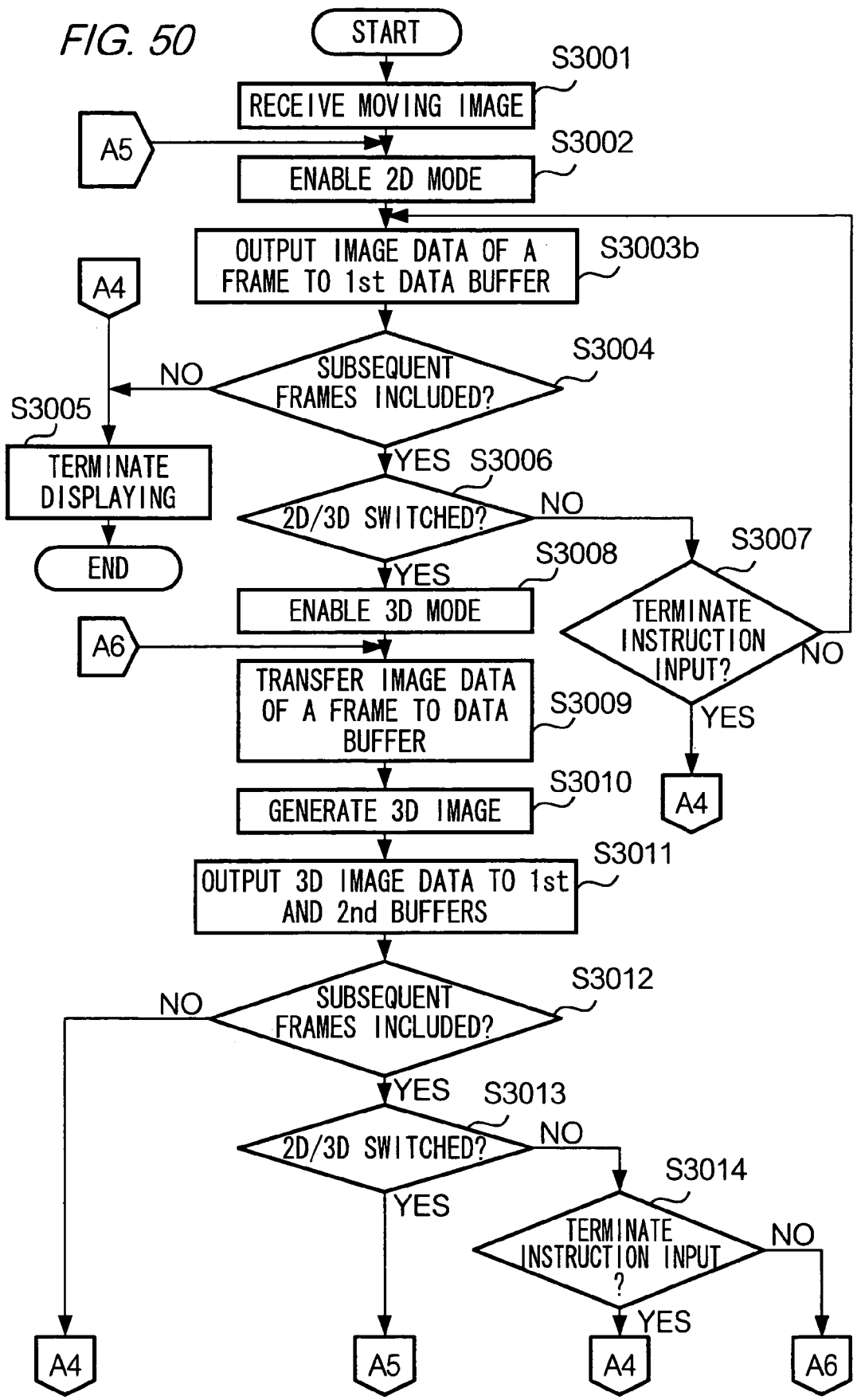
FIG. 50 is a flowchart showing a process for displaying moving images preformed by 3D image generating apparatus 1B.

FIG. 50 shows an example of a processing flow for displaying moving images which have been received using 3D generating apparatus 1B. The outline of the processing flow is the same as the flow of the second embodiment described with reference to FIG. 48, except that Steps S3003b and S3011b are performed instead of Steps S3003 and S3011, respectively.

More specifically, in 2D mode CPU 11 extracts image data of a single frame from the data stored in RAM 13, stores it in First data buffer 31, and then selects First data buffer 31 of Switch 33 (Step S3003*b*). As a result, a user is able to view 2D moving images in a default setting.

When 3D mode is effected, Display control unit 22*b* stores image data for the left eye generated in Step S3010 in First data buffer 31, and stores image data for the right eye in Second data buffer 32 (Step S3011*b*). Next, Display control unit 22*b* switches Switch 33 between First and Second data buffers synchronous with the refresh interval of Display unit 21*b*. As a result, a user can successfully view the image of the frame three-dimensionally. Similar processing is performed on other frames one after another, thereby providing a user with stereopsis for the moving images.

<Applications>

Figure 51:
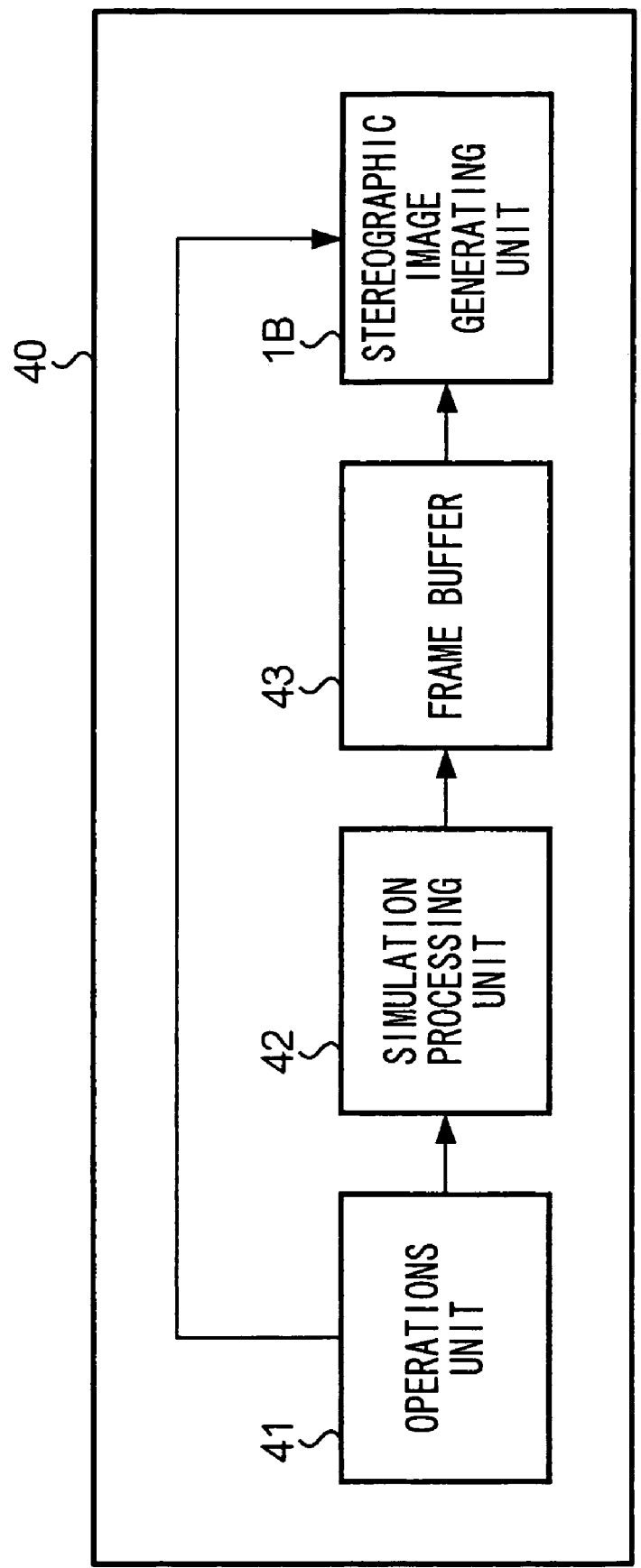
FIG. 51 is a block diagram illustrating a functional configuration of a train simulator 40 according to an application of the present invention.

It is possible to apply 3D generating apparatuses of the present invention to simulators used for training in controlling a car, train, airplane, and the like. Specifically, displaying stereographic images in a screen of the simulators enables a trainee to perceive displayed images more realistically. FIG. 51 shows an example of a Driving simulator 40 in which 3D image generating apparatus 1B is incorporated.

As shown in FIG. 51, an Operations unit 41 includes a control device such as a steering wheel. An instruction input by a user is supplied to a Simulation processing unit 42. Simulation processing unit 42 performs processing on the basis of the input instruction by Operations unit 41, to generate image data to be displayed on the screen. The image data is output to a Frame buffer 43.

When 2D mode (normal mode) is effected, 2D images are displayed in 3D image generating apparatus 1B. When 3D mode is effected, image data of a single frame is extracted from Frame buffer 43 and data of a stereographic image is generated. As a result, a stereographic image is displayed in the screen.

A method for generating a 3D image according to the present invention can be implemented by LSI (large scale integrated circuit). Stereographic images can be displayed in various kinds of electronic devices incorporating the LSI. For example, a method for generating a 3D image based on the present invention can be applied to a communication terminal, digital camera, TV receiver, or storage display, or to medical appliances such as endoscopes.

Although preferred embodiments of the present invention have been described thus far, it will be understood that they are not intended to limit the invention to these embodiments. On the contrary, the invention is intended to cover alternatives, modifications, and equivalents, which may be included within the scope of the invention.

The invention claimed is:

1. A method for a stereographic image generation apparatus for generating a stereographic image, the method comprising:
   a calculating step of calculating Z-values of each pixel based on only image data for that pixel, the pixels forming an image, each Z-value being assigned to a pixel, and each Z-value representing a depth of an object corresponding to the pixel;
   an adjusting step of adjusting a Z-value of a target pixel obtained in said calculating step using a Z-value of at least one individual pixel other than the target pixel; and
   a generating step of determining an amount of displacement of the target pixel on the basis of an adjusted Z-value of the target pixel, and displacing the target pixel horizontally by the determined amount, to generate images for the right and the left eyes, wherein:
   in said calculating step the Z-value of each target pixel is obtained by adding predetermined weights to color components of image data of the target pixel, and
   in said adjusting step:
      the Z-values of each pixel are adjusted so that a single step available for a Z-value of a pixel corresponding to an object located backward in an original image express deeper depth than a single step available for a Z-value of a pixel corresponding to an object located forward in the original image;
      an average of Z-values of all pixels within an area which includes the target pixel is obtained;
      the Z-value of the target pixel is replaced by the obtained average;
      a step size of quantization of the Z-value is determined based on a value of a parameter specified by a user; and
      either an upper limit or a lower limit of the calculated Z-value is determined based on the value of the parameter specified by the user.

2. The method of claim 1, wherein the weights are determined based on the ratio of cone cells sensitive of R, G, and B, respectively, which cones exist in a retina of a human eye.

3. The method of claim 1, wherein in said adjusting step:
   tendency of Z-values of pixels in the image is analyzed by comparing a Z-value of a pixel within an area with a Z-value of a pixel within another area; and
   when a result of the analysis agrees with a predetermined condition, a quantitative relation between the amount of displacement of the target pixel and the Z-value of the target pixel is reversed in said generating step.

4. The method of claim 1 wherein in said adjusting step:
   a distribution of the Z-values of all pixels in the image and an average of all pixels in the image are obtained; and
   deviation of the distribution is corrected using the obtained average.

5. The method of claim 1, wherein in said adjusting step:
   at least one object in the image represented by the image data is identified referring to Z-values of pixels calculated in said calculating step; and
   a Z-value of the target pixel is adjusted on the basis of a Z-value of a pixel located within an area corresponding to the identified object.

6. The method of claim 1, further comprising a step of obtaining moving images comprised of a plurality of images, and wherein a stereographic image is generated from each image, to generate stereographic images corresponding to the moving images in real time.

7. A stereographic image generating apparatus for generating a stereographic image comprising:
   a calculating means for calculating Z-values of each pixel based on only image data for that pixel, the pixels forming an image, each Z-value being assigned to a pixel, and each Z-value representing a depth of an object corresponding to the pixel;
   an adjusting means for adjusting a Z-value of a target pixel obtained in said calculating means using a Z-value of at least one individual pixel other than the target pixel; and
   a generating means for determining an amount of displacement of the target pixel on the basis of an adjusted Z-value of the target pixel, and displacing the target pixel horizontally by the determined amount, to generate images for the right and the left eyes, wherein:

said calculating means obtain the Z-value of each target pixel by adding predetermined weights to color components of image data of the target pixel, and said adjusting means:

adjust the Z-values of each pixel so that a single step available for a Z-value of a pixel corresponding to an object located backward in an original image express deeper depth than a single step available for a Z-value of a pixel corresponding to an object located forward in the original image;

obtain an average of Z-values of all pixels within an area which includes the target pixel;

replace the Z-value of the target pixel by the obtained average;

determine a step size of quantization of the Z-value based on a value of a parameter specified by a user; and determine either an upper limit or a lower limit of the calculated Z-value based on the value of the parameter specified by the user.

8. The apparatus of claim 7, further comprising an obtaining means for obtaining from the user the parameters used in said adjusting means.

9. The apparatus of claim 8, further comprising:

storing means for storing image data for the right and the left eyes; and displaying means for displaying an image represented by the image data stored in said storing means in compliance with a predetermined scheme.

10. A computer program product embodied on a computer readable medium, which when executed by a computer causes the computer to function as:

a calculating means for calculating Z-values of each pixel based on only image data for that pixel, the pixels forming an image, each Z-value being assigned to a pixel, and each Z-value representing a depth of an object corresponding to the pixel;

an adjusting means for adjusting a Z-value of a target pixel obtained in said calculating means using a Z-value of at least one individual pixel other than the target pixel; and a generating means for determining an amount of displacement of a target pixel on the basis of an adjusted Z-value of the target pixel, and displacing the target pixel horizontally by the determined amount, to generate images for the right and the left eyes, wherein:

said calculating means obtain the Z-value of each target pixel by adding predetermined weights to color components of image data of the target pixel, and said adjusting means:

adjust the Z-values of each pixel so that a single step available for a Z-value of a pixel corresponding to an object located backward in an original image express deeper depth than a single step available for a Z-value of a pixel corresponding to an object located forward in the original image;

obtain an average of Z-values of all pixels within an area which includes the target pixel;

replace the Z-value of the target pixel by the obtained average;

determine a step size of quantization of the Z-value based on a value of a parameter specified by a user; and determine either an upper limit or a lower limit of the calculated Z-value based on the value of the parameter specified by the user.

* * * * *